United States Patent
Letort et al.

(10) Patent No.: US 12,489,818 B2
(45) Date of Patent: Dec. 2, 2025

(54) VIRTUAL HOSTING DEVICE AND SERVICE TO PROVIDE SOFTWARE-DEFINED NETWORKS IN A CLOUD ENVIRONMENT

(71) Applicant: Digital Porpoise, LLC, Austin, TX (US)

(72) Inventors: Daniel Brian Letort, Gulfport, MS (US); Travis Duane Ewert, Highlands Ranch, CO (US); Matthew Ryan Traynham, Wilmington, NC (US); Joshua Cox, Knoxville, TN (US); Drew Hall, Owasso, OK (US); Lee Cardona-Gonzalez, New Cumberland, PA (US); Robert E. Pulley, Aptos, CA (US); Patrick D. Riley, Ridgefield, CT (US)

(73) Assignee: Digital Porpoise, LLC, Austin, TX (US)

( * ) Notice: Subject to any disclaimer, the term of this patent is extended or adjusted under 35 U.S.C. 154(b) by 115 days.

(21) Appl. No.: 18/587,183

(22) Filed: Feb. 26, 2024

(65) Prior Publication Data
US 2025/0007988 A1 Jan. 2, 2025

Related U.S. Application Data

(63) Continuation-in-part of application No. 17/890,712, filed on Aug. 18, 2022, now Pat. No. 12,368,782, (Continued)

(51) Int. Cl.
*H04L 67/141* (2022.01)
*H04L 67/10* (2022.01)
(Continued)

(52) U.S. Cl.
CPC ............ *H04L 67/141* (2013.01); *H04L 67/10* (2013.01); *H04L 67/52* (2022.05); *H04W 4/60* (2018.02)

(58) Field of Classification Search
CPC ....................................................... H04W 4/60
See application file for complete search history.

(56) References Cited

U.S. PATENT DOCUMENTS 8,667,057 B1  3/2014  Adya et al.
8,782,637 B2  7/2014  Khalid
(Continued)

OTHER PUBLICATIONS

Wikipedia, "OpenFlow," 2013 [3 Pages].

*Primary Examiner* — Nicholas P Celani
(74) *Attorney, Agent, or Firm* — Ice Miller LLP; Richard L. Cruz

(57) ABSTRACT

A hosting system to facilitate connecting to multiple cloud providers may comprise a first cloud exchange; a second cloud exchange; one or more cloud point-of-presence (PoPs) communicatively coupled to the first and second cloud exchanges; a software-defined network ("SDN") automation engine; a data collection layer; an artificial intelligence (AI) layer comprising one or more AI modeling engines configured to deploy one or more AI models; and a non-transitory computer readable medium comprising computer program instructions that when executed by a processor cause the system to generate a real-time conversational agent (a "chat-bot"), display the chat-bot on a user device, receive input comprising network specification parameters via the chat-bot, convert the input into one or more commands, generate a customized, on-demand SDN that complies with the network specification parameters, capture and model user data and network data, and automatically initiate one or more actions responsive to the modeling.

28 Claims, 30 Drawing Sheets

Related U.S. Application Data which is a continuation of application No. 16/715,506, filed on Dec. 16, 2019, now Pat. No. 11,457,070, which is a continuation of application No. 15/352,394, filed on Nov. 15, 2016, now Pat. No. 10,594,801, which is a continuation of application No. 14/494,243, filed on Sep. 23, 2014, now Pat. No. 9,531,814.

(51) Int. Cl.
*H04L 67/52* (2022.01)
*H04W 4/60* (2018.01)

(56) References Cited

U.S. PATENT DOCUMENTS

| | | |
|---|---|---|
| 9,531,814 B2 | 12/2016 | Cardona-Gonzalez et al. |
| 10,594,801 B2 | 3/2020 | Cardona-Gonzalez et al. |
| 11,457,070 B2 | 9/2022 | Cardona-Gonzalez et al. |
| 2010/0293269 A1 | 11/2010 | Wilson et al. |
| 2011/0265164 A1 | 10/2011 | Lucovsky et al. |
| 2012/0030672 A1 | 2/2012 | Zygmuntowicz et al. |
| 2013/0204849 A1 | 8/2013 | Chacko |
| 2013/0211870 A1 | 8/2013 | Lawson et al. |
| 2013/0212129 A1 | 8/2013 | Lawson et al. |
| 2013/0304903 A1 | 11/2013 | Mick et al. |
| 2013/0339949 A1 | 12/2013 | Spiers et al. |
| 2014/0006354 A1 | 1/2014 | Parkison et al. |
| 2014/0040979 A1 | 2/2014 | Barton et al. |
| 2014/0052877 A1 | 2/2014 | Mao |
| 2014/0059665 A1 | 2/2014 | Albani |
| 2014/0114918 A1 | 4/2014 | Babich et al. |
| 2014/0310513 A1 | 10/2014 | Barney et al. |
| 2014/0336795 A1 | 11/2014 | Asenjo et al. |
| 2014/0337086 A1 | 11/2014 | Asenjo et al. |
| 2019/0306045 A1* | 10/2019 | Avdesh Khanna ..... H04L 67/10 |
| 2022/0239567 A1* | 7/2022 | Manuel-Devadoss ..................... H04L 63/0421 |
| 2022/0394099 A1* | 12/2022 | Cardona-Gonzalez ..................... H04L 67/52 |

* cited by examiner

VIRTUAL HOSTING DEVICE AND SERVICE TO PROVIDE SOFTWARE-DEFINED NETWORKS IN A CLOUD ENVIRONMENT

CROSS-REFERENCE TO RELATED APPLICATION

This application is a continuation-in-part of U.S. patent application Ser. No. 17/890,712, filed Aug. 18, 2022, entitled VIRTUAL HOSTING DEVICE AND SERVICE TO PROVIDE SOFTWARE-DEFINED NETWORKS IN A CLOUD ENVIRONMENT, which is a continuation of U.S. patent application Ser. No. 16/715,506, filed Dec. 16, 2019, entitled VIRTUAL HOSTING DEVICE AND SERVICE TO PROVIDE SOFTWARE-DEFINED NETWORKS IN A CLOUD ENVIRONMENT (now U.S. Pat. No. 11,457,070, Issued Sep. 27, 2022), which is a continuation of U.S. patent application Ser. No. 15/352,394, filed Nov. 15, 2016, entitled VIRTUAL HOSTING DEVICE AND SERVICE TO PROVIDE SOFTWARE-DEFINED NETWORKS IN A CLOUD ENVIRONMENT (now U.S. Pat. No. 10,594,801, Issued Mar. 17, 2020), which is a continuation of U.S. patent application Ser. No. 14/494,243, Filed Sep. 23, 2014, entitled VIRTUAL HOSTING DEVICE AND SERVICE TO PROVIDE SOFTWARE-DEFINED NETWORKS IN A CLOUD ENVIRONMENT (now U.S. Pat. No. 9,531,814, Issued Dec. 27, 2016), the disclosures of each of which are incorporated herein by reference in their respective entirety.

TECHNICAL FIELD

The present disclosure relates generally to a virtual hosting device and service for providing software-defined networks in a cloud environment.

BACKGROUND

Cloud computing environments have revolutionized the manner in which business organizations examine the requirements and capacity to implement their data processing needs. A cloud computing environment may allow a cloud provider to host hardware and related items and provide systems and computational power as a service to a customer or other user (e.g., individual consumers, business organizations, or other entities). Thus, when implementing data processing needs via a cloud vendor, a user may avoid the direct cost of space, energy, and maintenance in order to acquire computational resources.

BRIEF SUMMARY

Systems and methods to facilitate customers to configure a network to connect to one or more cloud providers are disclosed. In some implementations, the system may comprise one or more Cloud Points of Presence (PoPs) and one or more Cloud Exchanges interconnected with each other through a high performance fiber-optic cable backbone. A Cloud PoP may host a container based virtual access gateway, which a customer may use to connect to the system. A Cloud Exchange may host a container based virtual cloud gateway, which may interface with one or more cloud providers. In some implementations, one or more Cloud PoPs and/or one or more Cloud Exchanges may host a container based virtual network controller. A customer may deploy an access gateway, a cloud gateway and a network controller to easily define a software-defined network to connect to one or more cloud providers. Thus, in an embodiment, the system and interface to create and orchestrate the software-defined network may essentially be provided as a service in the cloud, i.e., the network is effectively in the cloud and provided as a service to a customer.

In an embodiment, there is provided a hosting system to facilitate a customer of an operator of the system to connect to a cloud provider, the system comprising: a first cloud exchange co-located with and connected to first cloud provider equipment; a second cloud exchange co-located with and connected to second cloud provider equipment, wherein the first cloud provider equipment and the second cloud provider equipment are of a same cloud provider but at different geographically spaced locations or the first cloud provider equipment is of a different cloud provider than that of the second cloud provider equipment, and wherein the first cloud exchange is connected to the second cloud exchange; and a non-transitory computer readable medium comprising computer program instructions, the instructions configured to facilitate the configuration of a software-defined network including the first cloud exchange and/or second cloud exchange, wherein the network connects the customer to the first cloud provider equipment and/or the second cloud provider equipment.

In an embodiment, there is provided a hosting system to provide a software-defined network as a service, the system comprising: a cloud exchange co-located with and connected to cloud provider equipment; a non-transitory computer readable medium comprising computer program instructions, the instructions configured to: configure a virtual networking device at the cloud exchange and/or at a customer point of presence, receive a software-defined network specification from a customer of the operator of the system, and create a software-defined network based on the received specification, wherein the software-defined network includes the virtual networking device and connects equipment of the customer to the cloud provider equipment.

In an embodiment, there is provided a method to facilitate a customer of an operator of a system to connect to a cloud provider, the method comprising: facilitating configuration of a software-defined network including a first cloud exchange of the system and/or a second cloud exchange of the system, the network connecting the customer to first cloud provider equipment and/or second cloud provider equipment, wherein the first cloud exchange is co-located with and connected to the first cloud provider equipment, wherein the second cloud exchange is co-located with and a connected to the second cloud provider equipment, the first cloud provider equipment and the second cloud provider equipment being of a same cloud provider but at different geographically spaced locations or the first cloud provider equipment being of a different cloud provider than that of the second cloud provider equipment, and wherein the first cloud exchange is connected to the second cloud exchange.

In an embodiment, there is provided a method of providing a software-defined network as a service, the method comprising: configuring a virtual networking device at a customer point of presence and/or a cloud exchange co-located with and connected to cloud provider equipment; receiving a software-defined network specification from a customer of an operator of the cloud exchange and/or customer point of presence, and creating a software-defined network based on the received specification, wherein the software-defined network includes the virtual networking device and connects equipment of the customer to the cloud provider equipment.

In some embodiments, the systems, methods and computer program products (e.g., non-transitory computer-readable medium comprising computer program instructions) may comprise artificial-intelligence (AI) driven components and technology. In an embodiment, a system to facilitate connecting to multiple cloud providers may comprise: a first cloud exchange; a second cloud exchange; one or more cloud point-of-presence (PoPs) communicatively coupled to the first and second cloud exchanges; a software-defined network ("SDN") automation engine; a data collection layer configured to monitor, collect, measure, store and/or transmit real-time and historic data and information from among components and layers of the system, as well as from among one or more external data sources; an artificial intelligence (AI) layer comprising one or more AI modeling engines configured to generate, train, validate, test and/or deploy one or more AI models; and a non-transitory computer readable medium comprising computer program instructions that, when executed by a processor, cause the system to: generate a real-time conversational agent (a "chat-bot"), display the chat-bot on a user device via the interactive GUI, receive input comprising network specification parameters via the chat-bot, convert the input into one or more commands, generate a customized, on-demand SDN that complies with the network specification parameters, capture and model user data and network data by deploying one or more AI models, and automatically initiate one or more actions responsive to output of the one or more AI models.

It is to be understood that both the foregoing general description and the following detailed description are exemplary and not restrictive of the scope of the invention.

BRIEF DESCRIPTION OF THE DRAWINGS

So that the manner in which the features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals may have been used, where possible, to designate identical elements that are common to the figures. It is contemplated that elements disclosed in one embodiment may be beneficially utilized on other embodiments without specific recitation.

DETAILED DESCRIPTION

Figure 1:
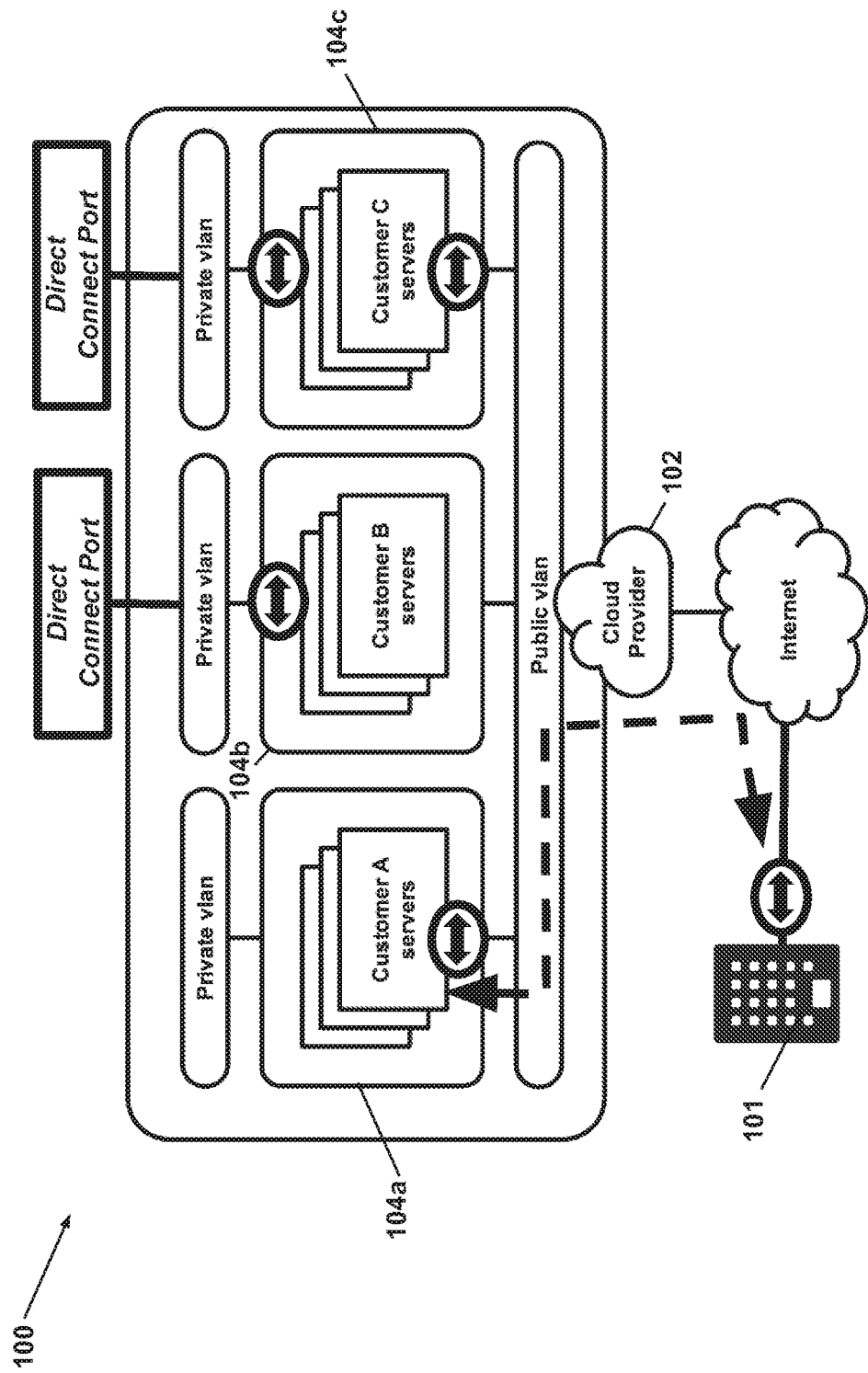
FIG. 1 is a schematic illustration of a cloud provider network architecture.

FIG. 1 schematically illustrates an example cloud provider network architecture 100. Using this architecture, a customer business location 101 is connected to a cloud provider 102 over the internet. In an embodiment, a cloud provider may include a virtual machine hosting provider, a software as a service provider, etc. A virtual private network (VPN) (the dashed line in FIG. 1) is set up for the customer to access one or more servers 104a, 104b, 104c of the cloud provider 102. As an example, a particular customer may be assigned certain servers 104a while another customer may be assigned certain other servers 104b. Those one or more servers may be dedicated hardware computing machines and/or virtual machines. Within the cloud provider's environment, the customer may establish a private virtualized local area network (private VLAN) among the hardware computing machines and/or virtual machines dedicated to the customer. To access the resources dedicated to the customer, the customer may access the cloud provider via the internet and pass through a public virtualized local area network within the cloud provider by which all the customers can access their respective resources. Connecting to a cloud provider 102 over the internet, however, may suffer from one or more problems. For example, the internet, being a network of networks, typically does not have a dedicated circuit from the business location to the cloud provider. Therefore, a connection over the internet may have high latency and/or low throughput. The internet may also suffer from low reliability because various networks within the internet may overload or fail without any warning. Further, the internet, being a public network, may be prone to security concerns.

Figure 2:
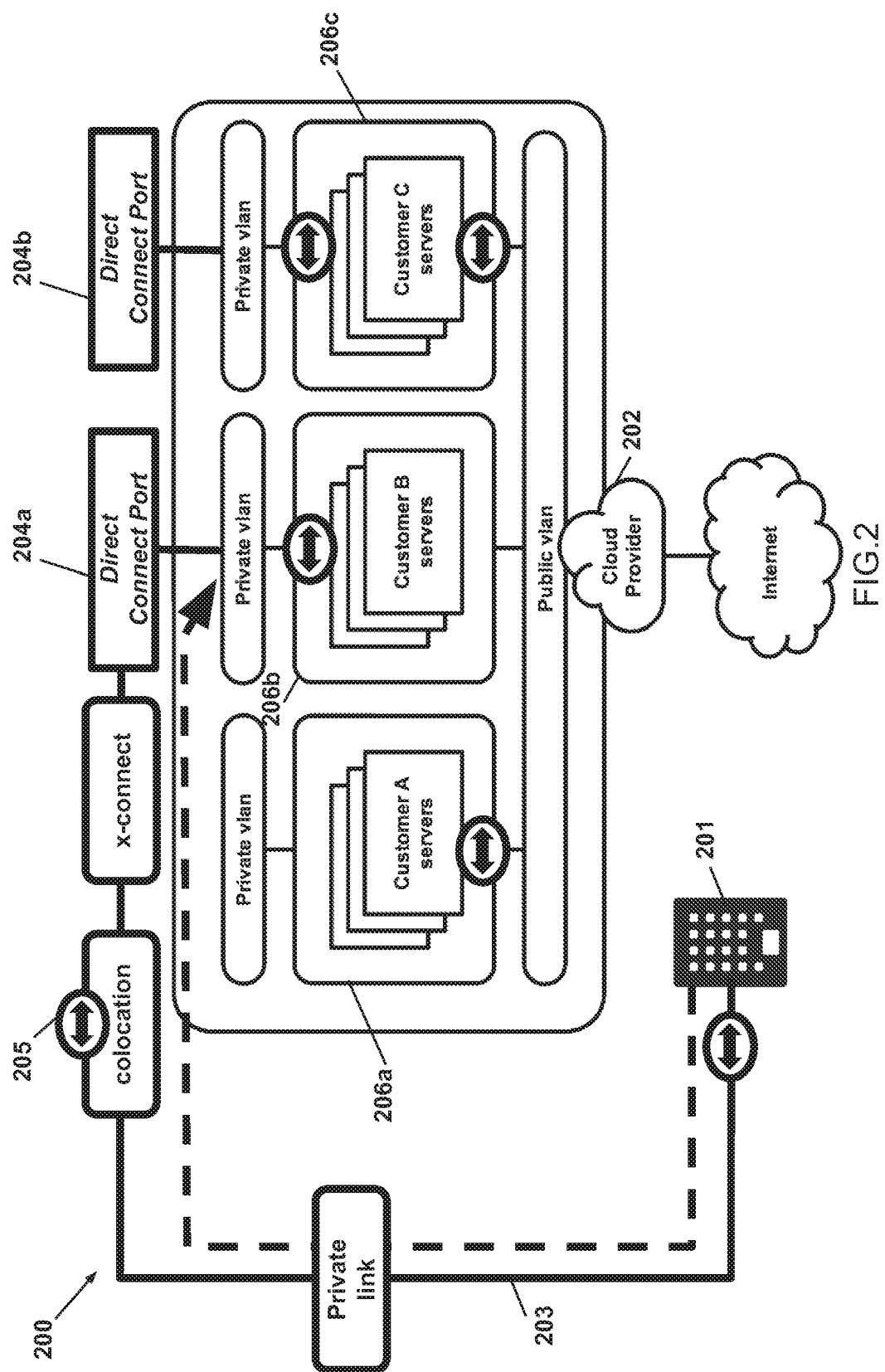
FIG. 2 is a schematic illustration of another cloud provider architecture.

To allay one or more those (or other) problems, a customer may wish to establish a direct private connection or link to the cloud provider in addition to or as an alternative to connecting through the internet. The direct connection is through a direct connect port of the cloud provider, and is made through a dedicated router of the customer co-located with the cloud provider and a dedicated telecommunication link, acquired by the customer, between the router and the customer. FIG. 2 schematically illustrates another example cloud provider network architecture 200. In this architecture, a business location 201 is connected to the customer's dedicated one or more servers 206b of the cloud provider 202 using a private link 203 instead of the internet. The cloud provider 202 provisions direct connect ports 204a, 204b for customers to access their dedicated servers 206a, 206b, 206c. The business location 201 uses the private link 203 to connect to the customer's dedicated router 205, which is in turn cross-connected via telecommunications link to the port 204a provisioned by the cloud provider 202. A virtual private network (VPN) (the dashed line in FIG. 2) may be set up for the customer to access one or more servers 206b of the cloud provider 202.

A private connection 203 to the cloud provider 202 may have its own one or more problems. For example, the customer 201 has to request a connection, negotiate and sign one or more contracts, expend time and cost therefor and perhaps be subject to various fees (such as termination fees and/or co-location fees). Further, weeks, if not months, may be spent in the process of requesting a private connection, getting approved, and negotiating the contracts.

Furthermore, for a private connection 203, a customer typically has to install and maintain expensive networking equipment (e.g. router 205) in proximity to the cloud provider's equipment. Needless to say, the installation and maintenance of such equipment calls for a significant amount of capital investment. Furthermore, if the business customer 201 wants to switch to another cloud provider, another private link has to be procured and further networking equipment has to be co-located in the vicinity of the other cloud provider. The problem gets worse if the switching takes place before the expiration of the term of one or more contracts in which case the business customer may have to pay a hefty early termination fee to the cloud provider, the link provider, etc.

And, if a business wants a connection to an additional cloud provider through a private connection, the above outlined process of request and approval of the connection, negotiation and signing of contracts, setting up network equipment has to be repeated all over again. The problem is compounded when the business has multiple locations wishing to connect to multiple cloud providers and/or multiple separate facilities of a single cloud provider. Thus, using private links may become prohibitively expensive, cumbersome, inflexible, etc. for a customer.

Figure 3:
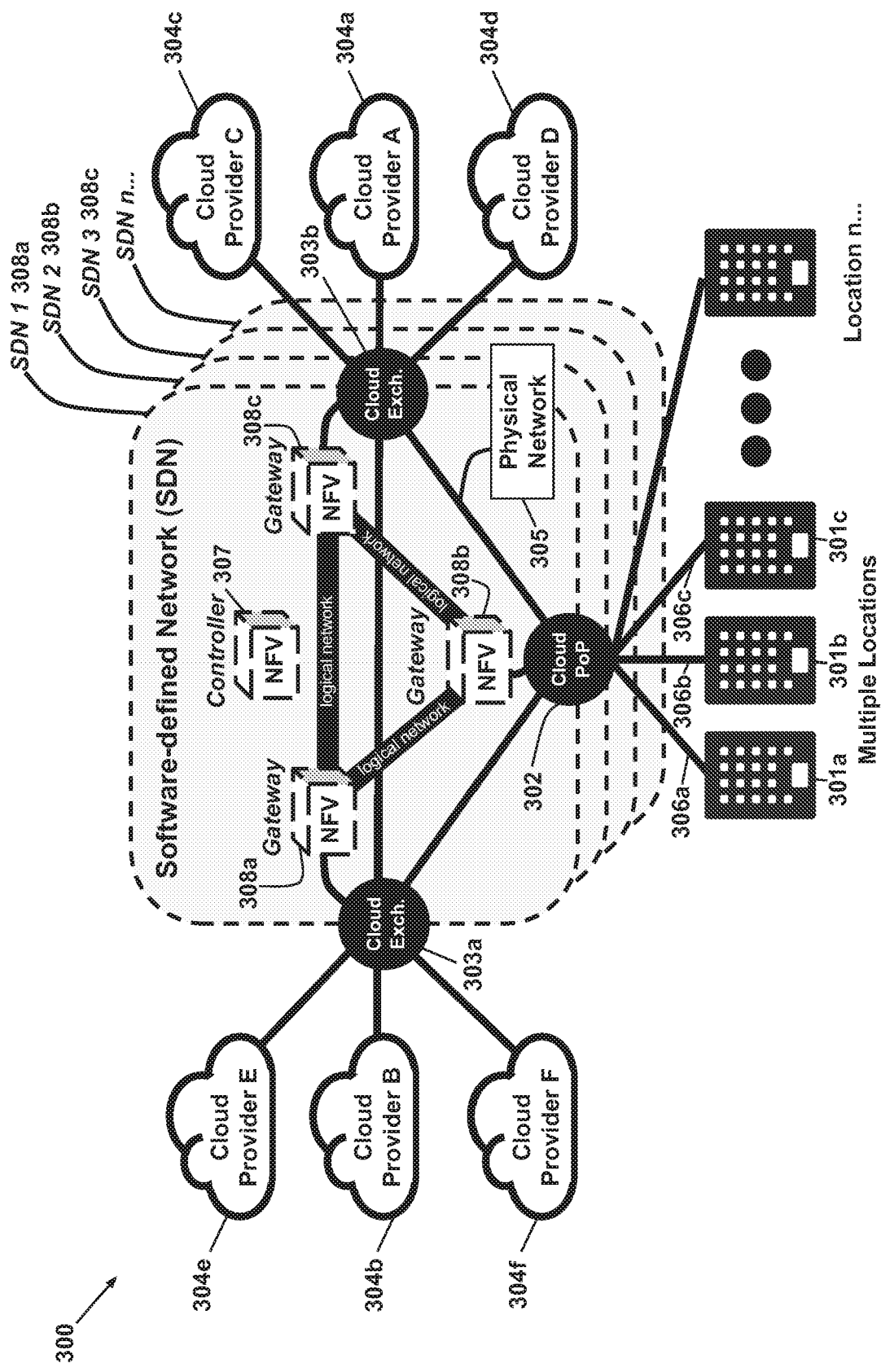
FIG. 3 is a schematic illustration of an example system to provide one or more virtual network devices and services to create a software-defined network in a cloud environment, according to various implementations.

FIG. 3 schematically illustrates an example system 300 which solves one or more of the above-mentioned (or other) problems by providing a customer a virtual network devices and services to create a software-defined network in a cloud environment. The system 300 provides customers with flexibility to configure (which herein includes reconfigure) their own networks, e.g., a logical network using hardware in system 300, in a short time. The system may enable quick connection by a customer to a cloud provider without having to take the time, cost, etc. to provision, for example, their own private connection and/or co-located equipment with a cloud provider. The system may also enable connection to a cloud provider without going through the internet and thus may reduce costs in using a cloud provider. The system may enable a more secure connection to a cloud provider. The system may enable a faster connection to a cloud provider than, e.g., the internet.

The system 300 incorporates network function virtualization (NFV) to provide virtual network devices, which can be instantiated and deployed to create any number of software-defined networks (SDNs) to connect to any number of cloud providers. In an implementation, the system 300 is provided by a third party separate from the customers. In an implementation, the system 300 is provided by a third party separate from the customers and the cloud providers. In an embodiment, the administrator of the system 300 may, for example, control one of more aspects of the software-defined networks, such as limit the bandwidth of a software-defined network. Thus, an administrator of system 300 may control the bandwidth of a software-defined network and, for example, charge the customer depending on bandwidth.

In some implementations, the system 300 may comprise one or more Cloud Points of Presence (PoPs) 302 connected to one or more Cloud Exchanges 303a, 303b by a physical network. That is, the one or more Cloud PoPs and one or more Cloud Exchanges may be connected to each other through a high performance optical fiber backbone 305. One Cloud PoP and two Cloud Exchanges are shown in FIG. 3 to describe the embodiments of the system. However, it should be understood that the system also contemplates multiple Cloud PoPs and multiple Cloud Exchanges connected to each other.

In some implementations, a Cloud Exchange 303 may interface with one or more cloud providers. For example, Cloud Exchange 303b interfaces with three cloud providers: Cloud provider C (304c), cloud provider A (304a) and cloud provider D (304d) at a same general location. As another example, Cloud Exchange 303a interfaces with three cloud providers: cloud provider E (304e), cloud provider B (304b) and cloud provider F (304f). While one Cloud Exchange is shown as connected to a plurality of cloud providers, in an embodiment, each cloud provider may have an associated Cloud Exchange. In some implementations, a cloud exchange may be co-located (within 200 yards and/or having a direct connection) with a cloud provider equipment. Co-located means within the same storage rack as the cloud provider equipment, in the same datacenter as the cloud provider equipment, in the same building as the cloud provider equipment, on the same campus as the cloud provider equipment, within 300 yards or less of the cloud provider equipment, within 200 yards or less of the cloud provider equipment, within 100 yards or less of the cloud provider equipment, or within the range of a direct line connection that is not intermediated by an amplifier, repeater or router.

Further, one or more cloud providers may be at a geographically spaced location (e.g., at least 1 mile apart, at least 10 miles apart, at least 100 miles apart, at least 1000 miles apart) from another cloud provider and accordingly, a first Cloud Exchange may be provided with a first cloud provider and a second Cloud Exchange may be provided at a second cloud provider that is geographically spaced from the first cloud provider. Connectivity to multiple cloud providers allows a customer the flexibility of including multiple cloud providers in the customer's network and/or switching between cloud providers. A customer may easily add, drop or exchange one or more cloud providers.

In some implementations, multiple locations of a business 301a, 301b, 301c . . . may be connected to a Cloud PoP 302, e.g., a customer interface. As will be appreciated, each business location may be connected to a different Cloud PoP. Each individual link 306a, 306b, 306c . . . may be a private connection and/or a connection over the internet. Private connection may be used when a business location is in geographic proximity to Cloud PoP 302. Connection over the internet may be used when a business location is not within a reasonable geographic distance from a Cloud PoP 302. In some implementations, a business location may have both a private connection and connection over the internet, wherein the private connection works as a primary link and the connection over the internet acts as a backup link. Furthermore, each private connection and each connection over the internet may comprise of two redundant links. The redundancy ensures the smooth operation of the network even if one or more of the links fail.

In some implementations, the system 300 incorporates network function virtualization (NFV) to provide customers with virtual network devices. The virtual networks devices may be one or more controllers, e.g. 307 and/or one or more gateways, e.g. 308a, 308b, 308c. A customer may instantiate these virtual networks devices and may deploy them to configure a customized software-defined network (SDN) on demand. In some implementations a customer may configure multiple SDNs 309a, 309b, 309c . . . using the physical infrastructure of system 300.

Figure 4:
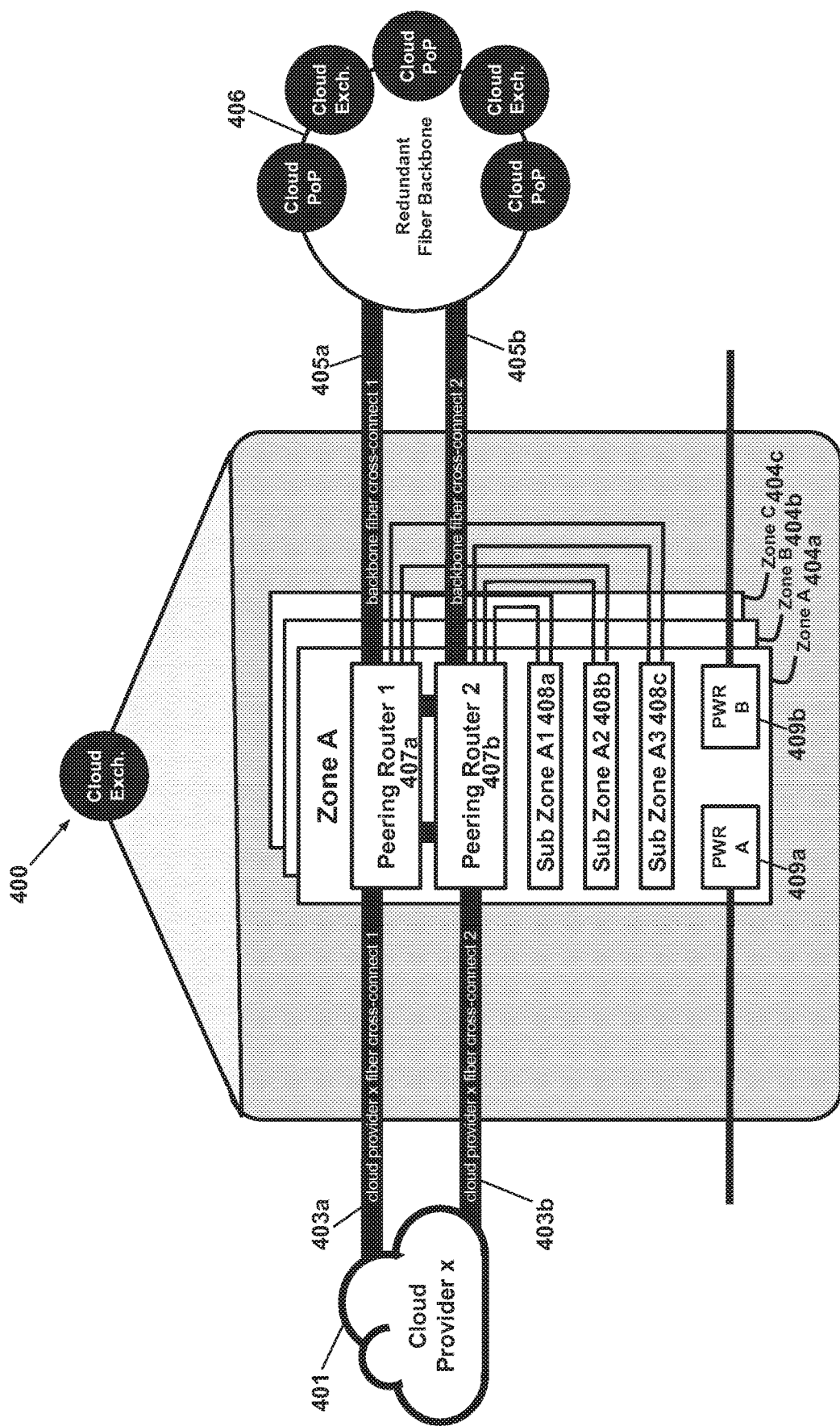
FIG. 4 is a schematic illustration of an example system which interfaces with a cloud provider, according to various implementations.

FIG. 4 schematically illustrates an example of Cloud Exchange 400, which as discussed herein is co-located with the cloud provider and provides the connection between a Cloud PoP (and thus a customer) to the cloud provider. Each Cloud Exchange 400 is a combination of hardware and software. In some implementations, the Cloud Exchange 400 may comprise multiple zones, for example: zone A (404a), zone B (404b), and zone C (404c). Each zone may be powered by a pair of redundant power supplies, 409a and 409b. Each zone may include a pair of peering routers 407a and 407b. The peering routers may connect to a cloud provider 401 at one end using a pair of redundant fiber optic links 403a and 403b, and the network backbone 406 at the other end using a pair of redundant fiber optic links 405a and 405b. The pair of peering routers 407a and 407b may be connected to each other as well. Using a pair of peering routers and a pair of redundant links creates two redundant connections between the cloud provider 401, a zone (e.g. Zone A, 404a) of the Cloud Exchange 400, and the network backbone 406 to help ensure that the system remains operational if, for example, one of the connections and/or routers fail. In some implementations, each zone may further comprise sub-zones, for example: sub-zone A1 (408a), sub-zone A2 (408b) and sub-zone A3 (408c). Each sub-zone may be connected to both of peering routers 407a and 407b. Each sub-zone may comprise computer hardware for a server and software. Each sub-zone may be connected to a peering router by a fiber connection. Each zone comprises one or more physical peering routers and at least one sub-zone comprising physical server hardware.

Figure 5:
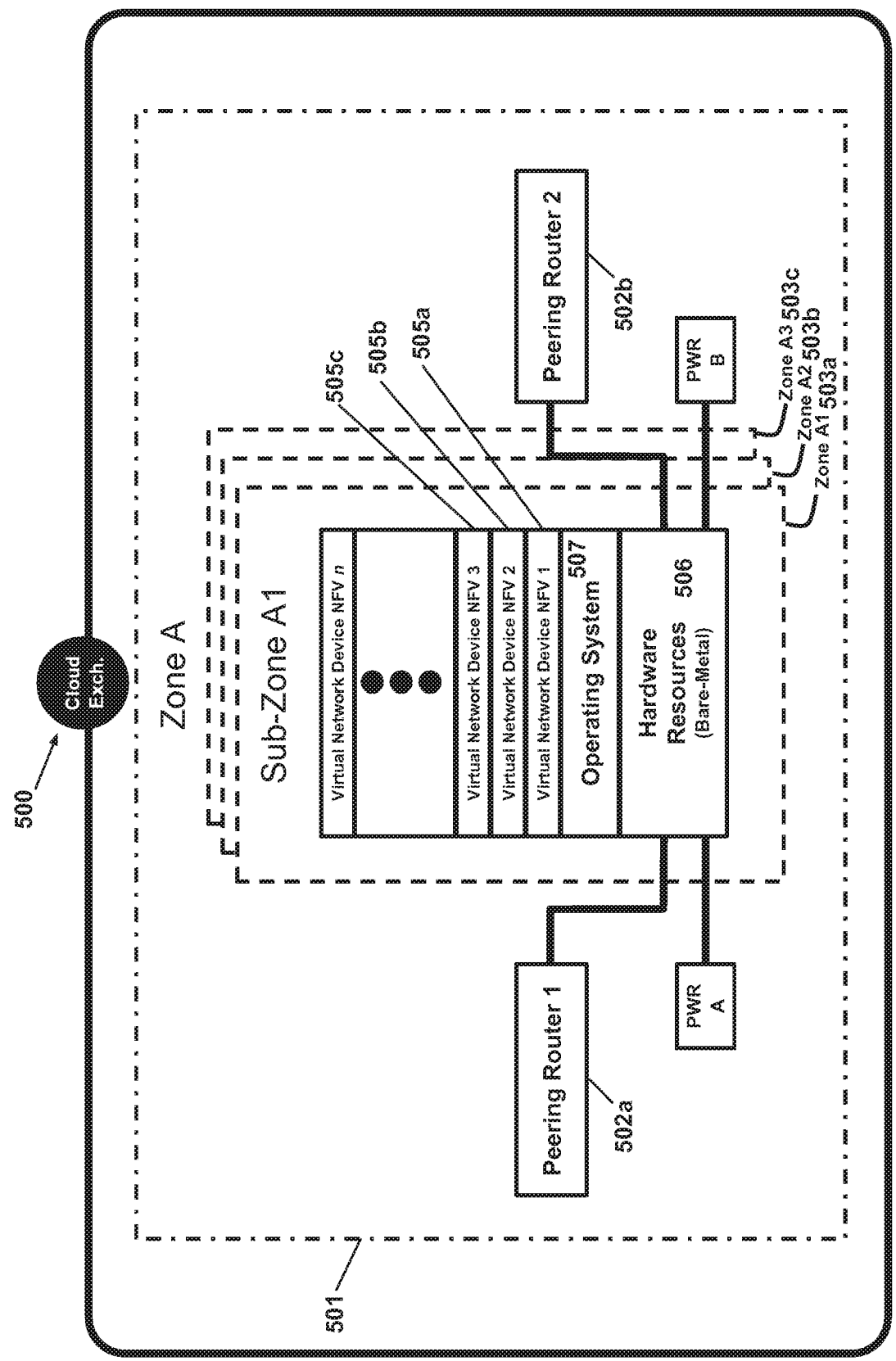
FIG. 5 is a schematic illustration of an example of a zone within the system illustrated in FIG. 4, according to various implementations.

FIG. 5 schematically illustrates an example of sub-zones 503a, 503b, 503c within a zone 501 of a cloud exchange 500. In some implementations, each sub-zone (e.g. 503a) may comprise a "bare-metal" hardware resource 506. The hardware resource 506 may connect to the pair of peering routers 502a and 502b. In some implementations, multiple virtual network devices 505a, 505b, 505c . . . deployed in the software-defined network may be instantiated on the operating system 507 of the hardware resource 506 of a sub-zone 503a.

In some implementations, a virtual network device (e.g. 505a) may be localized within a same sub-zone (e.g. 503a). For example, an instance of a virtual network controller or a gateway may use the hardware included in a particular sub-zone. In some implementations, a redundant virtual network device may be instantiated on the hardware of a different sub-zone. Instantiating the redundant virtual network devices on two different sub-zones helps ensure the availability of the virtual network device if, for example, one of the sub-zones fails.

In some implementations, the virtual network devices 505a, 505b, 505c . . . may be instantiated on the hardware resources 506 without the use of a hypervisor. In some implementations, the virtual network devices 505a, 505b, 505c . . . may run on a proprietary operating system 507. In some implementations, the virtual network devices may be constructed using containers.

Figure 6:
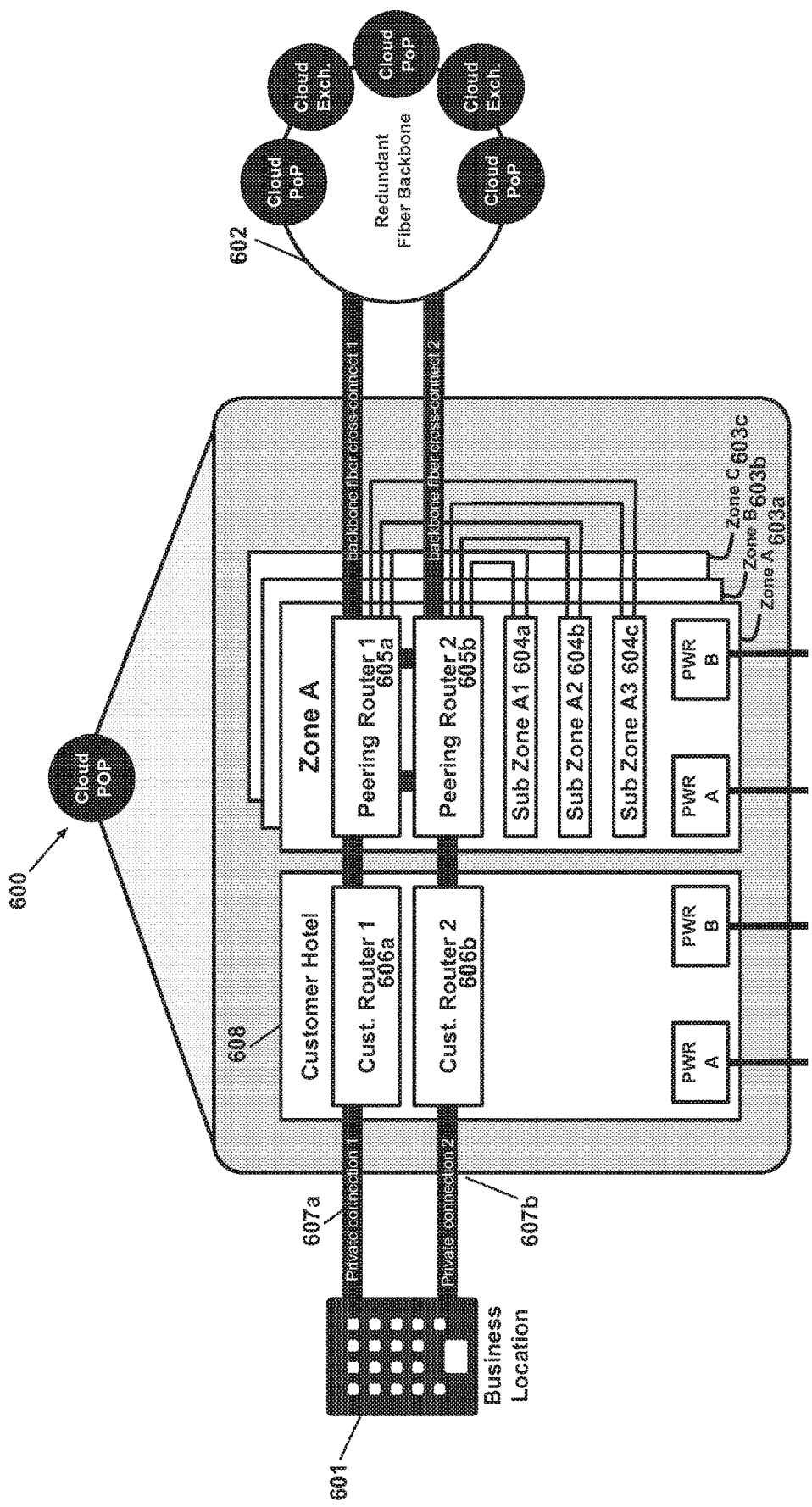
FIG. 6 is a schematic illustration of an example system which interfaces with a customer and its business locations using a private connection, according to various implementations.

FIG. 6 schematically illustrates an example of a Cloud Point of Presence (PoP) 600, which as discussed herein enables the customer to access the network defined in the system 300 and thus connects the customer to one or more Cloud Exchanges (and their one or more associated cloud providers). Each Cloud PoP 600 is a combination of hardware and software. In some implementations, the Cloud PoP may comprise of multiple zones 603a, . . . . Furthermore, a zone may further comprise multiple sub-zones, for example, sub-zones A1 (604a), A2 (604b) and A3 (604c). Each sub-zone may be connected to a pair of peering routers 605*a* and 605*b*. The peering routers may be connected to each other. In some implementations, the peering routers 605*a* and 605*b* may be connected to customer routers 606*a* and 606*b* at one end, and to the fiber optic backbone 602 at the other end.

In some implementations, a sub-zone (e.g. 604*a*) in the Cloud PoP may be similar to the sub-zone in the Cloud Exchange. Like its counterpart in a Cloud Exchange, a sub-zone in the Cloud PoP may comprise "bare-metal" hardware resources connected to a pair of peering routers. Likewise, multiple virtual network devices may be instantiated and deployed on the hardware resources of a sub-zone. In some implementations, a virtual network device may be localized within a same sub-zone. For example, an instance of a virtual controller or gateway may use the hardware included in a particular sub-zone. In some implementations, a redundant virtual network device may be instantiated using the hardware of a different sub-zone. Instantiating the redundant virtual network devices in different sub-zones helps ensure the availability of the virtual network device if, for example, one of the sub-zones fails.

In some implementations, a customer may connect to a Cloud PoP 600 through a private link. The desire for a private link may be for any number of reasons, e.g., a private link may be faster, more reliable, and/or more secure than the internet. The private link may comprise a pair of redundant connections 607*a* and 607*b*. The private link may be provided by a telecommunications provider. In some implementations, a connection over the internet may be maintained in addition to the private link. The private link may be used as the primary link and the connection over the internet may be used as a secondary link in case, for example, the private link fails.

In some implementations, when a customer uses a private link to connect to a Cloud PoP 600, the customer may maintain networking equipment in close proximity to the Cloud PoP. The networking equipment may comprise a pair of routers 606*a* and 606*b*. In some implementations, the customer equipment (e.g. routers 606*a* and 606*b*) may be hosted at a "customer hotel" 608, i.e., space available at the Cloud PoP location for use by equipment dedicated to the customer (such as customer supplied equipment). The customer routers 606*a* and 606*b* at one side may interface with the private connections 607*a* and 607*b* coming in from the customer's business location. On the other side, the customer routers 606*a* and 606*b* may interface with the Cloud PoP equipment (e.g. peering routers 605*a* and 605*b*) to provide the connectivity from the business location to the Cloud PoP. In some implementations, a single Cloud PoP hotels networking equipment for multiple customers. In some implementations, a customer may hotel networking equipment at multiple Cloud PoP locations, for example, when geographically distributed business locations want to connect to respective Cloud PoPs close to each of the locations. Advantageously, the Cloud PoP 600 may be relatively remote from cloud provider equipment and thus a customer may effectively obtain a private connection to cloud provider equipment that may be significantly lower cost, technically simpler, etc. than the customer obtaining a private connection directly to cloud provider equipment.

Figure 7:
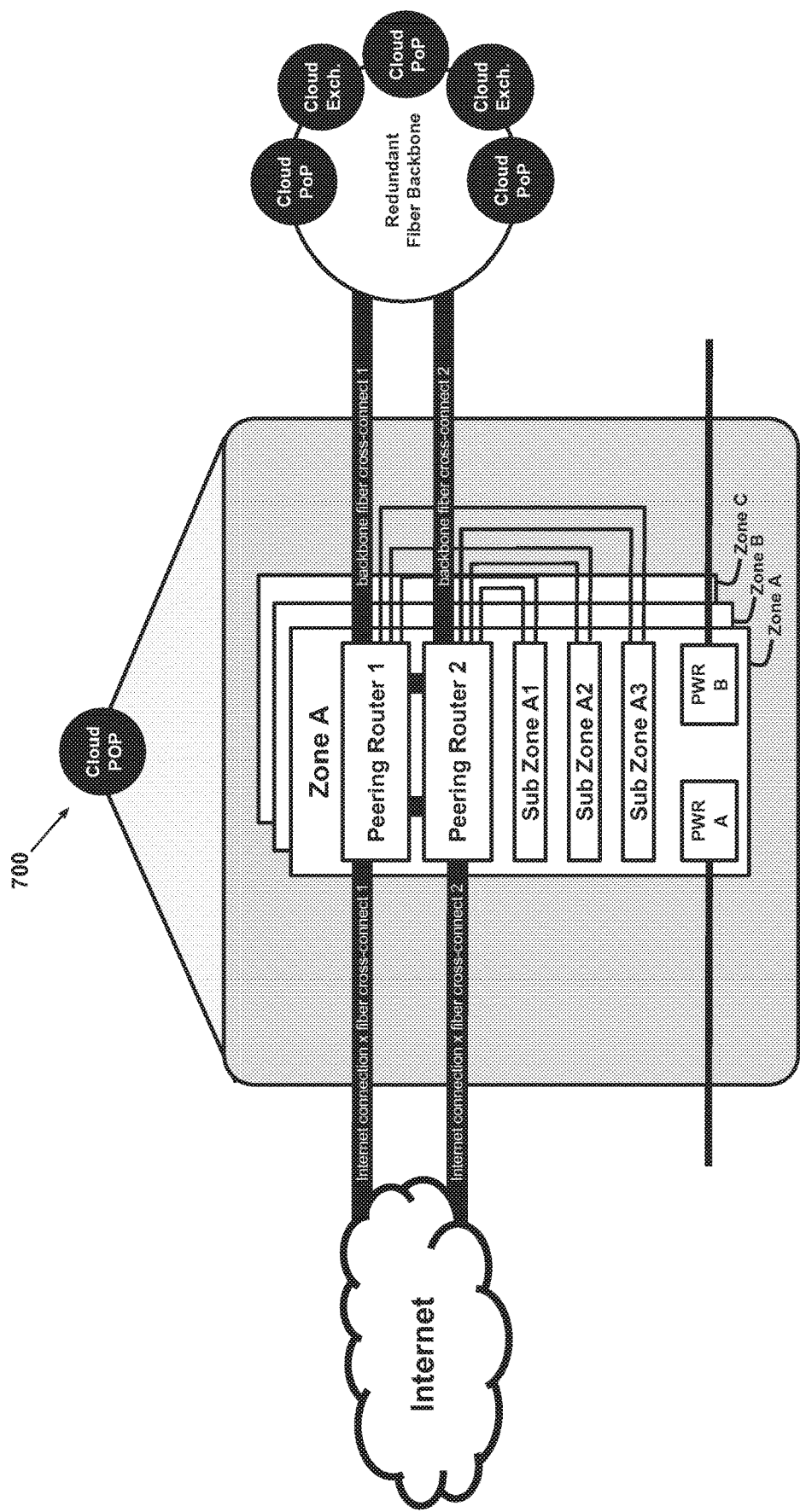
FIG. 7 is a schematic illustration of an example system which interfaces with a customer and its business locations using an internet connection, according to various implementations.

FIG. 7 schematically illustrates an embodiment wherein a customer may connect to the Cloud PoP 700 over the internet. When the customer connects to the Cloud PoP 700 over the internet, the customer need not maintain networking equipment at the site of the Cloud PoP. A connection over the internet may be beneficial for a customer when a Cloud PoP is not in close proximity, a private connection is not feasible or economical, and/or as a backup to a private connection. For example, a customer may want to connect to the Cloud PoP from outside a business location using a laptop (e.g., from a hotel, an airport, etc.). In such a scenario, a private connection may not be practical. Various authentication and security measures may be applied for the connection over the internet.

Figure 8:
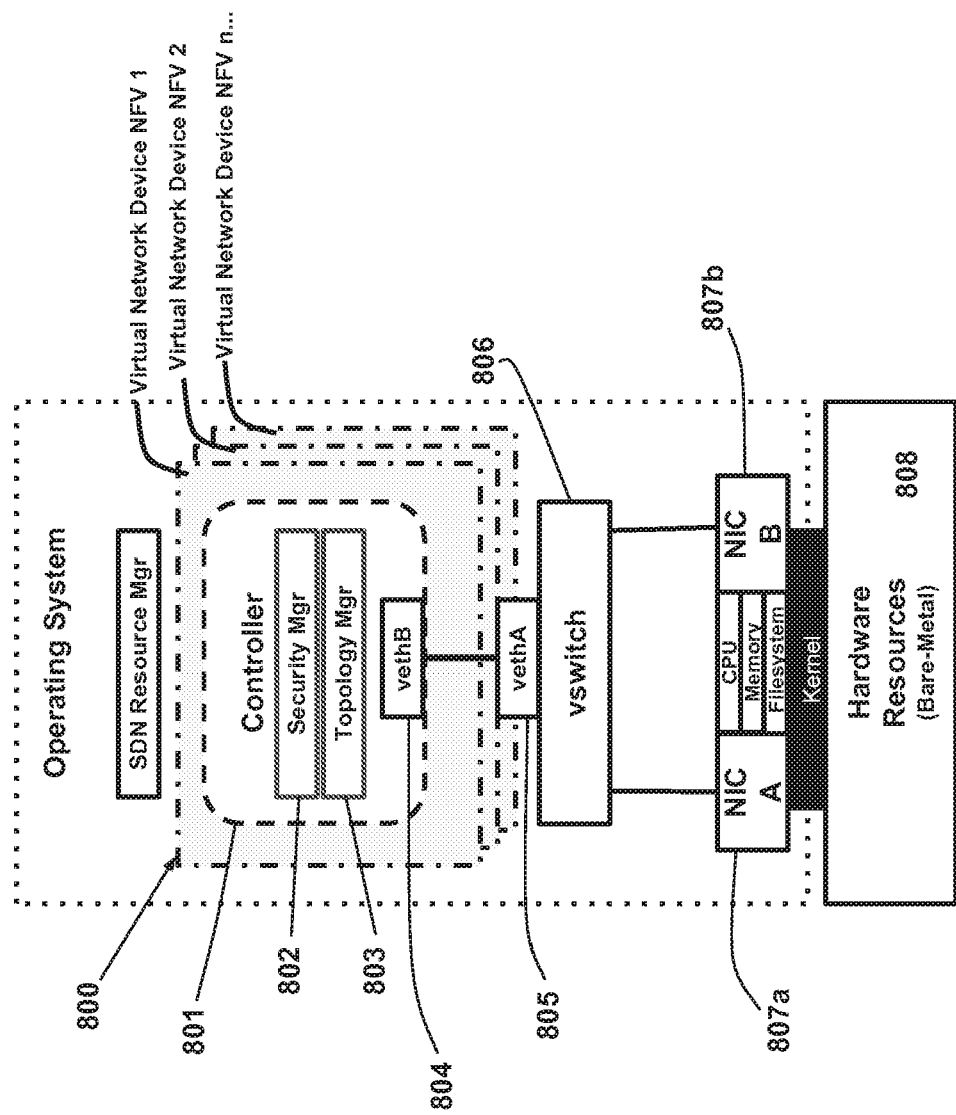
FIG. 8 is a schematic illustration of an example of a virtual controller in the software-defined network, according to various implementations.

FIG. 8 schematically illustrates an example of a virtual network controller 800, which is a virtual network device in system 300 to enable control of traffic in a software-defined network defined over the physical infrastructure of system 300. In some implementations, the virtual network controller 800 may run as a process on an operating system installed on the "bare-metal" hardware resources 808 of a sub-zone. The sub-zone may be within a Cloud Exchange or a Cloud PoP. As will be appreciated, the virtual network controller 800 may be instantiated into multiple virtual network devices NFV1, NFV2, etc., which may all operate on the hardware resources 808 of a sub-zone and optionally each have a different configuration.

In some implementations, the virtual network controller may comprise a container 801. That is, the operating system has operating system—level virtualization that comprises a server virtualization method where the kernel of the operating system (e.g., a Unix-based operating system such as Linux) allows for multiple isolated user space instances, instead of just one. Such instances called containers (or virtualization engines (VE), virtual private servers (VPS) or jails) generally look and feel like a real server from the point of view of its owners and users. In addition to isolation mechanisms, the kernel typically provides resource management features to limit the impact of one container's activities on the other containers.

The virtual network controller 800 comprises a topology manager 803, a security manager 802 and a virtual network interface card 804 (e.g., a virtual Ethernet port). Where the controller 800 has a container 801, the container 801 comprises the topology manager 803, the security manager 802 and the virtual network interface card 804.

The topology manager 803 may maintain a list of all the other devices in the software-defined network which includes the controller 800. The security manager 802 may be responsible for the secure transfer of data among the nodes of the software-defined network by implementing techniques such as encryption, etc.

In some implementations, the virtual network interface card 804 in the virtual network controller 800 may connect to a virtual network interface card 805 implemented on a virtual switch 806. The virtual switch 806 may be implemented on a pair of Network Interface Controllers (NICs) 807*a* and 807*b* within the hardware resources 808 of a sub-zone. The NICs 807*a* and 807*b* may be connected to the peering routers of the zone in which the sub-zone resides.

In some implementations, the virtual network controller 800 may connect to and control other virtual gateways. In some implementations, the virtual network controller 800 may be connected to other virtual network controllers. In some implementations, the virtual network controller 800 may not connect to external entities, such as the cloud providers. In some implementations, multiple virtual network controllers can be implemented within a same sub-zone. In some implementations, redundant virtual network controllers may be implemented in different sub-zones.

Figure 9:
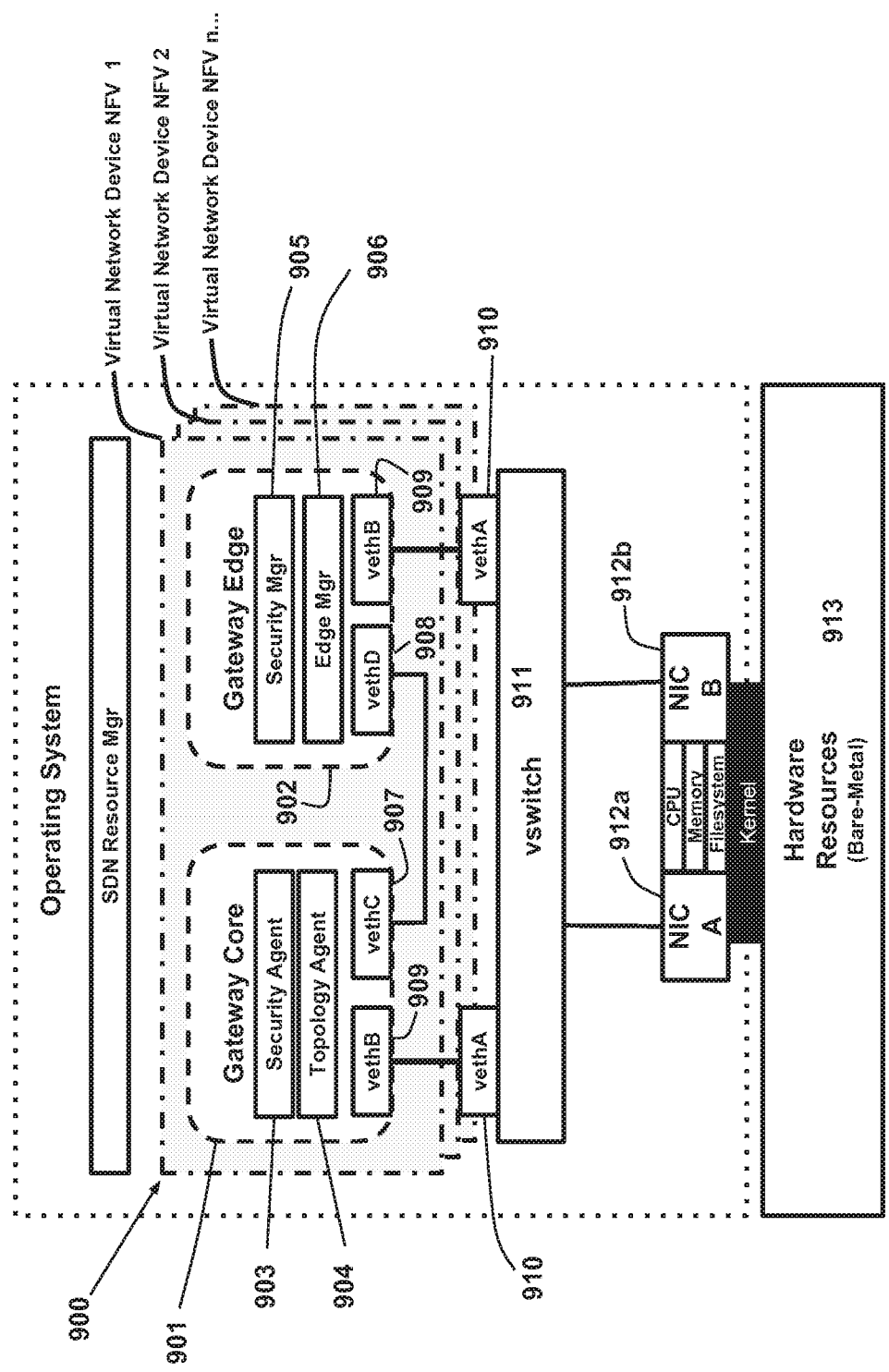
FIG. 9 is a schematic illustration of an example of a virtual gateway in the software-defined network, according to various implementations.

FIG. 9 schematically illustrates an example of a virtual gateway 900, which is a virtual network device used to enable communication with an external device and interact with one or more virtual network controllers 800 and/or one or more other instances of a virtual gateway 900. In some implementations, the virtual gateway 900 may run as a process on an operating system installed on the "bare-metal" hardware resources 913 of a sub-zone. The sub-zone may be within a Cloud Exchange or a Cloud PoP. As will be appreciated, the virtual gateway 900 may be instantiated into multiple virtual network devices NFV1, NFV2, etc., which may all operate on the hardware resources 913 of a sub-zone and optionally each have a different configuration.

In some implementations, the virtual gateway 900 may comprise a core container 901 and an edge container 902. The gateway core container 901 may interact with other virtual devices in the software-defined network, and the edge container 902 may interact with an external entity connected to the network. The external entity may be a cloud provider, a customer deploying the virtual network, etc. Where the external entity is customer equipment, the virtual gateway 900 may be characterized as an access gateway such as a mobile gateway or a site gateway. Where the external entity is cloud provider equipment, the virtual gateway 900 may be characterized as a cloud gateway.

In some implementations, the virtual gateway 900 (and optionally the gateway core container 901) may comprise a security agent 903 and a topology agent 904, which together may form a gateway core. The gateway core generally faces the internal network, i.e., it generally interacts with one or more virtual controllers defined in the network and/or with gateway cores of other virtual gateways in the network, and connects the internal network to a gateway edge, which in turn connects to the external device. For example, the topology agent 904 may interact with the topology manager (FIG. 8: 803) of a virtual network controller to receive a list of devices in the software-defined network (e.g., respectively defined by an IP address). The topology agent 904 then may cache the received list, and based on the list, may initiate connection with a neighbor virtual device, e.g., another virtual gateway or with a virtual controller. The security agent 903 may receive security credentials from the SDN automation engine (see, e.g, SDN automation engine 1001 in FIG. 10). When the virtual gateway 900 needs to connect to its controller, the security agent 903 may hand over those credentials to the controller so that the controller may trust the gateway 900.

In some implementations, the virtual gateway 900 (and optionally the gateway edge container 902) may comprise a security manager 905 and an edge manager 906, which together may form the gateway edge of the virtual gateway. The gateway edge generally faces the outside of the network, i.e., it generally may interact with the equipment of an external device, such as cloud provider equipment and/or customer equipment, and may connect the external device to the gateway core, which gateway core in turn may connect the external device to one or more virtual controllers defined in the network and/or with gateway cores of other virtual gateways in the network. The security manager 905 may receive security credentials from the SDN automation engine. The edge manager 906 may facilitate and maintain the network connectivity, which may be through a private link (e.g., to a customer or to a cloud provider) or the internet (e.g., IPSEC), at the edge of the system. For example, the edge manager 906 may set up and manage the network connectivity including managing credentials, routing protocols, etc.

In some implementations, the core container 901 and the edge container 902 of the virtual gateway may connect to each other through virtual network interface cards 907 and 908 (e.g., virtual Ethernet ports). Furthermore, both containers may have respective virtual network interface cards 909 which connect to a virtual switch 911 through virtual network interface cards 910. The virtual switch 911 may be implemented on a pair of Network Interface Controllers (NICs) 912a and 912b within the hardware resources 913 of a sub-zone. The NICs may be connected to the peering routers of the zone in which the sub-zone resides.

In some implementations, the virtual gateway may connect to one or more virtual network controllers. In some implementations, the virtual gateway may, additionally or alternatively, connect to one or more other virtual gateways. In some implementations, multiple virtual gateways may be implemented within a same sub-zone. In some implementations, redundant virtual gateways may be implemented in different sub-zones.

Figure 10:
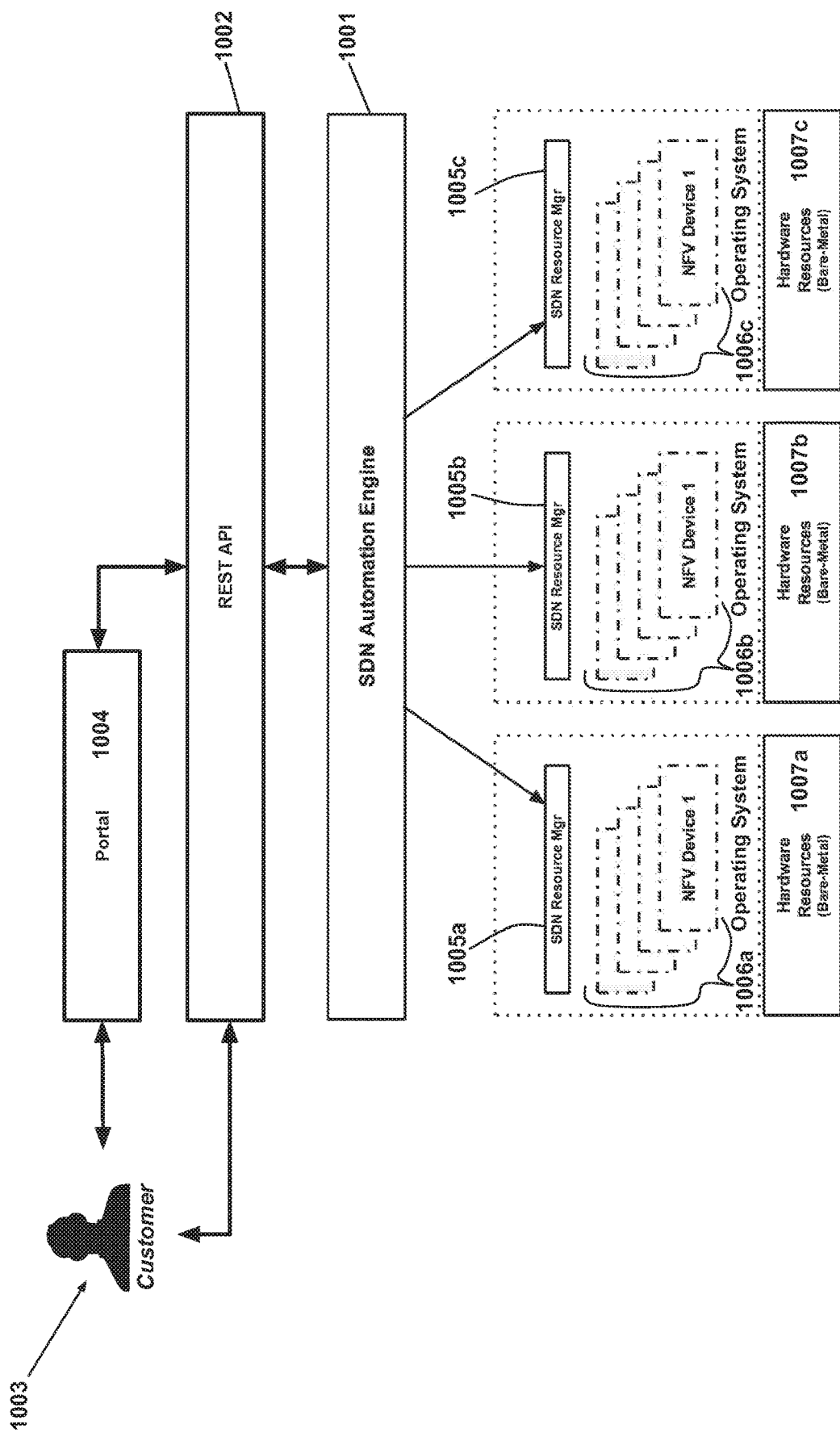
FIG. 10 is a schematic illustration of an example of a software-defined network (SDN) automation engine, according to various implementations.

FIG. 10 schematically illustrates an example of the schematics of a software-defined network (SDN) automation engine. The SDN automation engine facilitates a customer to create a software-defined network of virtual network devices (e.g., one or more virtual controllers 800 and/or one or more virtual gateways 900) on the physical infrastructure of system 300. In some implementations, the SDN automation engine 1001 makes a Representational State Transfer (REST) Application Programming Interface (API) 1002 available to a customer's application to configure a software-defined network. In some implementations, the SDN automation engine 1001 may provide a portal 1004 for a customer 1003 to configure the software-defined network. In an embodiment, the portal 1004 communicates with the SDN automation engine via the REST API 1002. When a customer configures the software-defined network, the SDN automation engine may interact with SDN resource managers 1005a, 1005b, 1005c, . . . . SDN resource managers 1005a, 1005b, 1005c, . . . run as a process on an operating system installed on the "bare-metal" hardware resources 1007a, 1007b, 1007c, . . . of a sub-zone. The sub-zone may be within a Cloud Exchange or a Cloud PoP. SDN resource managers 1005a, 1005b, 1005c, . . . (see also, e.g., FIGS. 8 and 9) instantiate and/or deploy virtual network devices 1006a, 1006b, 1006c, . . . on the hardware resources 1007a, 1007b, 1007c, . . . in the one or more Cloud PoPs and/or Cloud Exchanges. The virtual network devices 1006a, 1006b, 1006c, . . . may be cloud gateways 900, access (e.g., mobile/site) gateways 900 or cloud controllers 800.

Figure 11:
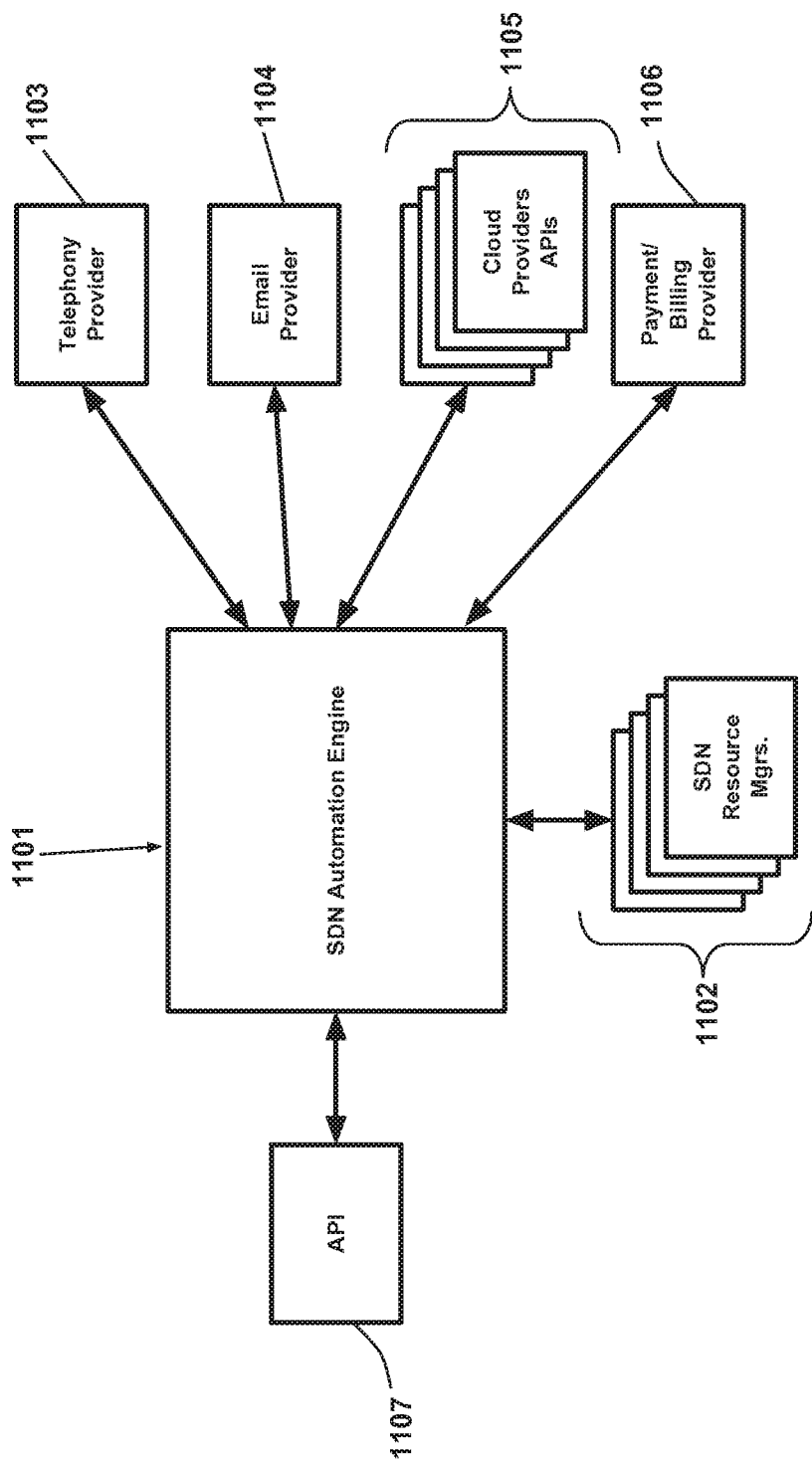
FIG. 11 is a schematic illustration of an example of modules interfacing with the SDN automation engine.

FIG. 11 schematically illustrates various entities and applications that may interface with the SDN automation engine 1101. As described above, the SDN automation engine may interface with the REST API 1107 (see REST API 1002 of FIG. 10) provided to the customer 1003 and/or the portal 1004. In some implementations, the SDN automation engine may interface with the SDN resource managers 1102 (see SDN resource managers 1005a, 1005b, 1005c, . . . of FIG. 10) to instantiate and/or deploy the virtual network devices in the software-defined network. In some implementations, the SDN automation engine 1101 may interact with various service providers, which may be third party service providers and/or separate programs that provide the respective service. In some implementations, the SDN automation engine 1101 may interact with a telephony provider 1103 for a token authentication process (a process that will be described below) and/or provide confirmation or notification messages (e.g., text messages, voice messages, etc.). In some implementations, the SDN automation engine 1101 may interact with an e-mail provider 1104 to send confirmation or notification e-mails to the customer configuring the network. In some implementations, the SDN automation engine 1101 may interact with the cloud providers' APIs 1105 to setup and manage the network traffic from the customer configured software-defined network to the cloud providers. In some implementations, the SDN automation engine 1101 may interact with a payment/billing provider 1106 to manage payment and billing matters. For example, in a pay as you go payment scheme, usage data of the system 300 is used to calculate a periodic bill to the customer. Also, the SDN automation engine may deny access to the network if, for example, the customer has been delinquent in payments despite, e.g., multiple notifications via telephone provider 1103 and/or email provider 1104.

Figure 12A:
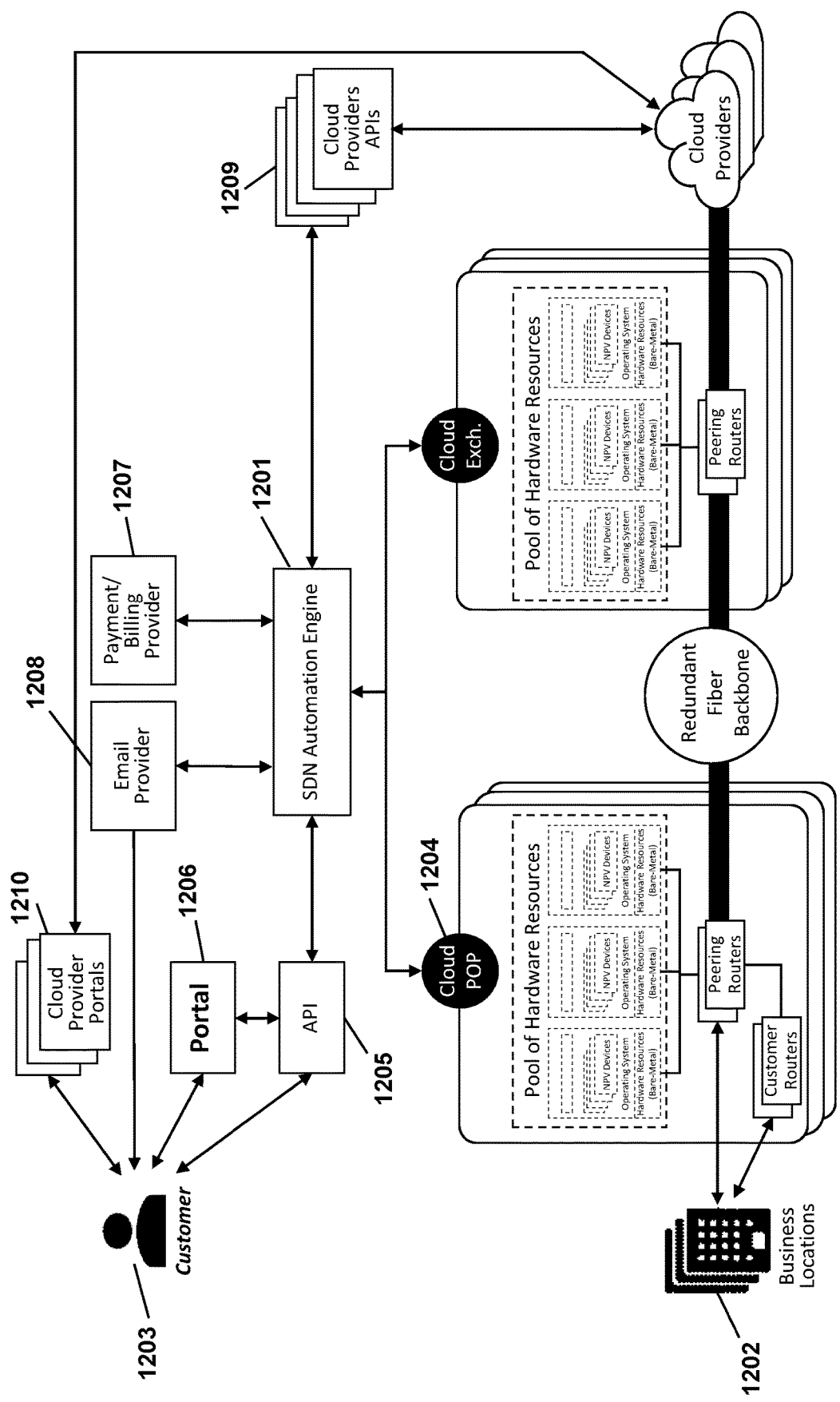
FIG. 12A is a schematic illustration of an example system to provide an on-demand deployment of a software-defined network (SDN), according to various implementations.

FIG. 12A schematically illustrates an example of the on-demand deployment of a software-defined network (SDN) using the SDN automation engine 1201. In this implementation of the system 300, the business location 1202 associated with the customer 1203 (also referred to herein as a user or system-side partner) is already connected to a Cloud PoP 1204 (e.g., by a private connection and/or by an internet connection) and the customer 1203 already has an account with the system 300 comprising one or more Cloud PoPs 1204 and one or more Cloud Exchanges. In some implementations, the customer 1203 may interact with the SDN automation engine 1201 using the provided REST API 1205. In some implementations, the customer 1203 may access a portal 1206, which may interact with the API 1205, to provide an interface for the customer 1203 to configure a software-defined network. In some implementations, the portal 1206 provides a graphical user interface (GUI) to configure the software-defined network. Whether through the portal, the API or otherwise, the customer 1203 provides the system 300 with information about the customer's one or more cloud providers (e.g., account information, network settings, etc.).

When the customer 1203 configures a network using either the portal 1206 or the API 1205, the SDN automation engine 1201 may then update the payment and billing provider 1207 with billing information (e.g., costs amount, reference number, billing address, etc.) for the configured network. In some implementations, an e-mail provider 1208 may send an acknowledgement e-mail to the customer 1203 indicating that a software-defined network has been configured. In some implementations, the SDN automation engine 1201 may communicate with the cloud providers' APIs 1209 to connect the software-defined network to one or more of the customer's cloud providers. In some implementations, the cloud provider may send a notification to the customer through the cloud provider portal 1210, i.e., the portal enabled by the cloud provider for the customer. The notification may indicate that the software-defined network is trying to connect the cloud provider. In some implementations, the customer is prompted to accept the connection, and when the customer accepts the connection, the customer is connected to the cloud provider.

In some embodiments, such as those depicted in FIGS. 12B and 12C (discussed further below), the system may include a data collection layer and an artificial intelligence (AI) layer. The data collection layer may comprise any number and type of devices and/or components, such as sensors, monitors, transceivers, scanners, hard drives, computer peripherals (e.g., keyboard, mouse, etc.), image capture devices, microphones, network switches, routers, network interfaces, storage devices (e.g., databases, memory, etc.). Collectively, these devices and components may be configured (among other things) to enable the data collection layer to monitor, collect (e.g., ingest, read, extract, receive, pull, etc.), measure, store and/or transmit real-time and historic data and information from components and/or other layers within the system (e.g., "internal data"), as well as from remote sources that are outside of the system (e.g., "external data"). In some aspects, the data collection layer may collect data and information automatically, and in some aspects, the collected data and information may be used for monitoring internal and/or external (e.g., remote) system components and other analysis. The data collection layer may also be configured for monitoring, collecting, measuring, transmitting, etc. user activity, for example, as users interact with the system's user interface, back-end services, networks, and/or any other aspects of the system. As further discussed below, the collected data may be distributed to and utilized by other components or layers of the system.

The internal data may include management plane data, data plane data, and other operational data, such as (without limitation) operational state data, configuration data, quality of service (QoS) data, light level data, network topology data, traffic routing data, packet forwarding logic, protocols, network management and orchestration data, and so on. This internal data may be collected from various internal system components such as the system's hardware resources and/or network function virtualization (NFV) devices (e.g. gateways, controllers, etc.). Other examples of internal data and/or sources thereof (e.g., whether collected and/or generated) may include:

- network switches such as interface counters (TX/RX packets, bytes, and errors), optical transceiver light levels, link status (e.g., up/down, last change time, etc.), etc.;
- virtual router virtual machines (VMs) such as VM status (e.g., up/down, uptime), VM metrics (e.g., central processing unit (CPU), memory, disk usage, etc.), interface counters (e.g., no. of packets transmitted/received, bytes, errors, etc.), broader gateway protocol (BGP) metrics (e.g., routing information base (RIB) entries, memory usage, message count, advertised/received routes, neighbor state, neighbor uptime, etc.), BFD metrics (e.g., peer state, peer uptime, etc.), etc.;
- NFV VMs such as VM status (e.g., up/down, uptime, etc.), VM metrics (e.g., CPU, memory, disk usage, etc.), interface counters (no. of TX/RX packets, bytes, etc.), etc.;
- network interface cards (NICs) on VMs (e.g., via deep packet inspection) such as number of packets scanned, number of packets matching each signature, number of packets filtered for each signature, etc.;
- (future) VPN services on VMs such as VPN tunnel status, VPN tunnel uptime, etc.;
- orchestration metrics such as request count, error count (by type), request latency (mean, percentiles), and so on, from sources such as workflow automation engines, orchestration platforms, directed acyclic graphs; and others.

In some examples, the internal data may also include data and information generated by the AI layer (discussed below). Other sources and/or types of internal data and information may include documentation, manuals, frequently-asked-questions (FAQs), user-training content, audio and/or video content, etc. that is generated, hosted and/or stored by the system. In some embodiments, business support systems (BSS), operation support systems (OSS), inventory systems, customer relationship management (CRM) systems and the like that are native/integrated into the system may also be sources of internal data and information.

The external data may include data and information collected from sources that are remote or external to the system, such as (without limitation) business support systems (BSS), operation support systems (OSS), inventory systems, customer relationship management (CRM) systems, configuration management database (CMDB) systems, user devices and systems, third party systems, external data stores and database systems, event systems, data streaming systems, message bus, data feeds, key-value stores, and the like. The types of data and information collected from these external sources may include, for example, customer order data, customer billing data, user relationship and interaction data, images, user personal identifiable information (PII) (e.g., customer name, location, employer, etc.) and other network authoritative data, configuration data relating to hardware, software, systems, facilities, personnel, etc. such as cloud onramp configuration information, routing tables (e.g., locations, latency between locations, price of connection, etc.), as well as unstructured data (e.g., provided via user devices or external systems) such as user-created documents, vendor scripting documentation, training information (e.g., service descriptions, training videos, presentations, etc.), user guides, network service requests, resolution/troubleshooting guides and documentation, communication service provider (CSP) onramp information, user configuration data, telemetry data, and so on. The external data may also include user feedback, responses, sentiments (e.g., positive or negative), input, etc. collected, for example, via user devices.

Upon collecting the various types of data from various data sources, the data collection layer may be configured to integrate any combination of collected internal and/or external data as appropriate for any number of use cases and perform any number of operations thereon. The operations may include any number of pre-processing functions such as, for example, labeling, annotating, filtering, formatting, normalizing, cleansing (e.g., removing noise, discarding corrupt, duplicate or incomplete data, etc.), scaling, resolving missing data values, performing "ETL" operations (i.e., extracting, transforming and/or loading the data from any number of sources to a data warehouse or other unified data repository), and so on, to prepare the data for use by other components or services of the system. In some aspects, the pre-processing may include monitoring the data collection layer and/or any of the pre-processing functions (e.g., labeling, annotating, etc.) to confirm compliance with business rules and metrics, to generate reports (e.g., notating non-compliance), to generate alerts (e.g., responsive to interruptions to data streams or other processing issues), etc. In some aspects, the data collection layer may be further configured to pull data that has already been pre-processed out of one or more downstream processing operations for further pre-processing. The further pre-processing may become necessary, for example, to place the data back into a form or format that is readable and/or processable. In some embodiments, the data collection layer engine may comprise a pre-processor and/or a combination of system components configured to execute pre-processing operations, while in other embodiments, the data collection layer may utilize a pre-processor device that is independent from (but in communication with) the data collection layer.

Once the collected data is pre-processed (e.g., labeled, annotated, etc.), the data collection layer may organize and store the collected data as one or more data sets (e.g., in a central repository) and/or propagate the data set(s) for use by other components (e.g., hardware and/or software) of the system. The data collection layer may also store any of the collected data prior to and/or during any of the pre-processing functions. In some aspects, the data sets may be propagated as a stream of data and/or in batch. Upon receiving the propagated data sets, the other system components may then utilize the same in order to "compute" or perform one or more system services, operations, functions, etc. For example, propagated data sets may be utilized by the AI layer for training and/or inferencing (e.g., deploying one or more machine learning models to generate actionable output, suggestions, predictions, etc.).

In some embodiments, the data collection layer may further be configured to collect and process output and/or results generated by the other system components and, in response, initiate one or more additional operations. Examples of such additional operations may include (without limitation) transmitting the output and/or results to client device(s) for rendering and/or display thereon, storing the output and/or results in a dedicated data repository, generating and transmitting notices, alerts and other communications to client device(s), triggering orchestration tasks, re-routing data transmissions within an SDN, transmitting to other system layers for processing (e.g., transmitting to AI layer for re-training machine learning models), initiating predictive maintenance routines, generating a digital twin of an SDN (e.g., to assess network performance and/or optimization scenarios), assessing energy efficiency optimization and forecasting, etc.

As noted above, the system may also comprise an AI layer. For purposes of this disclosure, the term "AI" broadly refers to artificial intelligence, and may include generative AI, machine learning (ML), and other subsets or types of AI. The AI layer may include one or more AI/ML modeling engines (collectively referred to as "AI engine" or "AI modeling engine") configured to generate, train, validate, test and/or deploy one or more combinations of AI/ML models or algorithms (collectively referred to as "AI models"). The AI modeling engine, via the AI layer, may be operatively coupled to one or more components of the system, such as the SDN automation engine, user devices, etc., and configured to receive, store and analyze data therefrom and in turn, generate instructions to cause the components of the system to initiate and execute one or more actions. In some embodiments, the AI modeling engine may also be configured to continually refine its AI models based on, for example, policies, user sentiment, network analytics, and so on (discussed below).

The type and quantity of AI models that are deployed by the system, as well as the techniques used to train and re-train such AI models, may dynamically be determined by the system according to any number of factors. That is, the system may be configured to execute code to determine, based on factors such as the particular use case or operations being performed by the AI layer, source(s), type(s) and/or availability of data, existing network or other system parameters, user preferences, weightings applied to system/user parameters, hardware capabilities and so on, whether to invoke one or more multimodal generative AI model(s), one or more supervised AI/ML models, one or more unsupervised AI/ML models, and/or any other category or type of AI models. In some instances, multiple categories or types of AI models may be invoked to collectively support or enable a particular use case and its requirements.

The multimodal generative AI category of AI models refers to a combination of models that collectively are able to process and model multiple types (or modalities) of input data (e.g., text, audio, image, etc.) in order to generate content across one or more modalities. Multimodal, in this context, refers to different types of data and content (e.g., text, image, audio, etc.). Large language models (LLMs) may be integrated or combined as part of the overall multimodal model ensemble to process or model text-based input, while other specialized models may be deployed to process or model other types of data. For example, in a use case that involves processing both text and images, one or more LLMs may be invoked to handle the text-based tasks, while other specialized models may be invoked to handle the image-related tasks. The multimodal models may also be deployed to process one type of input data or prompt to generate content or output having a different data type and/or multiple modalities (e.g., receiving audio input via a chat-bot and generating text/image based reports responsive thereto).

In some embodiments, the LLMs may comprise ensemble LLMs, which refers to the process of combining multiple individual LLMs to process text-based input and generate text-based output. Ensembling of models, including LLMs, may be used to improve the performance and accuracy of the models by leveraging the strengths of the different models. This may occur, for example, by using pairwise comparison of output, iterating through the underlying models. The output of the pairwise comparisons may be recursively compared using self-attention and intra-attention to determine superiority (e.g., to mathematically determine the highest probable outcome). In some examples, different training data sets may be utilized to further improve the performance of the models comprising ensemble LLMs.

In some embodiments, the AI layer may further implement a RAG (Retrieval-Augmented Generation) pattern, which is a technique for retrieving and providing grounding data to the LLMs from one or more external data sources. This grounding data may then be utilized by the LLMs to formulate more accurate, contextualized responses and content. Incorporating this technique also enables the AI layer to constrain its generative AI operations to an enterprise-defined corpus of content.

Thus, by combining the strengths of ensemble large language models (which excel in text understanding and generation) with the capabilities of multimodal models (which handle diverse data types) and a RAG pattern, AI layer is able to provide a broader range of information processing, generate more comprehensive and diverse content across different modalities, and provide a greater level of control over its generative AI operations. This, in turn, improves the operation and accuracy of the overall system.

Indeed, beyond using traditional user interfaces (UI) and APIs to interact with the SDN automation engine (or other components of the system at large), the AI layer may be configured to generate and support a unique conversational layer that, among other things, enables users of the system (e.g., customers, system-side partners, etc.) to interface with and control ongoing operations of the system without having to repeatedly provide input or instructions. This may include, for example, establishing static rules or parameters, such as 'if-then-else' instructions, that inform system operations upon the occurrence of one or more predetermined events. For instance, users may specify "send me a notification when traffic or capacity utilization reaches X %," "add more throughput when traffic or capacity utilization reaches Y %," and the like. In addition, the AI layer may also support dynamic or learned rules for connectivity, capacity, virtual network function throughput, partner-as-a-service connections, etc. that are user-specific (e.g., based on monitored user behavior, modeled user input/sentiments, etc.).

In some embodiments, the conversational layer may also include a real-time conversational agent (also referred to as a chat-bot) that is powered by the AI layer and comprises an automated rules engine. As discussed further below, this chat-bot may be configured, among other things, to answer and address customer configuration questions, generate layer 2 device configuration scripts, and service other types of user interactions (e.g., requests, instructions, inquiries, etc.). And since the conversational layer may be powered by the AI layer's multimodal generative AI models, user interactions with the conversational layer may include multiple forms of input (e.g., audio, video, image, text, etc.). As with other aspects of the system, components of the conversational layer may be defined by computer program instructions stored on non-transitory computer-readable medium and executed by one or more processors.

In some embodiments, the conversational layer described herein may be configured to process user input, in multiple forms (e.g., text, audio speech) and in a natural language format, and quickly return one or more responses and/or initiate one or more responsive actions. For example, in response to a real-time question or request provided via the chat-bot, the conversational layer may be configured to leverage the AI layer to interpret the question or request, access one or more system resources (and/or resource(s) external to the system) and return an answer, display information, and/or instruct one or more other components of the system to carry out one or more instructions.

In some embodiments, the processing of the user input may include converting the input into one or more commands (e.g., command line interface (CLI) commands, application program interface (API) requests, etc.). To do this, the conversational layer may invoke natural language processing (NLP) to interpret the input, and a converter to convert the interpreted input into the one or more commands. In some embodiments, the one or more commands may include network device commands, orchestration layer commands, commands for external (e.g., third party) systems or tools, and the like. In some embodiments, the one or more commands may be used to gather data or initiate changes, whether based on user/customer input or automatically by orchestration features of the system. The NLP may itself comprise executing one or more of the ensemble LLMs discussed above, for example.

In some embodiments, the conversational layer may further determine (e.g., based on results of the NLP) whether to directly process the commands, whether to transmit the commands to one or more other components of the system for processing, or a combination thereof. For example, a command to return and display information to which the conversational layer has access may be processed directly by the conversational layer. On the other hand, a command for creating or modifying a software defined network (SDN) may be transmitted to the system's SDN automation engine, for example, for further processing and execution. Notably, while the conversational layer may be utilized to invoke certain actions, such as generating notices, triggering orchestration, running scripts, etc., execution of such actions may occur within other system layers (e.g., the AI layer).

In some embodiments, the system may initiate generation of the one or more commands automatically, without receiving user input, upon the occurrence of one or more predefined events and/or the existence of one or more predefined conditions (e.g., as defined by the user and/or learned by the system, as discussed above). Such events or conditions may include surpassing a predetermined level of network traffic, loss of a communication link, user inactivity for a predetermined length of time, and so on. Examples of responsive commands may provide for generating a notice, expanding network throughput, re-routing or reconnecting a communication link, logging-off the user, etc. To do this, the system may invoke monitoring function(s) that monitor user activity, network activity, AI generated analytics, etc. The monitoring function(s) may then feed results of the monitoring to the AI layer as input, which in turn executes one or more models to determine if and when to generate or initiate the automated commands. As further discussed below, the models executed by the AI layer may be trained (and re-trained) using certain threshold parameters, weights, prior supervised examples, etc. to recognize and identify the occurrence and existence of the types of events and conditions that trigger such automated commands.

The conversational layer may also be configured to capture (e.g., directly or via the data collection layer), store and maintain user data associated with one or more customers in one or more databases. The user data may be captured while a customer is interacting with the chat-bot, for example, and it may include (without limitation) user profile data and session data. For purposes of this disclosure, the user profile data may include, for example, real-time and/or historic customer-specific data and information, such as customer name, account number, billing details, authorization level, authentication parameters, user preference data (e.g., user preference parameters), etc. As further discussed below, the user preference parameters may define (among other things) the events and conditions under which commands to automatically initiate one or more system actions may be generated.

The session data, which may pertain to customers' interactions with the system (e.g., interaction data), may include (without limitation) real-time and/or historic user input (e.g., selections, requests, queries, responses to prompts, search terms, etc.), length and/or frequency of the interactions, types of resources invoked, geo-location of the user device(s) used to access the system, type of data downloaded and/or uploaded, and so on. The session data may also include customer sentiment data, which may comprise customer input that may be indicative of a customer's reaction to system-generated answers or suggestions, system performance, etc.

In addition to multimodal generative AI model(s), the AI layer may comprise, generate, train and/or deploy other categories of models, such as those configured for supervised and/or unsupervised AI/ML, according to the particular use case and its requirements. For purposes of this disclosure, supervised AI/ML involves training models (or algorithms) using labeled datasets (e.g., input data that has been paired with desired output data), from which the models may to learn the mapping or relationship between the inputs and outputs and make predictions or classifications when presented with new, unseen data. Illustrative supervised learning tasks may include, for example, regression (i.e., predicting continuous values), decision trees e.g., for categorizing data into classes), support vector machines (SVM), k-Nearest Neighbor (kNN), neural networks, and others.

Conversely, unsupervised AI/ML refers to training models (or algorithms) using unlabeled datasets. As a result, unsupervised AI/ML identifies patterns, structures or relationships inherent to the data, without predefined labels or any output expectations. Illustrative unsupervised learning tasks may include, for example, clustering (e.g., k-means, hierarchical, density-based spatial clustering of applications with noise (DBSCAN), etc.) for grouping similar data, dimensionality reduction (i.e., extracting essential features), and others.

In some use cases, the AI layer may deploy a combination of both supervised and unsupervised AI/ML. For example, as it relates to anomaly detection (e.g., for identifying network security risks, irregularities in network traffic, fraud detection, etc.), the AI layer may deploy one or more unsupervised AI/ML clustering models (e.g., k-means, DBSCAN, etc.) to identify the anomalies, and one or more supervised AI/ML models (e.g., SVM, decision tree, line regression, etc.) to classify the anomalies. In another use case example, the AI layer may deploy one or more unsupervised AI/ML models to monitor and identify irregularities in a network, and one or more supervised AI/ML models (e.g., feed-forward deep neural network) to optimize or 'self-heal' the network across any number of parameters (e.g., location, latency, cost, etc.). In some embodiments, users may specify policy, weight and other parameter settings across any number of parameters such as latency, cost, location, etc., which could then be used by the AI layer to identify anomalies and/or irregularities, and in response, automatically adjust (e.g., optimize or self-heal) network configurations (e.g., adjust network specification parameter(s)) accordingly.

In order to train the one or more AI models described herein, the AI layer may collect (e.g., directly or through the data collection layer) historic and/or current (real-time) data and information (collectively, "training data"). The training data may originate from within the system (e.g., internal data) and/or from external data sources (e.g., external data), as discussed above. In some embodiments, the training data may also include prior (or current) output generated by one or more of the AI models themselves.

In some embodiments, the training data may have been pre-processed, which may include (among others) removing duplicates, removing corrupted data, labeling, annotating, filtering, formatting, normalizing, etc., as discussed above. In some embodiments, portions of the training data may undergo additional pre-processing, and in some embodiments, portions of the training data may be utilized as collected-without pre-processing. In some embodiments, the training data may also be converted into a format that the AI models can understand and process effectively.

Once the training data is pre-processed (if necessary), converted (if necessary), or otherwise made available, the AI/ML modeling engines may utilize the training data to train respective AI models. For example, as it pertains to training the multimodal generative AI/ML models, a text based corpus of content relating to system services and capabilities, user-based SDN configuration data and parameters, network traffic metrics, monitored user activity, etc. may be utilized; and as it pertains to training the supervised and/or unsupervised AI/ML models, management plane data, data plane data, and other operational data, as well as OSS and BSS system-related data, may be utilized.

In some embodiments, generating a training dataset from among the training data may include dividing the training data into multiple datasets, each dataset for use in training, validating and/or testing the respective AI models. For example, a first portion of the training data may be utilized to create a training dataset. This training dataset may then be fed into one or more of the AI models to identify patterns and relationships in the training data by solving one or more objective functions, where each objective function may comprise one or more parameters. The patterns and relationships identified during training may include, for example, user tendencies, network tendencies, interdependencies between variables, user sentiment (e.g., to AI generated output), user preferences, and the like.

A second portion of the training data may be utilized to create a validation data set, which may then be used to measure a performance of the respective AI models according to one or more performance metrics. That is, output generated by the respective AI models during training may be measured against the validation data set for accuracy (or any other performance metric). If the measured performance is unsatisfactory, one or more parameters of the objective function(s) may be adjusted and the performance re-measured. This process may be iterative and continue until the performance is deemed satisfactory (e.g., meets or exceeds the one or more performance metrics).

Following training, a third portion of the training data may be utilized to create a test dataset to test the respective AI models. This may include, for example, applying a trained model to a simulated environment and/or dataset, and measuring its effectiveness in one or more scenarios in view of the training dataset.

In some embodiments, the testing data may comprise bulk testing data. Bulk testing data may be utilized to test a large foundational model's ability to generate fine-tuned and very specific output. For example, in the case of a multimodal generative AI/ML model that is used to power a real-time conversational agent (e.g., a chat-bot), the bulk testing data may comprise a list of questions expected to be received via the chat-bot, together with a list of corresponding "ground truth" answers. The ground truth answers may represent accurate and precise answers to each of the expected questions, and as such, may serve as a reference for evaluating the accuracy and precision of the model's answers. The bulk testing data may also include links to one or more external data sources or authoritative knowledge bases (e.g., external documentation, user manuals, reports, etc.) from which answers to the expected questions may be captured. Inclusion of such links enables the model to utilize a RAG pattern to reference the external data source(s) or authoritative knowledge base(s)—that reside outside of the model's training data sources—in order to generate more accurate or fine-tuned responses.

The trained, validated and/or tested AI models may then be deployed to achieve their respective and/or collective objectives. As noted above, example objectives (or use cases) for the generative AI/ML models may include deploying a real-time conversational agent (or chat-bot) that enables a user to use/input natural language to request a type of data, report, visualization, etc., enabling multimodal user interactions with the system, establishing or learning rules for connection, capacity, virtual network function throughput, partner-as-a-service connection, etc.; and for supervised/unsupervised AI/ML models, objectives (or use cases) may include security-related behavior monitoring to identify anomalies in traffic patterns, combining EVPL (Ethernet virtual private line) circuits across multiple parameters (e.g., performance, price, distance, etc.) to optimize or 'self-heal' networks, and so on.

Results or output of the AI models may then be presented to a user (e.g. via an interactive GUI on the user's device), together with alerts, notifications, electronic documents, etc. In some embodiments, the user may submit (e.g., via the user's device) input to the system that is responsive to the AI model-generated results or output. The responsive input may include, for example, natural language text, binary feedback (e.g., thumbs up vs. thumbs down), or other forms of sentiment or reactionary input. This sentiment or reactionary data may then itself be modeled (e.g., via one or more AI models) and/or utilized to create one or more new training datasets. The new training datasets may comprise a combination of current and/or historic sentiment/reactionary data, and one or more of the training datasets previously utilized to train the AI models. In some embodiments, the sentiment/reactionary data may be combined with historic training data, historic sentiment/reactionary data, and/or additional current (real-time) and/or historic data to create a new corpus of training data, which may then be utilized (e.g., divided) to create the new training datasets, new validation datasets and/or new testing data sets. The new training datasets may then be utilized to re-train and/or otherwise update the AI models, as discussed above. In some embodiments, the RAG pattern may retrieve the sentiment/reactionary data from the responsive input, for use in creating the new training datasets. In some embodiments, the new training datasets may be utilized as part of RAG data training, to add new indexed data. For example, in the case of a large foundational model (e.g., multimodal generative AI/ML model that includes an LLM), this may include building an index of internal data and loading it to a vector database. Then, when the LLM is prompted, it may query both the vector database and the large foundational model. In this manner, the vector data grounds the foundational model to enable it to provide fine-tuned and specific answers, based in part on internal data (e.g., as internal data may be given more weight).

In some embodiments, execution/deployment of one or more of the AI models may be automatic and absent any user input. This may include for example, responsive to output generated by one or more AI models, results of advanced analytics (e.g., pattern matching, forecasting, sentiment analysis, simulations, data mining, etc.) meeting or exceeding one or more pre-determined thresholds (e.g., associated with a customized, on-demand SDN), upon detecting changes in data and information collected by the data collection layer, upon detecting changes to one or more rules and policies (e.g., from the policy layer 1221, discussed below), according to a predetermined schedule, upon an occurrence of one or more predefined events (e.g., a security breach, network latency reaching a predetermined threshold, network connection failure, etc.), and so on. In some embodiments, execution of AI models may be user-initiated, such as in response to user commands and/or input (e.g., via a user device).

As noted above, input to the AI models may include, without limit, real-time (current) and historic data and information from among the system's internal components or layers (e.g., data repositories, data collection layer, output from other AI models, etc.), sources external to the system, (e.g., user devices, independent data sources, etc.), or a combination thereof.

In some embodiments, performance of deployed AI models may be evaluated over time. Then, depending on the performance evaluation, the AI/ML modeling engine(s) may update and/or re-train one or more of the AI models, as discussed above. The performance of the AI models may comprise a measure of one or more performance metrics (e.g., accuracy, pre-approval rate, acceptance rate, sentiment, etc.).

Figure 12B:
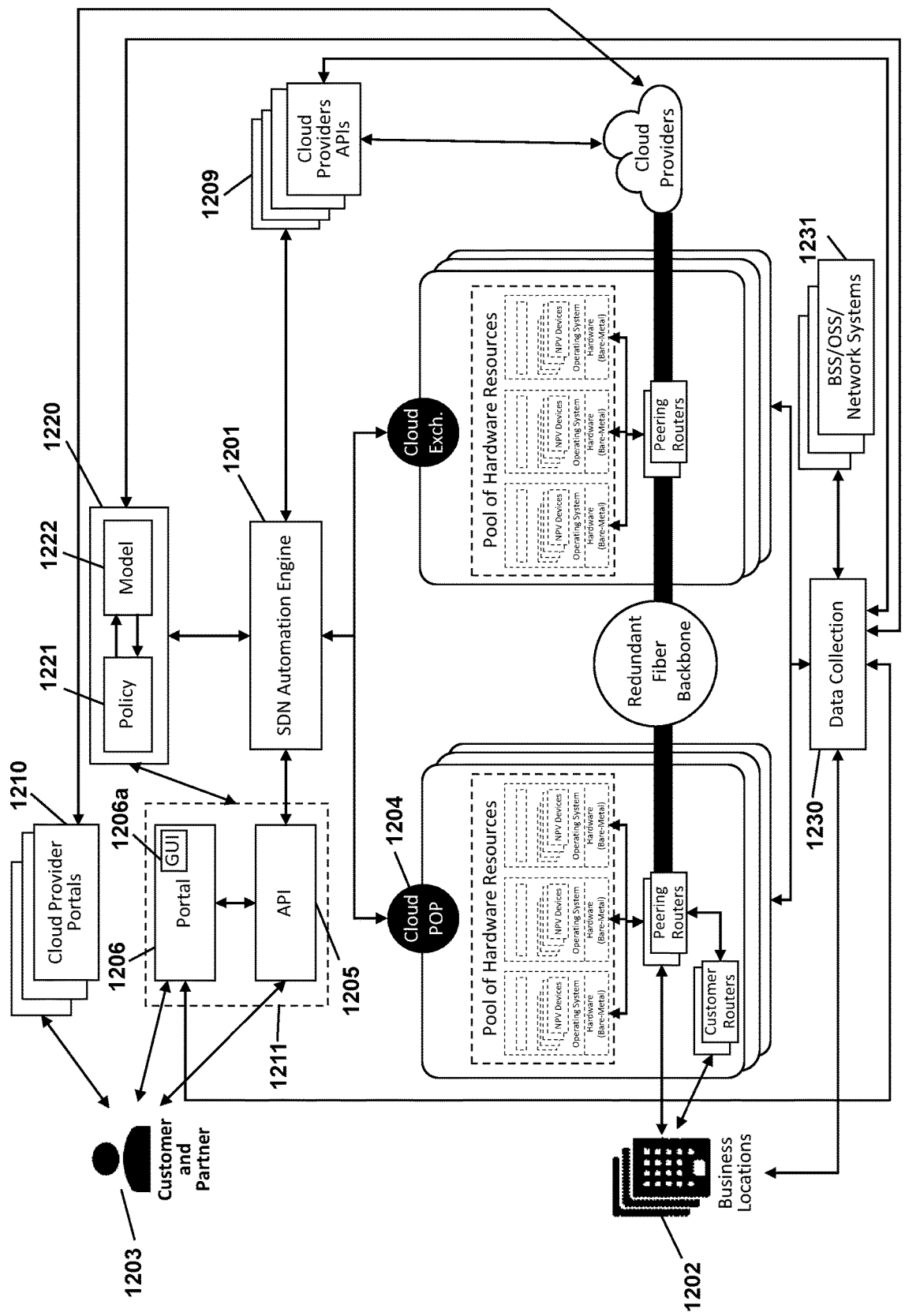
FIG. 12B is a schematic illustration of an alternate example system to provide an on-demand deployment of a software-defined network (SDN), according to various implementations.
Figure 12C:
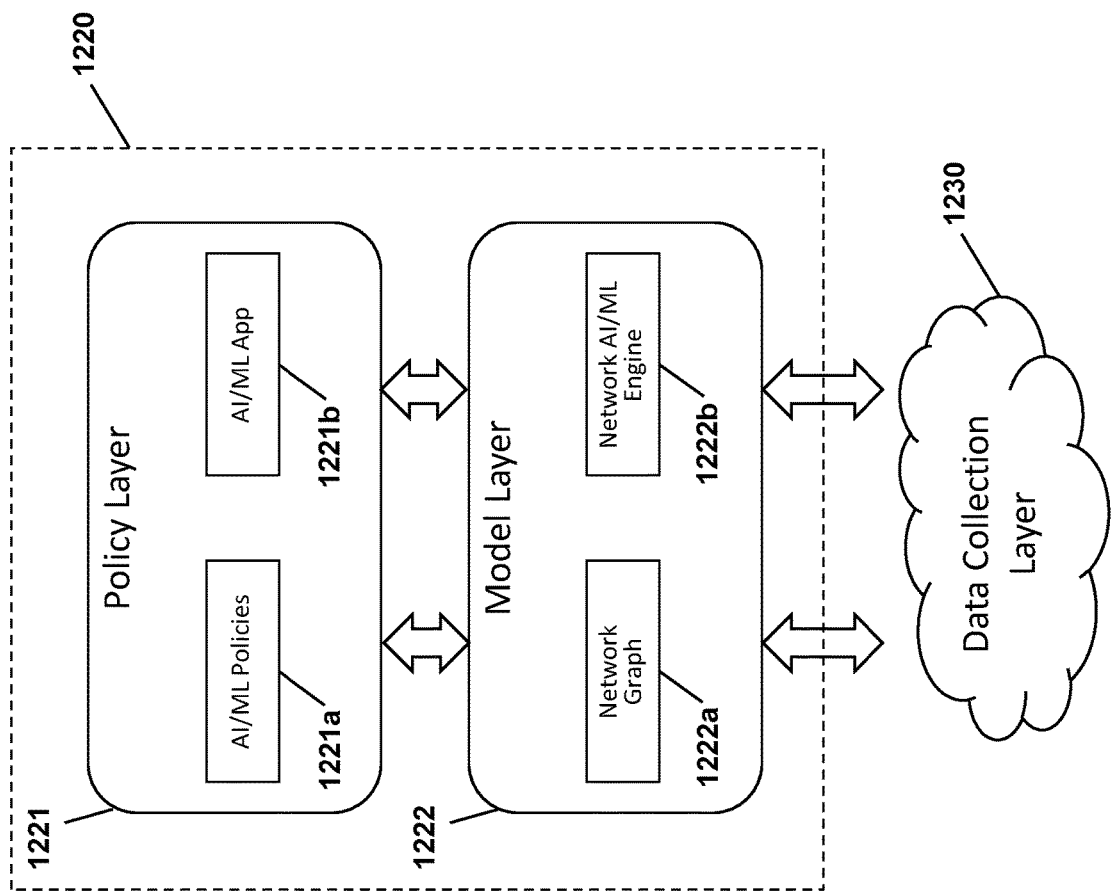
FIG. 12C is a schematic illustration of an example artificial intelligence (AI) layer of the example system of FIG. 12B, and its corresponding policy and model sub-layers, according to various implementations.

Turning now to FIG. 12B, a schematic illustration of an alternate, exemplary artificial-intelligence (AI) driven implementation of the system described herein, configured for (among other things) on-demand deployments of SDNs, is shown. Elements or components (and their respective operations) shown in FIG. 12B that are common across FIG.

12A and FIG. 12C (discussed below) are identified using the same reference numerals or labels to maintain consistency and aid in understanding the relationships between various aspects of this exemplary deployment. And while FIG. 12B may not depict one or more elements shown in FIG. 12A (e.g., an email provider 1208, a payment/billing provider 1207), those components may nonetheless exist in this or other implementations of the system 300.

In the exemplary implementation depicted in FIG. 12B, an AI layer 1220 and data collection layer 1230 have been incorporated into the system 300. The AI layer 1220 is shown operatively coupled (e.g., in two-way communication) to the SDN automation engine 1201, the API 1205 and the data collection layer 1230, so as to collect data and information therefrom and/or provide data and information thereto.

Similarly, the data collection layer 1230 is shown operatively coupled (directly or indirectly) to the various sources of internal data (e.g., AI layer 1220, cloud PoP 1204, SDN automation engine 1201, etc.), as well as various sources of external data (e.g., BSS/OSS/network systems 1231, business locations 1202, user devices via the portal 1206, cloud provider APIs 1209, etc.). As previously discussed, the data collection layer 1230 may collect and contain internal and external data, including digital representations of physical and virtual optical networks, configurations, site-specific information, customer information, and so on.

In this example, the AI layer 1220 has already been deployed to generate a real-time conversational agent (e.g., a chat-bot) through which a user (e.g., customer or system-side partner) 1203 may interact with the SDN automation engine 1201. This chat-bot may be a part of the system's conversational layer 1211, as discussed above. As noted above, the portal 1206 may interact with the API 1205 to provide an interface for the user 1203 to configure a customized SDN. The portal 1206 may also be configured to provide an interactive GUI 1206a through which the user 1203 may submit information to configure the customized SDN. It is through this interactive GUI 1206a that the user 1203 may access and interact with the chat-bot generated by the AI layer 1220.

The AI layer 1220 in this example may include sub-layers, such as a policy layer 1221 and a model layer 1222, each in two-way communication with the other. Turning now to FIG. 12C, a detailed illustration of the AI layer 1220, and its corresponding policy 1221 and model 1222 sub-layers, is shown. FIG. 12C also shows the AI layer's 1220 interaction with the data collection layer 1230. The model layer 1222 may provide an AI/ML-enabled framework for generating, training (and re-training), storing and deploying any combination of AI models described herein. Indeed, the model layer 1222 may include a model library for storing, maintaining and providing access to various combinations of AI model implementations, as applicable for any number of use cases. The model layer 1222 may also include one or more AI modeling engines, which may include a network AI/ML engine 1222b to provide the runtime environment for the execution of AI models. In some embodiments, the model layer 1222 may include a network graph 1222a, which represents a graph-based representation of a network, enabling graph-based AI/ML by combining graph analytics and artificial intelligence/machine learning.

The policy layer 1221 may comprise AI/ML policies 1221a and AI/ML applications and/or extensions 1221b to existing modules or system components, through which AI models may be executed. Policy data from the AI/ML policies 1221a may be used to supplement other AI model input (e.g., features, parameters, etc.) prior to deployment of the AI models, and execution of the AI models may occur through the AI/ML-based applications and/or extensions 1221b. For example, in a use case directed to self-optimizing a SDN network, trained AI models may use inputs from the policy layer 1221 to adjust model weights in order to comply with a policy that prioritizes cost over performance and/or location in a virtual connection. The model layer 1222 may in turn provide a runtime environment within which the AI models may be executed. In some embodiments, the policies may be user-defined, system-defined or a combination thereof. For example, a user-defined policy may be based on user-defined parameters, such that adjustments to model weights may be initiated to comply with the user-defined policy. In another example, the system may infer a policy based on prior user interactions or tendencies. Output generated by the AL models (adjusted according to optimization policies) may then be used in topology discovery, routing calculations, bandwidth allocation, intelligent allocation of services, service re-routing, service distribution predictions, fault predictions, resource adjustments, etc.

Returning now to FIG. 12B, an illustrative use case for generating a customized, on-demand SDN, and related operations, involving the AI layer 1220 and data collection layer 1230. To be clear, this illustrative use case is non-limiting. To the contrary, as discussed elsewhere herein, the AI layer 1220 and data collection layer 1230 enable the system 300 to implement any number of use case scenarios, such as anomaly detection, network self-optimization, and so on, one or more of which may be implemented in combination with the example use case discussed below.

As noted above, the user (e.g., customer or partner) 1203 may view and interact with the chat-bot via the interactive GUI 1206a that is made accessible through the system's portal 1206. The interactive GUI 1206a may be transmitted to the customer's user device (not shown in FIG. 12B) for rendering thereon, or the system 300 may generate and render the interactive GUI 1206a and transmit the rendered interactive GUI 1206a to the user device for display thereon.

Once the user 1203 has access to the chat-bot, the user 1203 may provide input (via the chat-bot) using one or more data formats (or modes), such as text, audio, video, machine readable code (e.g., barcode, QR code, etc.), etc., and the input may be provided via any suitable means, such as via a keyboard, a touch screen, voice recognition device, etc. In this example, the user 1203 provides input in a natural language format. As noted above, the input may include a combination of questions, requests, instructions, etc.

In some embodiments, the input may include a request to create a customized, on-demand SDN and one or more of its resources (e.g., one or more virtual network devices of the customer's SDN), together with one or more corresponding network specification parameters. The network specification parameters may include, without limitation, one or more of bandwidth, static/dynamic configurations, speed, internet protocol (IP) addresses (e.g., local, peer, etc.), autonomous system numbers (ASNs), gateway protocols (e.g., border gateway protocol (BGP)), VLAN (virtual local area network) details, user site location, cloud PoP information, user site equipment information, user site connection information, network topology information of the one or more virtual devices, static rules, etc.

Continuing with this example, upon receiving the input comprising a request to create a customized, on-demand SDN and one or more of its resources, the AI layer 1220 may be invoked to convert the input into one or more commands that include the network specification parameters. These commands may then be transmitted to and received by the SDN automation engine for further processing. The further processing by the SDN automation engine may include: allocating, from among a pool of system device resources, one or more virtual networking devices, configuring the allocated virtual networking device(s) specifically for the customized, on-demand SDN that complies with the network specification parameters, and instantiating and deploying the specifically-configured virtual networking device(s) to generate the customized, on-demand SDN.

As noted above, the AI layer 1220 may be configured to receive or otherwise capture, from the data collection layer 1230 or directly, network data that is associated with the customized, on-demand SDN network. In some embodiments, the network data may include, without limitation, a combination of real-time and historic traffic data, SDN performance data, SDN utilization data, cloud provider performance data, cloud service usage data, SDN capacity data, user-sentiment data, user-interaction data, and the like. In addition, the network data may comprise a combination of real-time and historic data and information associated with one or more other customized, on-demand SDNs generated by the system 300, and real-time and historic data and information associated with one or more external networks (e.g., networks generated outside of the system 300).

Upon receiving or capturing the network data, the AI layer 1220 may be further configured to integrate the network data with user data and/or the one or more commands to create modeling input. In some embodiments, the integration may involve ETL (extract, transform, and load) functionality, which may include combining the multiple types of data from multiple sources into a large, central repository (e.g., a data warehouse). The ETL functionality may include implementing a set of rules to clean and organize the data and prepare it for storage, data analytics, and/or machine learning. In some embodiments, the modeling input may further include policy data 1221a from the policy layer 1221 (see FIG. 12C), performance data (e.g., latency data, packet loss data, etc.), geolocation data, data defining bandwidth capacity between connected devices, connection pricing data, inventory data, security data (e.g., malware detection data, phishing attempts, data relating to external threats/attacks, etc.), inventory data (e.g., availability/forecasting data, service level agreement (SLA)/quality of service (QoS) metrics (e.g., for generating alerts or other notices), and so on. In some embodiments, portions or all of the data integration and/or ETL functionality may be executed by the data collection layer (as discussed above) and then provided to the AI layer 1220 for modeling.

The AI modeling engine 1222b (see FIG. 12C, model layer 1222) may then model the modeling input by deploying one or more AI models to generate network analytics. The network analytics may then be analyzed, for example, by comparing to one or more predetermined parameters and/or thresholds, and in response to the analysis, the AI modeling engine 1222b may be further configured to initiate one or more actions. For example, in the case of optimizing or 'self-healing' a network, analyzing the network analytics may involve comparing an "as-is" network state to a potential "to-be" network state, using user-specified parameters (e.g., cost, latency, location, etc.) to determine if any changes or actions could be initiated to better align with the user-specified parameters. In this example, the "as-is" network state may be based on factors such as current network performance, current prices, available locations, etc., and the "to-be" network state may be a virtual or simulated model that may be used to assess the viability and impact of making changes to the "as-is" network state. In some embodiments, the actions that may be initiated may include (among others) generating one or more of advisory notices, suggested actions, predictions, alerts, etc., some of which may be displayed to the user 1203 via the interactive GUI 1206a. In some embodiments, the user 1203 may initiate changes (or take other actions) responsive to the alerts, suggested actions, etc., while in other embodiments, the user 1203 may elect for the changes/other actions to be automated (discussed below). Suggested actions may refer to actions that the AI modeling engine 1222b determines and proposes to the user 1203, but that may not be initiated unless and until a confirmation indication (e.g., confirmation command) is received from the customer's device.

In addition, the AI modeling engine 1222b may initiate automated actions (e.g., by generating and transmitting one or more instructions) that may be executed automatically by the AI modeling engine 1222b itself, by one or more other components of the system 300 and/or by one or more other systems and/or devices that are external to the system. One such external system or device may include a modeler that may be invoked by the AI modeling engine to create digital representations of environments to simulate network connectivity and performance, for example. Another example may include a global portal that may be invoked to enable users to interact with system services. Automated actions, in this context, may refer to actions that are initiated automatically, with no need of a confirmation command. In some embodiments, upon initiating one or more automated actions, the AI modeling engine 1222b may also generate one or more action notices relating to the automated actions for display via the interactive GUI 1206a.

To illustrate, the AI modeling engine 1222b may, in some embodiments, generate one or more advisory notices to advise the user 1203 as to a status of one or more aspects (e.g., performance, cost, etc.) of the customer's customized, on-demand SDN. An advisory status notice may include, for example, a status of one or more connections within the customer's SDN, a status of network traffic, a customer's billing status, etc. Responsive to that status notice, the AI modeling engine 1222b may also generate and display one or more suggested actions and/or initiate one or more automated actions if, for example, the status falls below a pre-determined threshold. For example, if the status relates to network connections and/or network traffic, the suggested and/or automated actions may relate to (without limitation) adjusting network specification parameters, replacing one or more cloud services in the customer's SDN with one or more (similar) services, re-establishing and/or rerouting one or more network connections (e.g., responsive to a connection failure and/or poor network performance), controlling bandwidth of one or more SDNs so as to optimize performance, or any other action for improving network performance. Similarly, if the status relates to the customer's billing status, the suggested and/or automated actions may relate to granting/denying access to one or more cloud services, determining payment risk, limiting payment options, and the like.

In some embodiments, the customer's user preference parameters, whether entered into the system 300 as user input and/or captured by the system (e.g., monitored during one or more customer interactions), may be used to control the types of actions and/or the circumstances under which the AI modeling engine 1222b, the AI layer 1220 more broadly, and/or other components of the system 300 may automatically initiate action. For example, the user preference parameters may define a type and frequency of advisory notices to generate and display, a type and frequency of statuses that may be displayed and/or that may trigger the one or more actions, types of actions that may be triggered automatically, a type and frequency of automated actions that may be initiated without a confirmation, and so on. In practice, the user preference parameters may be used by the user 1203, for example, to specify and/or prioritize available actions that the system 300 may initiate. For example, some customers may prefer that the system 300 automatically establish a new communications link if an existing link goes down; while other customers may prefer to be notified before establishing any new communications links.

In some embodiments, the system 300 may further be configured to receive additional input that is responsive to the advisory notices, suggested actions, automated actions, and/or action notices generated or initiated by the AI modeling engine 1222b and/or displayed via the interactive GUI 1206a. This additional input may include, for example, sentiment/reactionary input, confirmation indications, further requests and/or inquiries, modifications to the suggested actions, etc. As indicated above, this additional input may then be processed by the AI layer 1220, which may involve, for example, creating new training datasets (e.g., to account for the sentiment/reactionary input), converting the additional input into one or more additional commands and transmitting the additional commands directly to the AI modeling engine 1222b (or other system components) for further processing, and so on. In some embodiments, these additional commands may include, for example, a confirmation command, a stop-action command, a new-action command, and so on. A confirmation command may refer to a command that confirms to the AI modeling engine 1222b that one or more of its suggested actions may be initiated. A stop-action command may refer to a command that instructs the AI modeling engine to cease and/or refrain from initiating one or more of the AI modeling engine's automated actions. A new-action command may refer to a command that instructs the AI modeling engine to initiate one or more new actions that was neither suggested nor automatically initiated by the AI modeling engine. In some embodiments, a new-action command may include a command for the system to return to a previous state.

Figure 13:
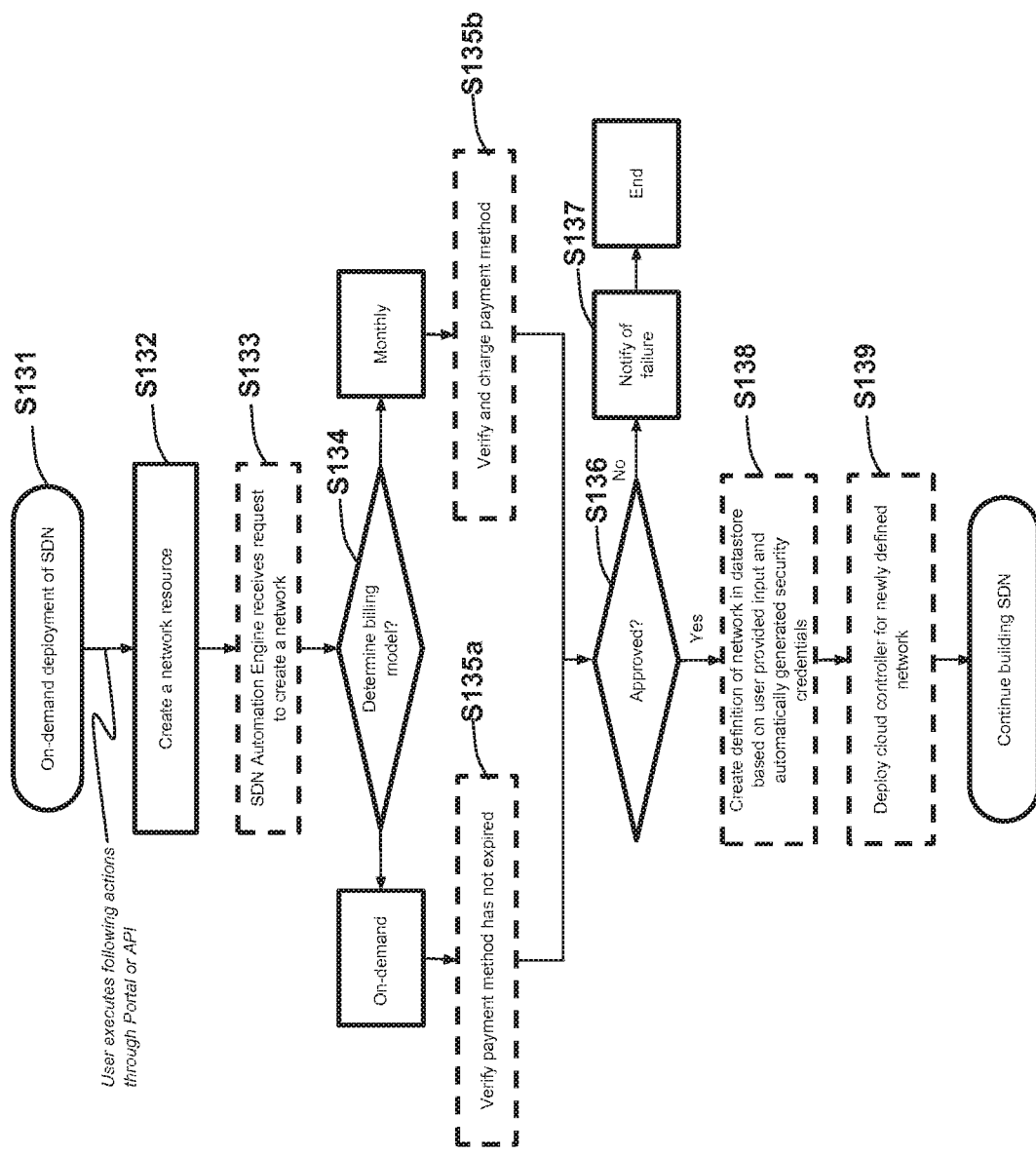
FIG. 13 is a schematic illustration of an example process to create a software-defined network (SDN), according to various implementations.

FIG. 13 schematically illustrates an example of a process to configure a software-defined network (SDN) S131. In step S132, the customer may access the API or the portal to request creation of a SDN network on system 300 and creation of one or more of its resources (e.g., one or more virtual network devices of the customer's SDN). In step S133, the SDN automation engine may receive the request to create the network comprising a SDN network resource. In step S134, the SDN automation engine may determine a billing model as per the customer's request, and interacts with the payment/billing provider (FIG. 11: 1106). In some implementations, the billing may be selected or defined as pay-as-you-go/on-demand for the deployment and use of the network, which billing may be checked for validity in terms of availability to the customer, sufficiency of payment method, etc. at step S135a. In some implementations, the billing may be selected or defined as a monthly charge for the deployment and use of the network, for which the payment method may be checked for validity in terms of availability to the customer, sufficiency of payment method, etc. at step S135b and may be charged or billed where applicable at step S135b. If the payment method in step S135a or the payment in step S135b is not approved, the customer may be notified of the failure in step S137 and further processing may be stopped. If the payment method is valid or the payment goes through, the system may proceed to step S138 where a network definition may be created in the system datastore based on the customer provided inputs and automatically generate security credentials. Then, in step S139, a cloud controller may be deployed for the newly defined network.

Figure 14:
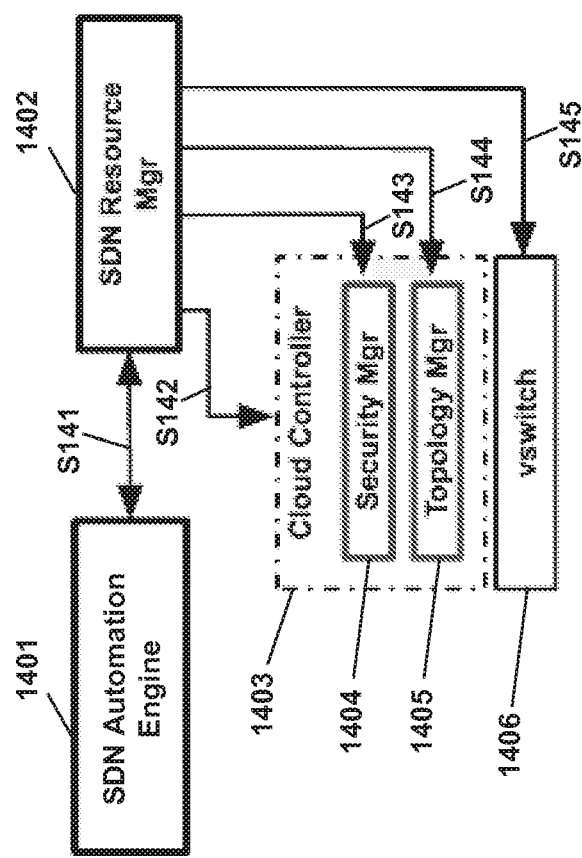
FIG. 14 is a schematic illustration of an example of interactions of various modules of the system to create a software-defined network (SDN), according to various implementations.

FIG. 14 schematically illustrates an example of interactions of various modules of the system to create a software-defined network (SDN). In step S141, the SDN automation engine 1401 may select an appropriate SDN resource manager 1402 and may send it a cloud controller resource control message after which the SDN resource manager 1402 may acknowledge receipt of the control message. In step S142, the SDN resource manager 1402 may allocate a cloud controller 1403 from the pool of device resources (e.g., a pool of cloud controllers) and may configure it for the specific customer network. In step S143, the SDN resource manager 1402 may configure the security manager 1404 with a network specific ID and credentials (e.g. one or more keys). In step S144, the SDN resource manager 1402 may configure the topology manager 1405 with a network specific ID and one or more logical network interfaces. In step S145, the SDN resource manager 1402 may configure the virtual switch 1406 by allocating the VLAN, virtual port, and port bandwidth used by the topology manager 1405's one or more logical network interfaces.

Figure 15:
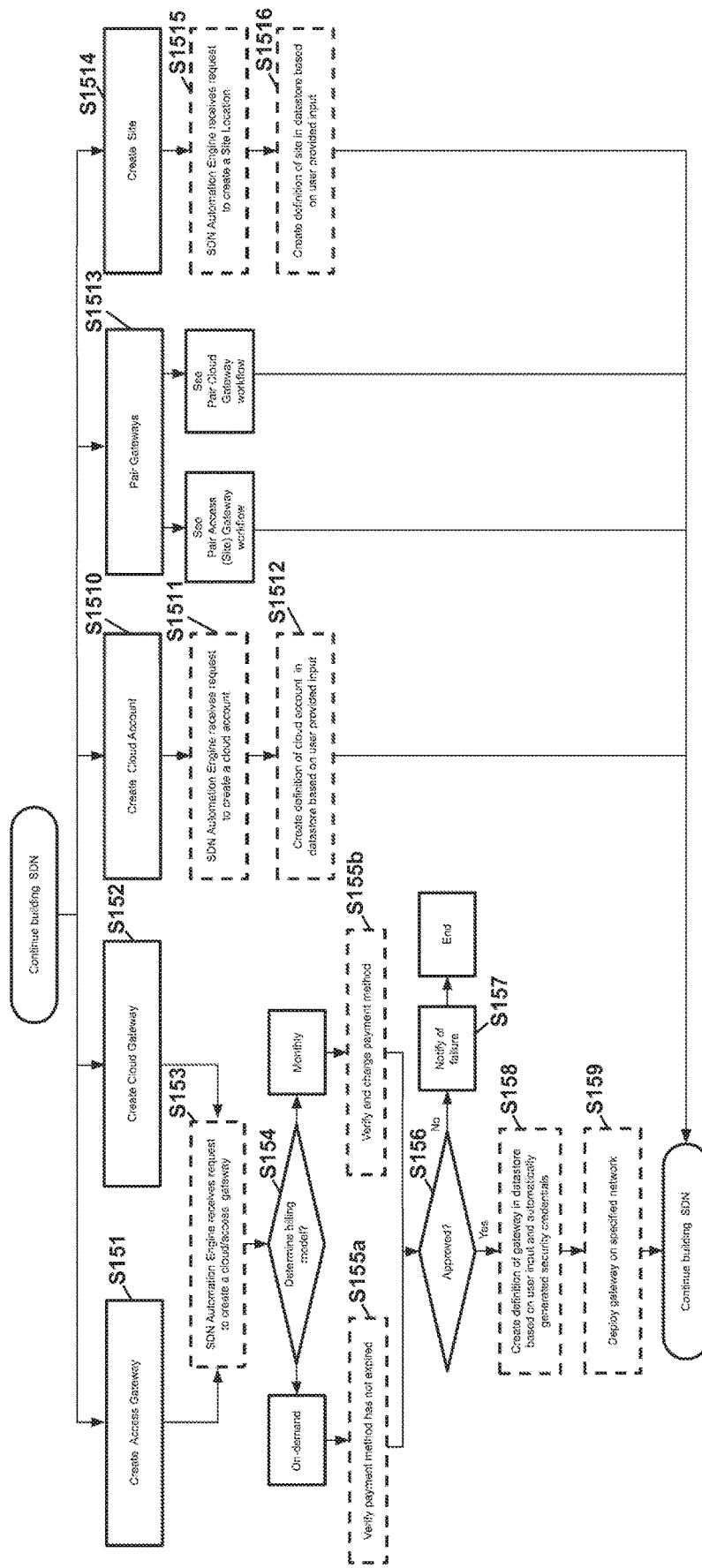
FIG. 15 is a schematic illustration of an example process to create virtual gateways, cloud accounts and sites, according to various implementations.

FIG. 15 schematically illustrates an example of processes to create and deploy various components of a software-defined network (SDN). In some embodiments, processes of creating an access gateway (FIG. 3: 308b) and a cloud gateway (FIG. 3: 308a, 308c) may be similar. In some embodiments, the access gateway resides at a Cloud PoP and the cloud gateway resides at a Cloud Exchange. In an embodiment, the access gateway may be a mobile gateway that connects to one or more customer devices (e.g., smartphones, laptops, etc.) away from the customer site or a site gateway that connects to a customer's site.

In some embodiments, the customer may request an access gateway in step S151 or may request a cloud gateway in step S152. In step S153 the SDN automation engine receives the request to create an access gateway or a cloud gateway. In step S154, the SDN automation engine determines a billing model (e.g., as selected by the customer), and interacts with the payment/billing provider (FIG. 11: 1106). In some implementations, the billing may be pay-as-you-go/on-demand, for which the billing (e.g., payment method) may be checked for validity and/or charged at step S155a. In some implementations, the customer may pay a monthly charge for the deployment of the network, for which the billing (e.g. payment method) may be checked for validity and/or charged at step S155b. If the payment arrangement in step S155a or in step S155b is not approved, the customer may be notified of the failure in step S157 and further processing may be stopped. If the payment arrangement is valid, the system may proceed to step S158 where the definition of a cloud or access gateway may be created in the datastore based on the customer's input and automatically generate security credentials therefor. In step S159, the cloud or access gateway may be deployed on a specified network.

In some implementations, the system may facilitate customers to create cloud accounts with the system 300 and/or their respective cloud providers. In step S1510, a customer may put in a request to create a cloud account through the API or the portal. In step S1511, the SDN automation engine may receive the request to create the cloud account. In step S1512 the SDN automation engine may create a definition of the cloud account in the datastore based on the user provided input.

In some implementations, the system may facilitate the customers to create a site location. A site location may be the network definition of the customer's equipment at a particular location to be connected to the system 300 and may include a specification of a Cloud PoP to which the customer wants to connect the customer's equipment. In step S1514, the customer may put in a request to create a site location. In step S1515, the SDN automation engine receives the request to create the site location. Then, in step S1516, the SDN automation engine creates a definition of the site in a datastore based on the customer provided input.

In some implementations, the system may facilitate the customer to pair an access gateway to the customer's site location and/or pair a cloud gateway to a customer's cloud provider at step S1513. The details of the pairing as described further below.

Figure 16:
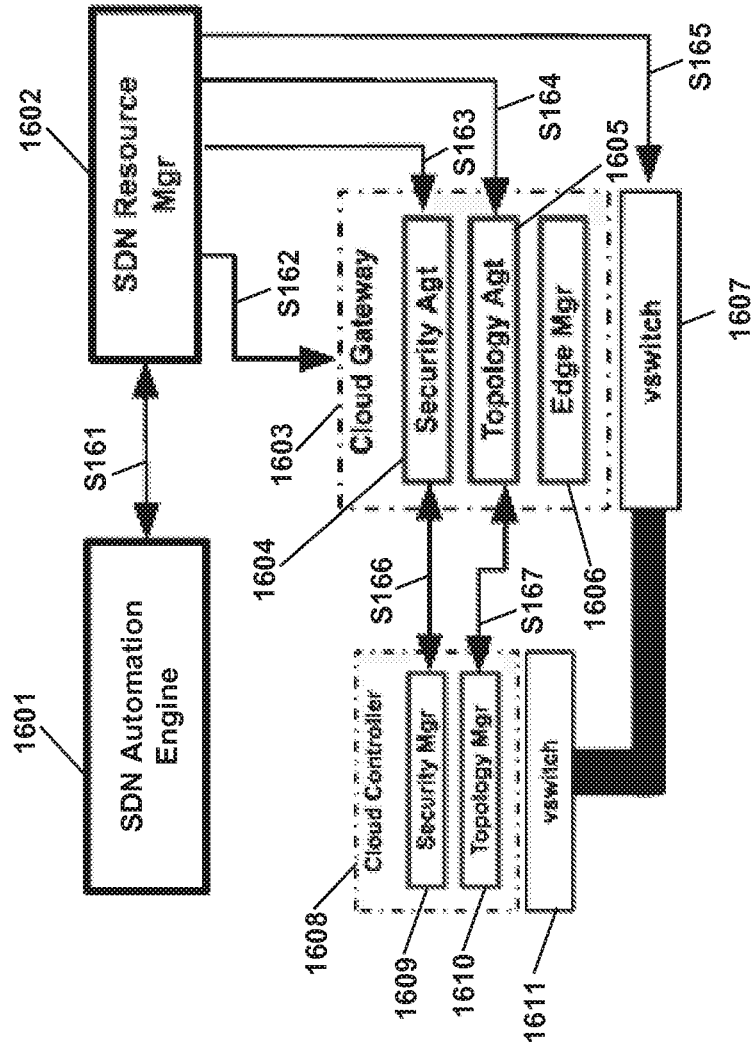
FIG. 16 is a schematic illustration of an example of interactions between various modules of the system to add a new device to the software-defined network (SDN), according to various implementations.

FIG. 16 schematically illustrates an example of interactions between various modules of the system to add a new device to the software-defined network (SDN). In some implementations, the new device is an access gateway. In some implementations, the new device is a cloud gateway.

In step S161, the SDN automation engine 1601 may select an appropriate SDN resource manager 1602 and may send it a create gateway resource control message, after which the SDN resource manager 1602 may acknowledge the receipt of the control message. In step S162, the SDN resource manager 1602 may allocate a gateway resource 1603 from the pool of device resources (e.g., a pool of gateways) and may configure it for the specific customer network. In step S163, the SDN resource manager 1602 may configure the security agent 1604 of the gateway 1603 of the specific customer network with a network specific ID and credentials (e.g., one or more keys). In step S164, the SDN resource manager 1602 may configure the topology agent 1605 of the gateway 1603 of the specific customer network with the network specific ID and one or more logical network interfaces. In step S165, the SDN resource manager 1602 may configure the virtual switch 1607 by allocating the gateway the vlan, virtual port, and port bandwidth size used by the topology agent 1605's one or more logical interfaces. In step S166, the security agent 1604 of the newly added gateway 1603 may attempt to join the network specified by the network ID and the credentials provided. If the provided credentials are valid, the cloud controller security manager 1609 adds the gateway 1603 to the network and updates the topology manager 1610. In step S167, the topology agent 1605 may attempt to establish a secure connection with the topology manager 1610 at the controller 1608.

Figure 17:
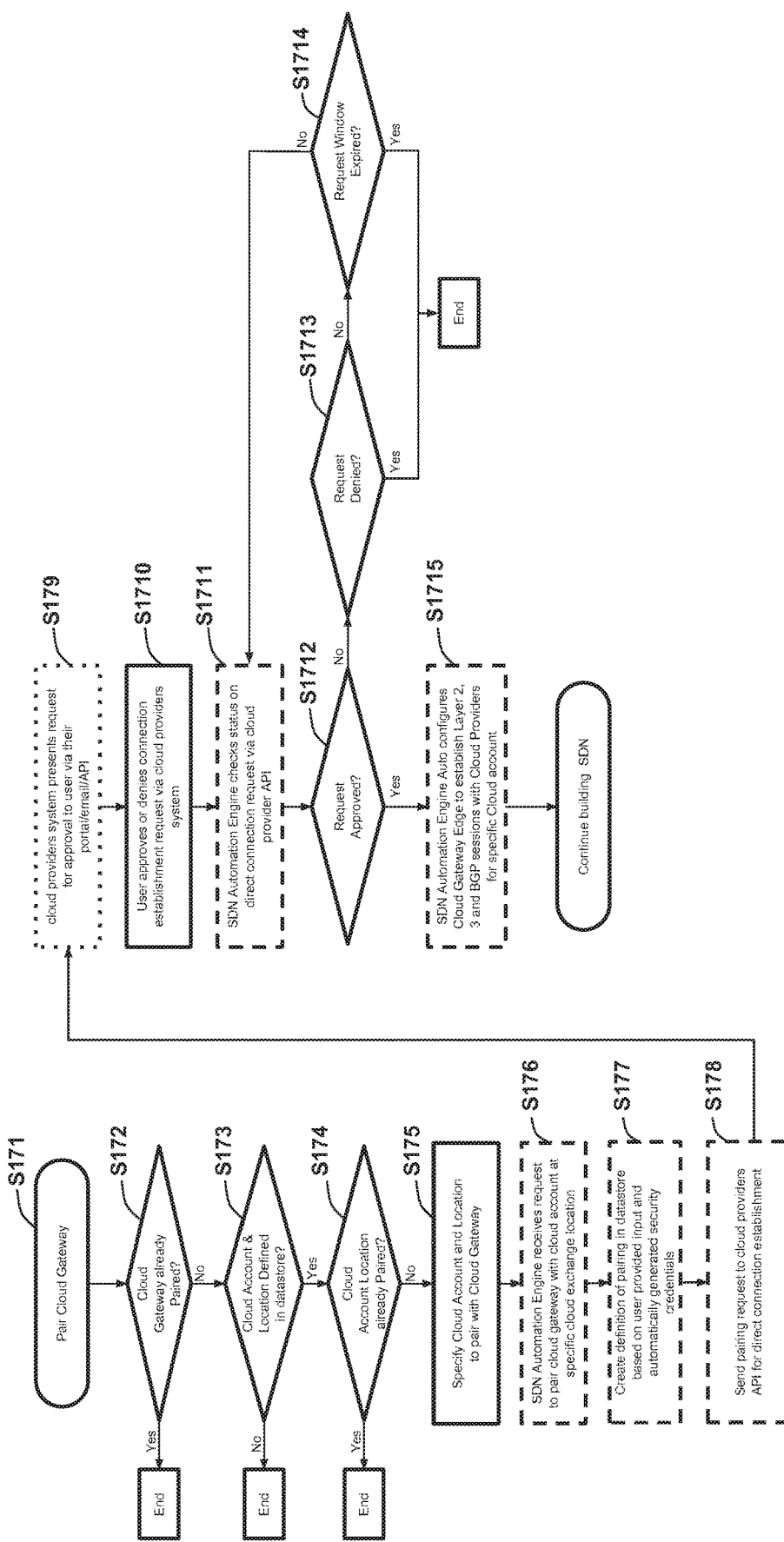
FIG. 17 is a schematic illustration of an example process to pair virtual cloud gateways with cloud providers, according to various implementations.

FIG. 17 schematically illustrates an example of a process of pairing a virtual cloud gateway with a cloud provider. In step S171, the customer may put in a request to pair a virtual cloud gateway with a cloud provider. The SDN automation engine, in step S172, may check whether the gateway is already paired. If already paired, the process may stop. If the virtual cloud gateway and the cloud provider are not already paired, the SDN automation engine in step S173 may check if the customer's account with the cloud provider and the location of the cloud provider (e.g., particular facility of the cloud provider, network settings, etc.) are defined in the datastore. If not so defined, the process may stop. If both the cloud account and the cloud location are defined, the SDN automation engine in step S174 may check if the cloud account location is already paired with a virtual cloud gateway. If so paired, the process may stop. If not paired, the SDN automation engine, in step S175, may request the customer to specify the cloud account and location to pair with the cloud gateway. In step S176, the SDN automation engine may receive the request to pair the cloud gateway with the cloud provider using the cloud account at the specific cloud exchange location, which interfaces with the cloud provider. In step S177, the SDN automation engine may create a definition of pairing in the datastore based on the customer provided input and automatically generate security credentials. In step S178, the SDN automation engine may send a pairing request to the cloud provider API (FIG. 12: 1209) to establish a direct connection of the customer's cloud gateway with the cloud provider's system. The cloud provider's system, in step S179 may present the request for approval to the customer via the cloud provider's portal/API or an email. In step S1710 the customer may either approve or deny the connection establishment request via the cloud provider's system (e.g. API/portal). In step S1711, the SDN automation engine may check the status on the direct connection request via the cloud provider API. If the request is denied, the SDN automation engine may stop the process in step S1713. If the request is not denied and the request window has not expired, the SDN automation engine may periodically check if the customer has approved the direct connection request. If the customer does not approve the direct connection request within the request window, SDN automation engine may stop the process in step S1714. If the customer approves the connection request within the request window, the SDN automation engine may proceed to step S1715 to configure a cloud gateway edge to establish layer 2, layer 3 and border gateway protocol (BGP) sessions with the cloud provider for a specific cloud account.

Figure 18:
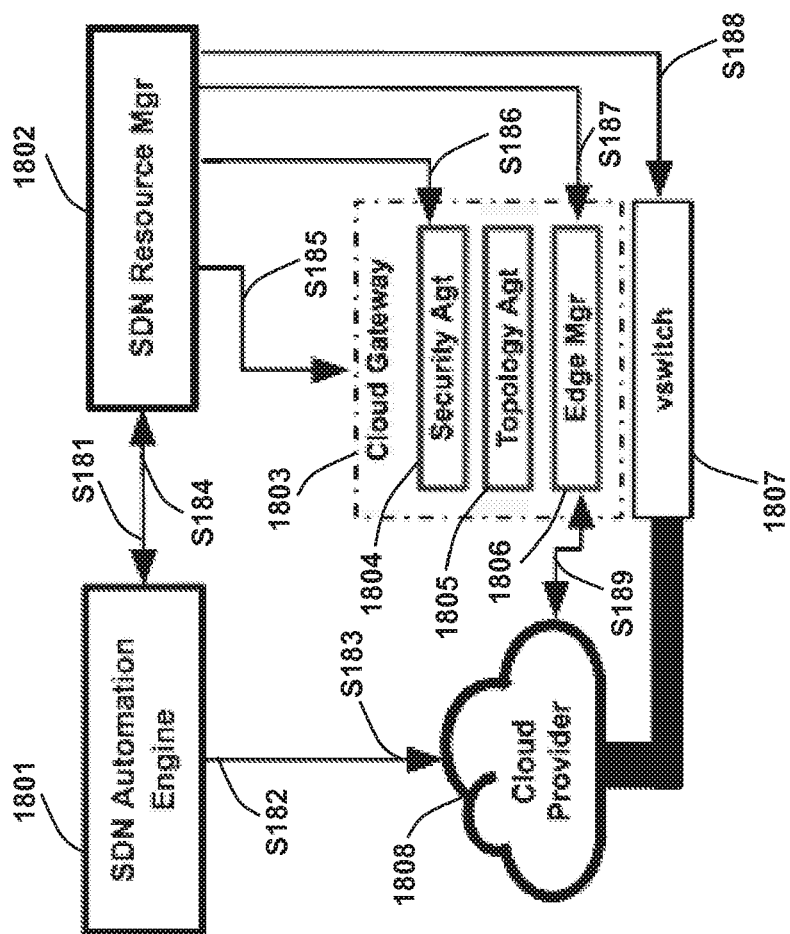
FIG. 18 is a schematic illustration of an example of interactions between various modules of the system to pair a cloud gateway with a cloud provider, according to various implementations.

FIG. 18 schematically illustrates an example of interactions between various modules of the system to pair a cloud gateway with a cloud provider. In step S181, the SDN automation engine 1801 may select an appropriate SDN resource manager 1802 and may send it a pair gateway resource control message, after which the SDN resource manager 1802 may acknowledge the receipt of the control message. In step S182, the SDN automation engine 1801 may send the target cloud provider 1808 API a direct connection establishment request. In step S183, the SDN automation engine 1801 may continue to check the cloud provider 1808 API for the status of the direct connection establishment request. Once direct connection request is approved, SDN automation engine 1801, in step S184, may send a pair approved gateway resource control message to the SDN resource manager 1802. In step S185, SDN resource manager 1802 may update the gateway 1803 by enabling the edge manager 1806. In step S186, the SDN resource manager may update the security agent 1804 in the gateway 1803 with the credentials required for the direct connection device-to-device authentication. In step S187, the SDN resource manager 1802 may update the edge manager 1806 in the gateway 1803 with one or more direct connection routing and logical network interfaces. In step S188, the SDN resource manager 1802 may configure the virtual switch 1807 in the gateway 1803 by allocating the gateway 1803 the vlan, virtual port, and port bandwidth size used by the edge manager 1806's one or more logical interfaces. In step S189, the edge manager 1806 may establish the routing and traffic forwarding session with cloud provider 1808's direct connection network device.

Figure 19:
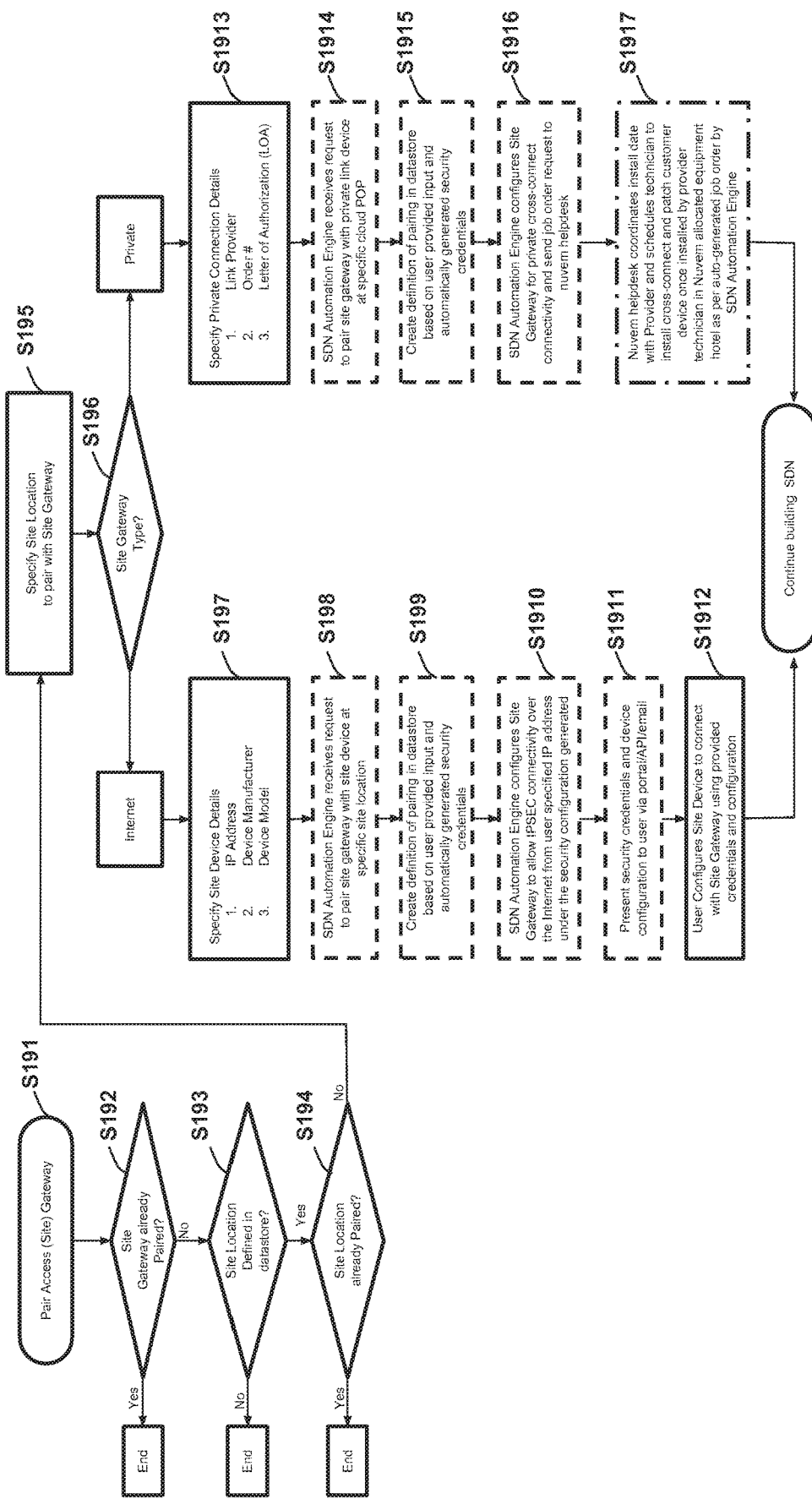
FIG. 19 is a schematic illustration of an example process to pair a virtual access gateway with a customer site, according to various implementations.

FIG. 19 schematically illustrates an example of a process for access gateway pairing. In some implementations, the pairing may be with one or more devices at the customer's site over an internet connection. In some implementations, the pairing may be done through a private connection.

In step S191, a customer may put in a request to pair an access (site) gateway. In step S192, the SDN automation engine may check if the access gateway has already been paired. If paired, the SDN automation engine may stop the process. In step S193, the SDN automation engine may check whether the site location is defined in the datastore. If not defined, the SDN automation engine may stop the process. In step S194, the SDN automation engine may check if the site location has already been paired. If already paired, the SDN automation engine may stop the process. After all the checks are done, the SDN automation engine, in step S195, may prompt the customer to specify the site location to pair with the access gateway. In step S196, the SDN automation engine may check the site gateway type.

In some implementations, the connection to the access gateway may be over the internet. In that case, the SDN automation engine may proceed to step S197 and request the customer to specify, if not already provided, the site equipment details, for example, IP address, device manufacturer, device model, etc. In step S198, the SDN automation engine may receive a request to pair an access gateway with site equipment at a specific site location. In step S199, the SDN automation engine may create a definition of the pairing in the datastore based on the customer provided input and automatically generate security credentials. In step S1910, the SDN automation engine may configure the access gateway to allow connectivity over the internet from the customer specified IP address under the automatically generated security credentials. In step S1911, the SDN automation engine may present the security credentials and device configuration to the customer via the portal/API or an e-mail. In step S1912, the customer may configure the site equipment to connect with the access gateway using the provided credentials and configuration.

In some implementations, the connection to the access gateway may be over a private link. In that case, the SDN automation engine may proceed from step S196 to step S1913 to prompt the customer to provide the connection details. In some implementations the connection details may include the name of the link provider, the order number, and a letter of authorization (LOA) from the link provider. In step S1914, the SDN automation engine may receive a request to pair the access gateway with the private link device at a specific Cloud PoP location. In some implementations, the access gateway may reside at a specific Cloud PoP. In step S1915, the SDN automation engine may create a definition of the pairing in the datastore based on the user provided input and automatically generate security credentials. In step S1916, the SDN automation engine may configure the access gateway for a private connectivity and, where not already set up, send the job order request to the system helpdesk. In step S1917, where needed, the system helpdesk may co-ordinate the install date with the private link provider. In some implementations, the system helpdesk may schedule a technician to install the connection and patch the customer device once installed by the provider technician in the allocated customer hotel in accordance with an automatically-generated job order by the SDN automation engine.

Figure 20:
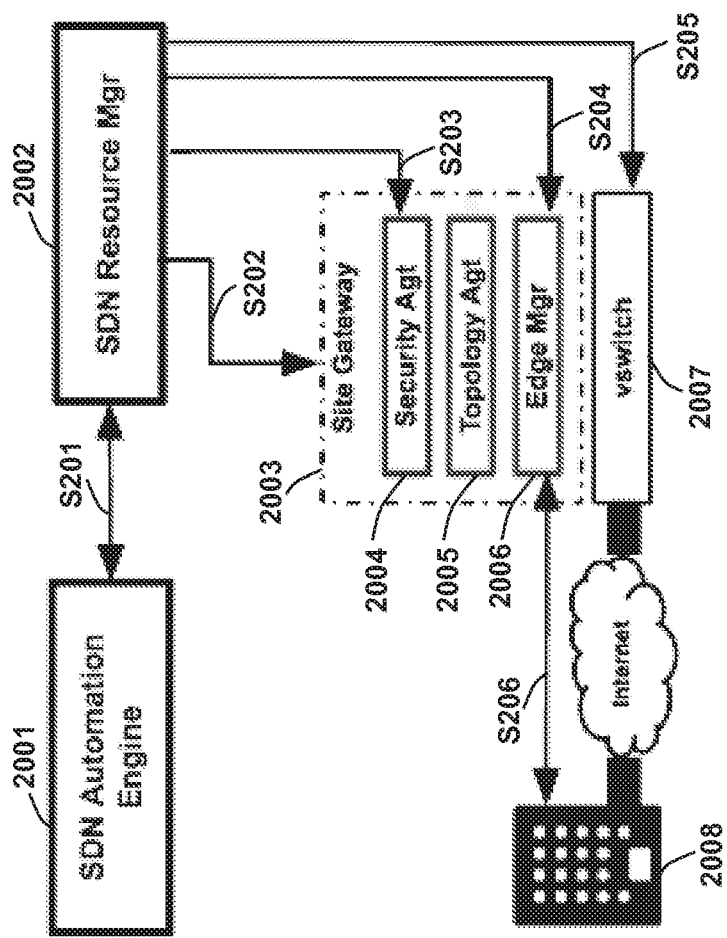
FIG. 20 is a schematic illustration of an example of interactions between various modules of the system to pair an access gateway with a customer's site connection network device, according to various implementations.

FIG. 20 schematically illustrates an example of interactions between various modules of the system to pair an access gateway with a customer's site connection network device. In step S201, the SDN automation engine 2001 may select an appropriate SDN resource manager 2002 and may send it a pair gateway resource control message after which the SDN resource manager 2002 may acknowledge the receipt of the control message. In step S202, the SDN resource manager 2002 may update the access gateway 2003 by enabling the edge manager 2006 in the gateway 2003. In step S203, the SDN resource manager 2002 may update the security agent 2004 in the access gateway 2003 with the credentials required for customer site connection device-to-device authentication. In step S204, the SDN resource manager 2002 may update the edge manager 2006 with the customer site connection information such as the IP address, routing and one or more logical network interfaces. In step S205, the SDN resource manager may configure the virtual switch 2007 in the access gateway 2003 by allocating the access gateway 2003 the vlan, virtual port, and port bandwidth size used by the edge manager 2006's one or more logical interfaces. In step S206, the edge manager 2006 may accept and establish an IPSEC traffic forwarding session with the customer site 2008's connection network device.

Figure 21:
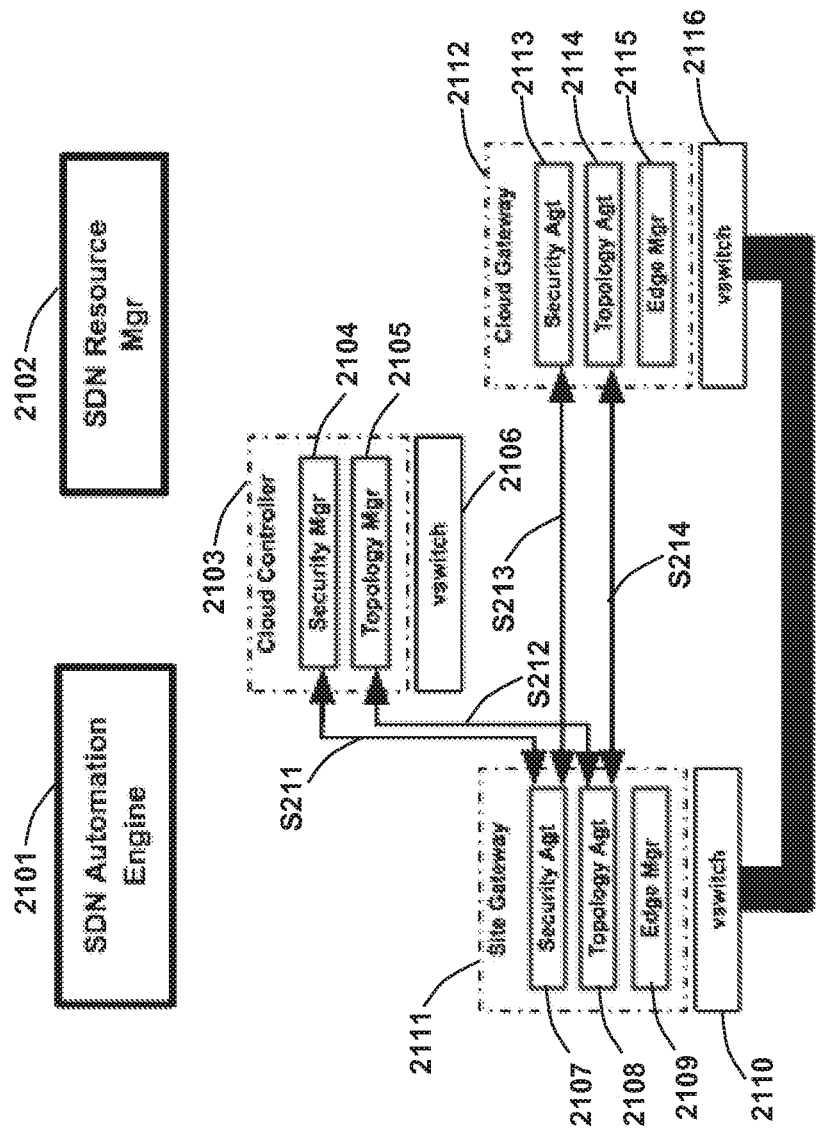
FIG. 21 is a schematic illustration of an example of interactions between various modules of the system to facilitate an initial connection of one virtual network device to another, according to various implementations.

FIG. 21 schematically illustrates an example of interactions between various modules of the system to facilitate an initial connection of one virtual network device to another. In step S211, access gateway 2111 may receive data traffic destined to a specific cloud provider (as determined by the destination IP address that has been mapped to the cloud provider). The access gateway 2111 topology agent 2108 may check its local cache of network resource entries. If no entry is found, access gateway 2111 may send a cloud gateway 2112 resolution request to the security manager 2104 at its controller 2103 and may get an authoritative response of the cloud gateway 2112 providing a transit to the specified cloud provider target IP. In step S212, the access gateway 2111 topology agent 2108 may update its network map based on the master network map entry for the cloud gateway 2112 at the topology manager 2105 on the cloud controller 2103. This entry then may be cached by the topology agent 2108 of the access gateway 2111. In step S213, the access gateway 2111 security agent 2107 may attempt to establish a security session with the security agent 2113 on the target cloud gateway. In step S214, if security session is approved, the access gateway 2111 topology agent may establish a secure logical network connection with the topology agent 2114 on the target cloud gateway 2112 and may send the data traffic through the secure connection. The secure connection may remain established for a configurable amount of time.

Figure 22:
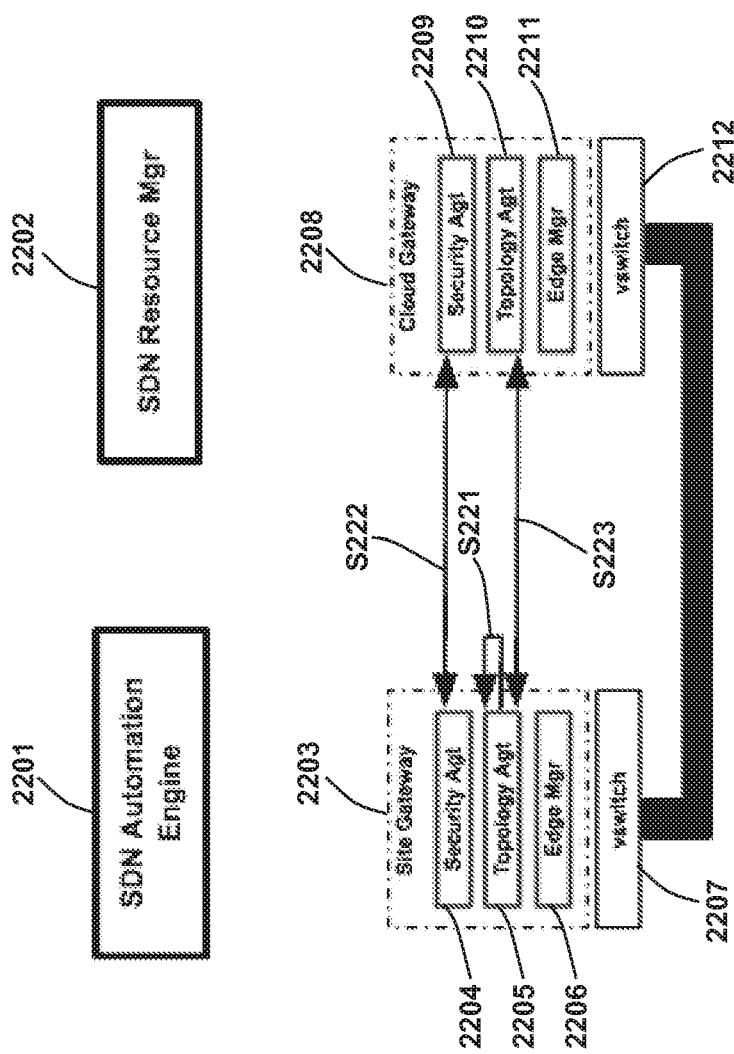
FIG. 22 is a schematic illustration of an example of interactions between various modules of the system to facilitate a cached connection of one virtual network device to another, according to various implementations.

FIG. 22 schematically illustrates an example of interactions between various modules of the system to facilitate a cached connection of one virtual network device to another. In step S221, access gateway 2203 may receive data traffic destined to a specific cloud provider (as determined by the destination IP address that has been mapped to the cloud provider). The access gateway 2203 topology agent 2205 then may check its local cache of network resource entries. In step S222, if a cloud gateway entry is found, the access gateway 2203 security agent 2204 may attempt to establish a security session with the security agent 2209 on the target cloud gateway 2208. In step S223, if security session is approved, the access gateway 2203 topology agent 2205 may establish a secure logical network connection with the topology agent 2210 on the target cloud gateway 2208 and may send the data traffic through the secure connection. The secure connection may remain established for a configurable amount of time.

In some implementations the configured SDN may be a remote access network. In some implementations, the configured SDN may be a wide area network. In some implementations, the configured SDN may be a cloud bridge network. A cloud bridge network allows traffic to go between different cloud provider equipment (e.g., between cloud provider equipment of different cloud providers and/or geographically spaced cloud provider equipment of the same cloud provider) without the traffic having to pass through the customer. In some implementations, the configured SDN may be a consumer virtual private network. In some implementations, the configured SDN may be a cloud federation network. A cloud federation network allows the customer connecting from one or more locations to be connected to two or more cloud providers with a connection to at least one of the cloud providers being live. The network thus allows a customer to switchover or failover to a different cloud provider or optionally use both cloud providers at the same time.

In some implementations, a customer may access the software-defined network from a personal or mobile device. In some implementations, a customer may access the software-defined network from a device at different locations.

To provide security while, for example, simplifying the user experience, a client application may be provided in collaboration with the automation engine that implements a security process to provide secure access by a user to a customer's network using virtually any device at a location of the user's choice. In an embodiment, the security process provides dynamic access to the customer's network using one or more of the following factors: a user login associated with the access device, a device key associated with the access device, a bio-factor or other authorization information pass/fail associated with the token device, geolocation of the token device at time of session initiation/reestablishment/periodic interval, and/or a correct one-time personal identification code (e.g., a PIN) from the access device. In an embodiment, all of the above factors are used. By using a plurality of factors and different types of factors, improved security may be provided.

In an embodiment and at a high level, the process may involve a user login associated with the access device at the time of installation of the client application to allow the user to be known without having to supply user credentials at every session initiation. A device key that uniquely identifies the access device and its associated user login may be auto generated at the time of installation and may never be revealed to the end user, thus removing it as a factor that the end user has to actively manage.

Further, a one-time personal identification code ("OTP") may be automatically sent to the user on a registered token device (e.g., a cell phone) in response to the user normally interacting with the user's network (e.g., start an application desired to be accessed). The OTP sent to the token device may be hidden and may require that the user reveal it by providing a bio-factor or other authorization information (e.g., bio-factor or other authorization information may be locally supported on the token device). Upon revealing the OTP, the user simply enters the OTP in the provided input box on the access device or if the access device is the token device, the token device may be given access without the user entering the OTP. Further, a geolocation factor may be automatically provided by the token device upon successful bio-factor or authorization information validation.

So, from the user perspective, the user simply activates an application. If a current session is not present or the current session is about to expire, the user enters the automatically provided OTP after it has been revealed on the token device or the device automatically processes the OTP to give access. The resulting user experience is one where the user is asked to enter only a single factor (OTP) or is not required to enter one at all, but the system may be secured by a plurality of factors (e.g., 5 factors).

Unlike traditional VPN clients that require username and password credentials separate from the computer and/or mobile device that the VPN client runs on, the system herein, in an embodiment, relies on the operating system's underlying credentials/key management subsystem. That is, as noted above, at time of installation of the client application on the access device, the user approves the installation through the native operating system security credential subsystem. If the user properly authenticates at time of install, a unique device key is generated that is used only by that installation on that access device specific to that user's login. This unique device key is associated with the user's login on the customer's network. So, after the user logs into the access device and after the client application is started (which may run in the background like other login processes), the client application authenticates in the background by sending the unique device key to the automation engine. If the client application is successfully authenticated (e.g. the device has not been revoked), the client application will continue running (e.g., in the background) awaiting a VPN connection request to the customer's network. On a mobile device, the client application may not operate in the background, but may be initiated on demand based on the user attempting to access the customer's network. The client application may use the mobile device's native per APP VPN technology.

In an embodiment, and as alluded to above, the system employs a secure hidden or locked personal identification code process. For an access device that is not a registered token device (e.g., a desktop), the user is sent a hidden OTP that the user must reveal to him or herself by means of a bio-factor or other authentication information supplied at the token device, and which in an embodiment is processed for pass/fail at the token device. The revealed OTP is then used (e.g., manually input) at the access device. For an access device that is also the token device, the user is sent an OTP that the user unlocks by means of a bio-factor or other authentication information supplied at the token device, and which in an embodiment is processed for pass/fail at the token device. The unlocked OTP may then be automatically processed at the token device. This simple method helps prevent unauthorized access in cases where both the access device and token device are in the possession of an unauthorized user and helps prevents unauthorized access in cases where the access device and token device are one in the same.

When the access device is the token device as noted above, the system still employs multiple factors despite the user only being required to unlock a hidden OTP. For example, one or more of the following factors may be used: a user login associated with the access device, a device key associated with the access device, a bio-factor or other authorization information pass/fail associated with the token device, and/or a geolocation of the token device at time of session initiation/reestablishment/periodic interval.

Further, in an embodiment, the system may provide a relatively quick session reestablishment. In a situation with an existing session that times out or is otherwise interrupted or disconnected, unlike traditional methods that require the user to reenter the username and password, the client application may employ a simple end user process where the user is simply asked to provide or unlock, depending on the access device, a new OTP. This method, while extremely simple, still benefits from the protection of the secure hidden personal identification code process and device based multifactor geo-dependent access control.

Figure 23:
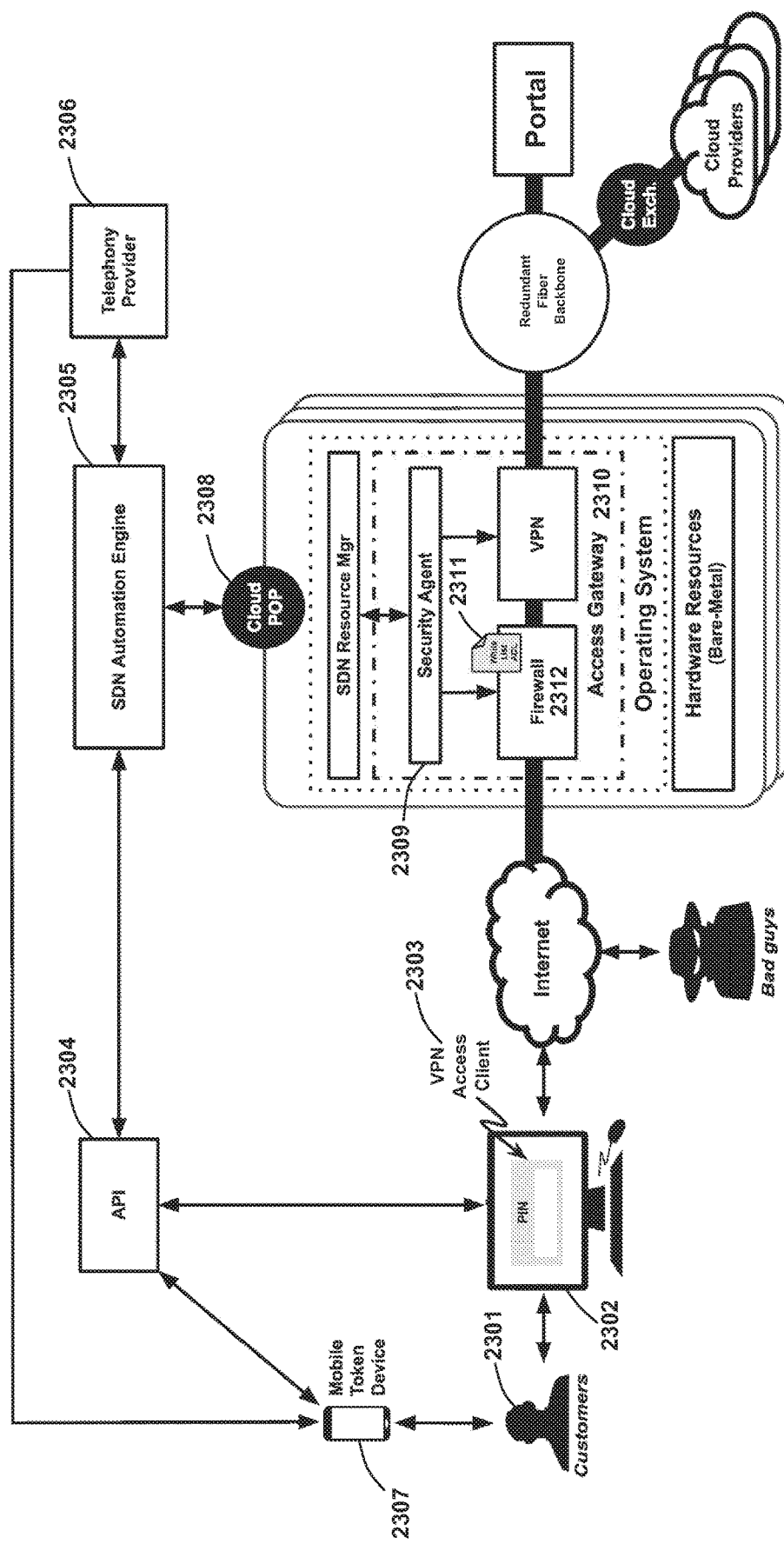
FIG. 23 is a schematic illustration of an example system to provide multi-factor geo-dependent virtual private network (VPN) access control on a non-token device, according to various implementations.

FIGS. 23-25 schematically illustrate an example of a process by which customers can access their network via VPN using virtually any device at a location of their choice.

Figure 24A:
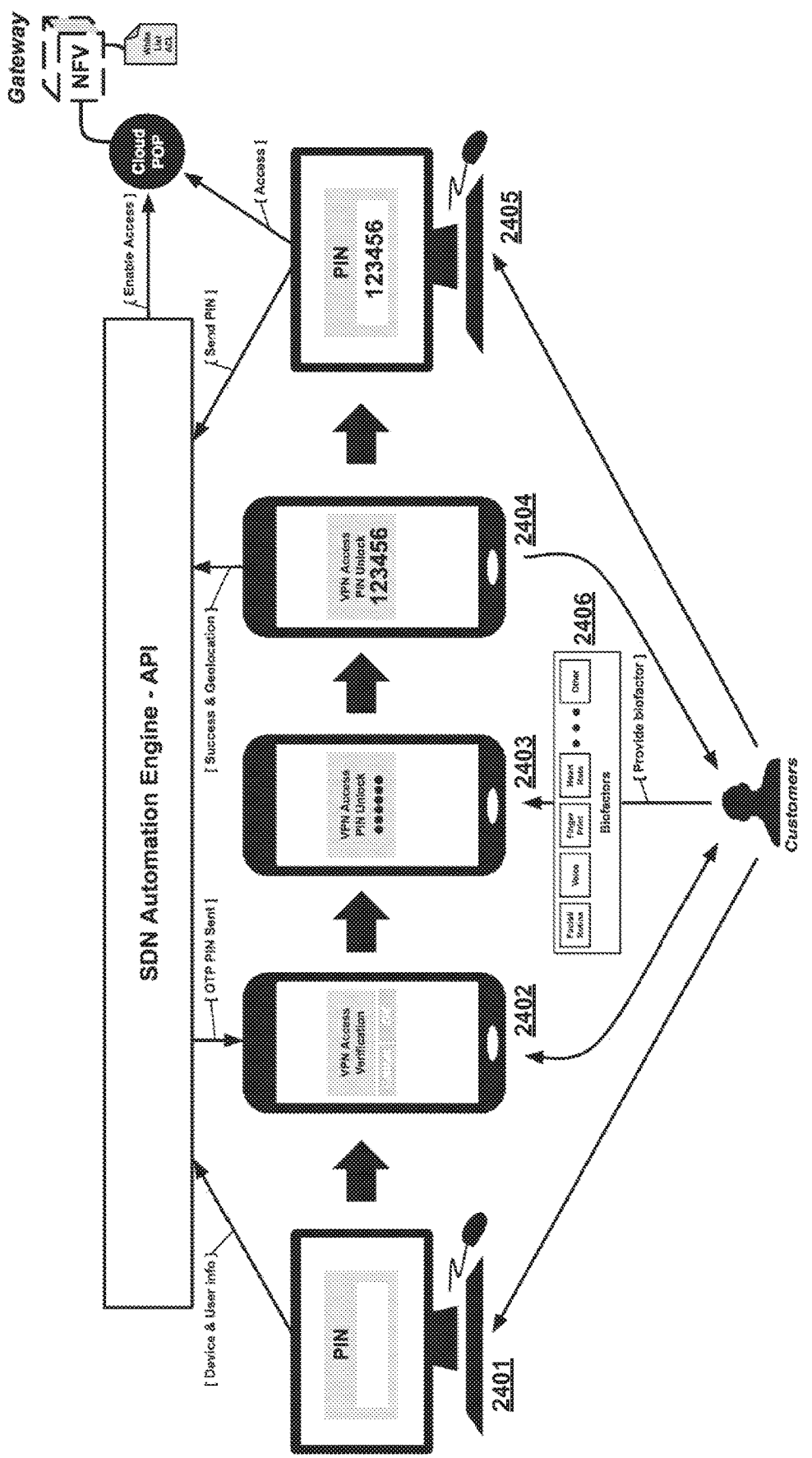
FIGS. 24(A) and 24(B) are schematic illustrations of an example process to provide multi-factor geo-dependent virtual private network (VPN) access control on a non-token device, according to various implementations.
Figure 24B:
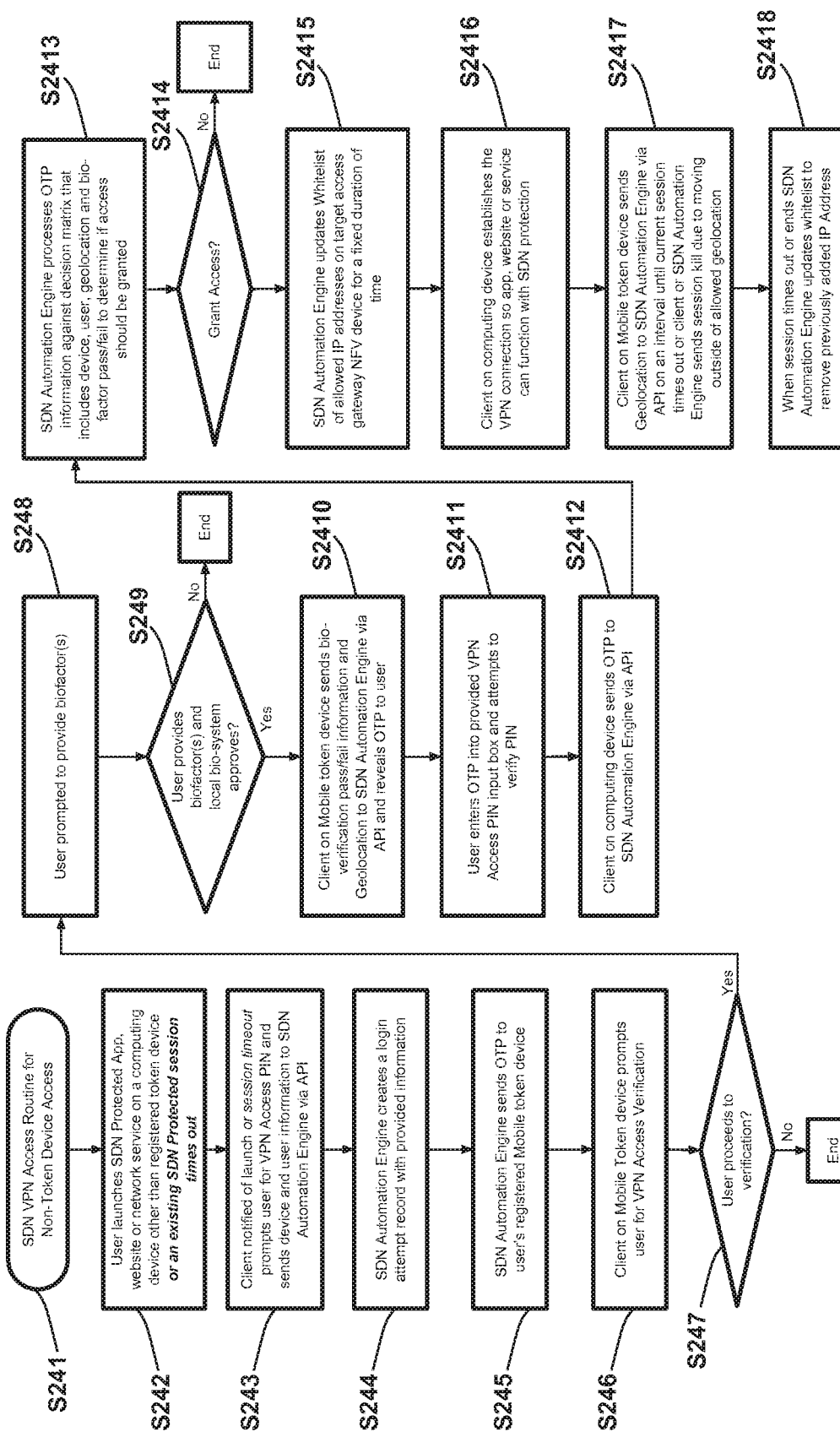

FIGS. 23, 24(A), and 24(B) schematically illustrate an example of a process by which customers can access their network via VPN on a computing device other than a registered token device the token device, at a location of their choice. The process in FIGS. 24(A) and 24(B) is described referencing elements illustrated in FIG. 23.

In step S242, a customer 2301 may launch a SDN protected application, website or network service on a computing device 2302 (FIG. 24(A): 2401) that is other than a registered token device 2307 (a registered token device being a device configured to receive the token described herein and registered with the system to receive the token; typically such a device would be a mobile device, e.g., a mobile phone). In some implementations, the process of non-token device access may start after an existing SDN protected session times out. In step S243, a client program 2303 running on the customer's personal device 2302 may get notified that the protected application, website or network service has been launched; or that an existing session has timed out. The client 2303 may prompt the customer 2301 for a VPN access code and may send the device and customer information to the SDN automation engine 2305 via the API 2304 (FIG. 24(A): 2401). In step S244, the SDN automation engine 2305 may create a login attempt record with the provided information. In step S245, the SDN automation engine may send a one-time personal identification code ("OTP"), through, e.g., a telephony provider 2306, to the customer's registered token device 2307. In step S246, a client running on the token device 2307 may prompt the customer 2301 for VPN access verification (FIG. 24(A): 2402). If the customer 2301 does not proceed to verification in step S247, the process may stop. If the customer 2301 proceeds to verification, the customer in step S248 may be prompted to provide a bio-factor or other authentication information to the token device 2307 to unlock the OTP (FIG. 24(A): 2403). In some implementations, the bio-factor may include a fingerprint, a retina, a face, a voice, a heart-rate, etc. (FIG. 24(A): 2406). If the customer does not provide the bio-factor or other authentication information or the provided bio-factor or other authentication information is not approved at step S249 by, e.g., the bio-factor or other authentication information evaluation system in the token device 2307 or located elsewhere, the process may stop. If the customer provides the bio-factor or other authentication information and it is approved, the system proceeds to step S2410 where the client running on the token device 2307 may send the bio-verification or other authentication information pass/fail and geolocation information to the SDN automation engine 2305 via the API 2304 (FIG. 24(A): 2404). The client may also reveal the OTP to the customer (FIG. 24(A): 2404). In step S2411, the customer may enter the OTP into the provided box in the VPN access client 2303 (FIG. 24(A): 2405). In step S2412, the client 2303 on the computing device 2302 may send the OTP to the SDN automation engine 2305 via the API 2304 (FIG. 24(A): 2405). In step S2413, the SDN automation engine may process the OTP information against the decision matrix that includes device 2302 information, customer 2301 information, geolocation information and bio-factor or other authentication information pass/fail to determine if the access should be granted. If the decision is made to grant access in step S2414, the system may proceed to step S2415, or else the process may stop.

In step S2415, the SDN automation engine may interact with a security agent 2309 at a virtual access gateway 2310 residing at a Cloud PoP 2308. The security agent 2309 may add the IP address of the customer's device 2302 (e.g. a laptop) to its whitelist 2311 for a fixed duration of time. In step S2416, the client 2303 on the computing device 2302 establishes a VPN connection so that the application, website or network service may function on the SDN.

In some implementations, the authentication for the connection may be session specific and may be terminated after a certain amount of time and the authentication process may have to be started all over again. In some implementations, the connection may be terminated after the IP address of the customer's device 2302 changes. In some implementations, SDN automation engine 2305 may receive the geolocation of the token device 2307 periodically. If the geolocation of the token device 2307 is not within any one or more geographically defined areas associated with the target access gateway, the connection may be terminated. For example, the authentication to access the SDN might be within a one-mile (or other amount) radius of the present location. If the token device 2307 moves outside that radius, the authentication may be terminated and the customer may have to start the authentication process again. In some implementations, when the session times out or ends, the SDN automation engine may update the whitelist 2311 to remove the previously added IP address of the device 2302. This provision of a limited authentication helps ensure that the SDN is secure.

Figure 25A:
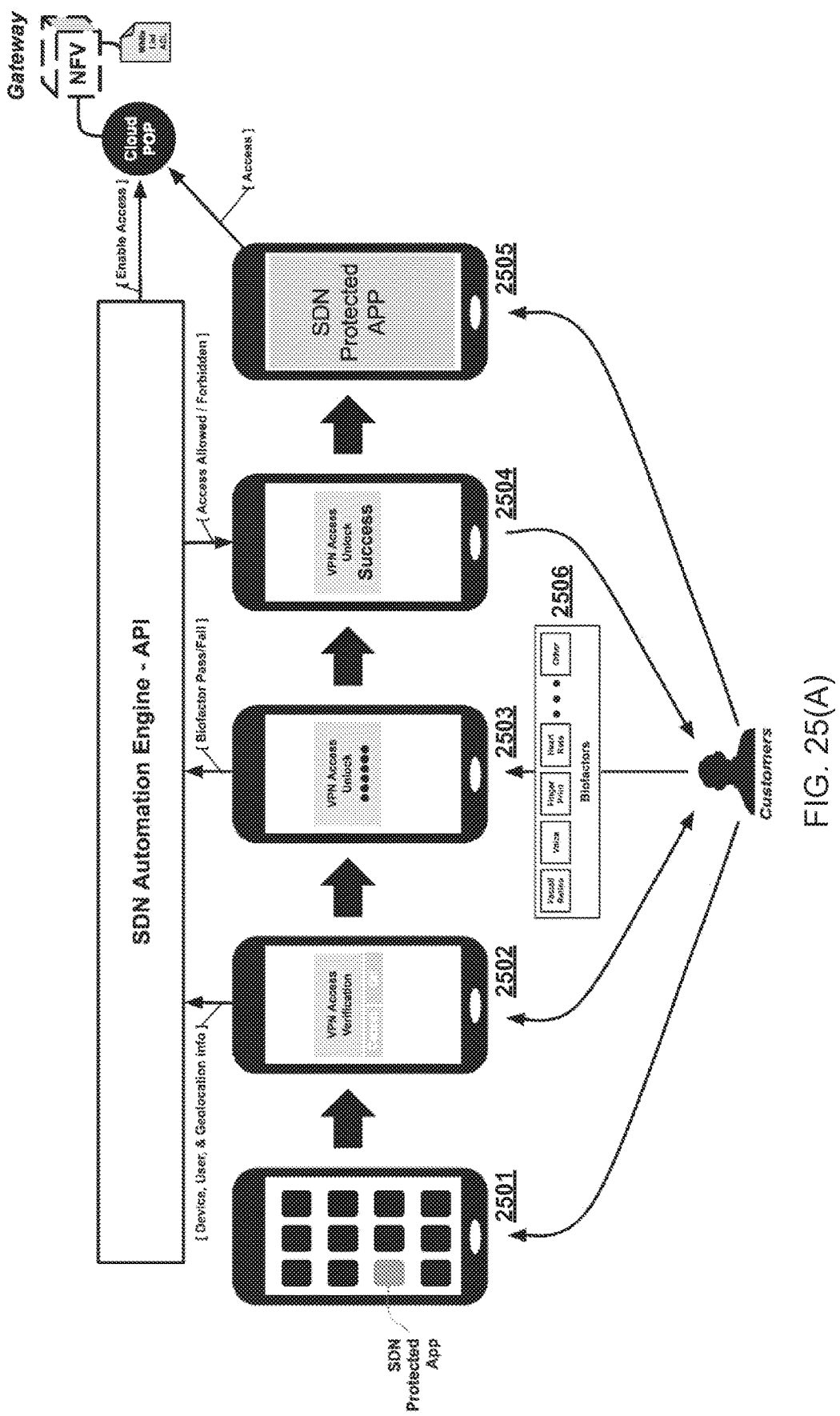
FIGS. 25(A) and 25(B) are schematic illustrations of an example process to provide multi-factor geo-dependent virtual private network (VPN) access control on a token device, according to various implementations.
Figure 25B:
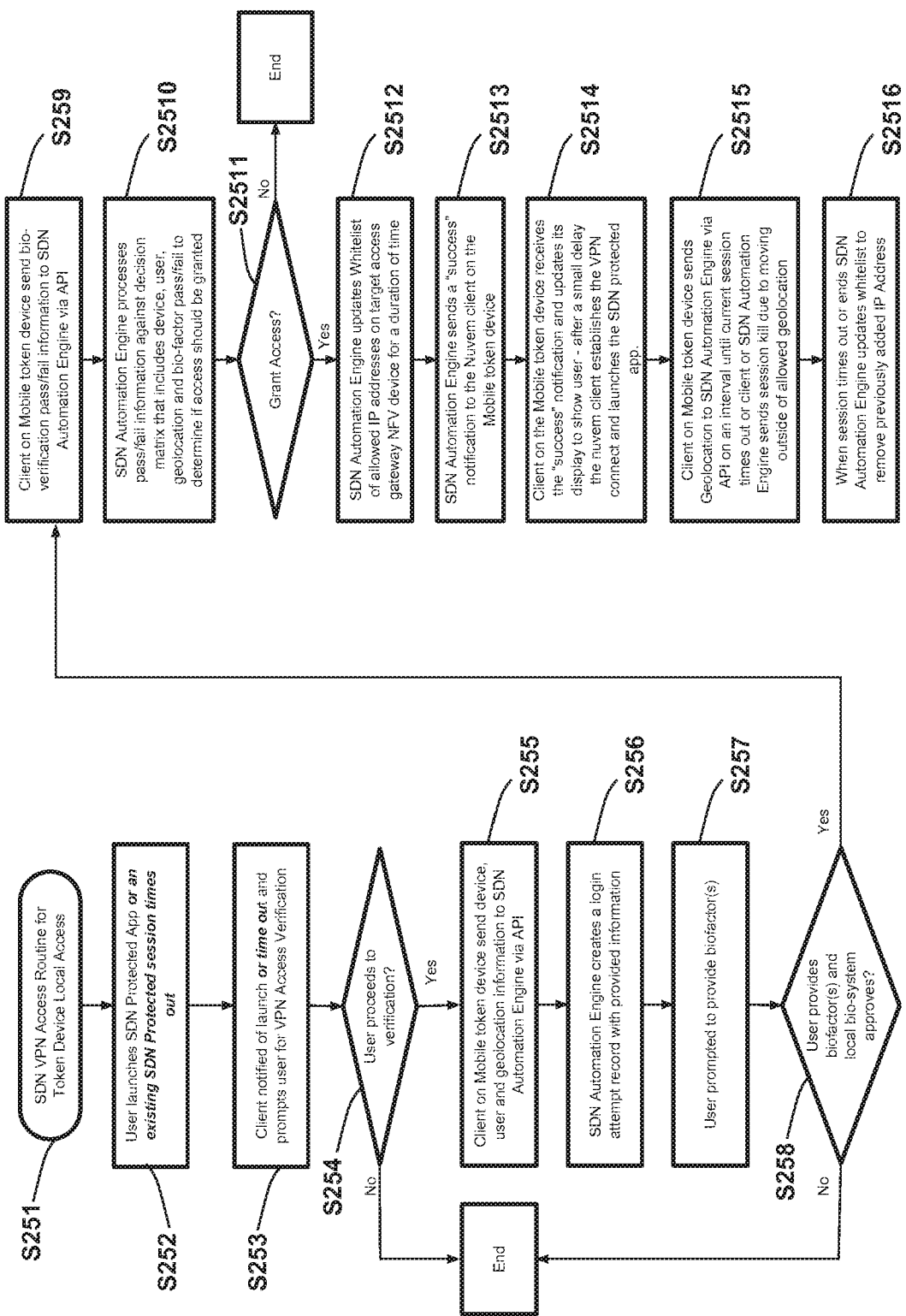

FIGS. 23, 25(A), and 25(B) schematically illustrate an example of a process by which customers can access their network via VPN on the token device at a location of their choice. The process in FIGS. 25(A) and 25(B) is described referencing elements illustrated in FIG. 23. In some implementations, a customer 2301, in step S252, may launch a SDN protected application on the token device 2307 (FIG. 25(A): 2501). In some implementations, the process may start after the SDN protected session times out. In step S253, a client on the token device 2307 may be notified of the launch of the protected application or the timeout of an existing session. The client may then prompt the customer 2301 for VPN access verification (FIG. 25(A): 2502). If the customer 2301 does not proceed to verification in step S254, the process may stop. If the customer 2301 proceeds to verification, the client on the token device 2307, in step S255 may send the customer device and geolocation information to the SDN automation engine 2305 via the API 2304 (FIG. 25(A): 2502). In step S256 the SDN automation engine 2305 may create a login attempt record with the provided information. In step S257, the customer 2301 may be prompted to provide a bio-factor or other authentication information (FIG. 25(A): 2503). In some implementations, the bio-factor may include a fingerprint, a retina, a face, a voice, a heart-rate, etc. (FIG. 25(A): 2506). If the customer 2301 does not provide the bio-factor or other authentication information or the provided bio-factor or other authentication information is not approved by, e.g., the bio-factor or other authentication information authentication system on the token device 2307 or located elsewhere, the process may stop. If the customer 2301 provides the bio-factor or other authentication information and it is approved, the system proceeds to step S259 where the client running on the token device 2307 may send the bio-verification or other authentication information pass/fail and the geolocation information to the SDN automation engine 2305 via the API 2304 (FIG. 25(A): 2503).

In step S2510, the SDN automation engine 2305 may process the pass/fail information against the decision matrix that includes device 2307's information, customer 2301's information, geolocation and bio-factor or other authentication information pass/fail to determine if the access should be granted. If the decision is made to grant access in step S2511, the system may proceed to step S2512, or else the process may stop.

In step S2512, the SDN automation engine 2305 may update the whitelist 2311 on the target access gateway 2310 with the IP address of the token device 2307 for a duration of time. In step S2513, the SDN automation engine 2305 may send a "success" notification to the client running on the token device 2307 (FIG. 25(A): 2504). In step S2514, the client running on the token device 2307 may receive the "success" notification and may show it to the customer 2301 (FIG. 25(A): 2504). The client running on the token device 2307 may then establish the VPN connection with the target access gateway 2310 and may launch the SDN protected application (FIG. 25(A): 2505).

In some implementations, the authentication for the connection may be session specific and may be terminated after a certain amount of time and the authentication process may have to be started over again. In some implementations, the connection may be terminated after the IP address of the token device 2307 changes. In some implementations, SDN automation engine 2305 may receive the geolocation of the token device 2307 periodically. If the geolocation of the token device 2307 is not within any one or more geographically defined areas associated with the target access gateway, the connection may be terminated. For example, the authentication to access the software-defined network might be within a one-mile radius of the present location. If the token device 2307 moves outside the radius, the authentication may be terminated and the customer 2301 may have to start the authentication process over again. In some implementations, when the session times out or ends, the SDN automation engine 2305 may update the whitelist 2311 to remove the previously added IP address of the token device 2307.

Figure 26:
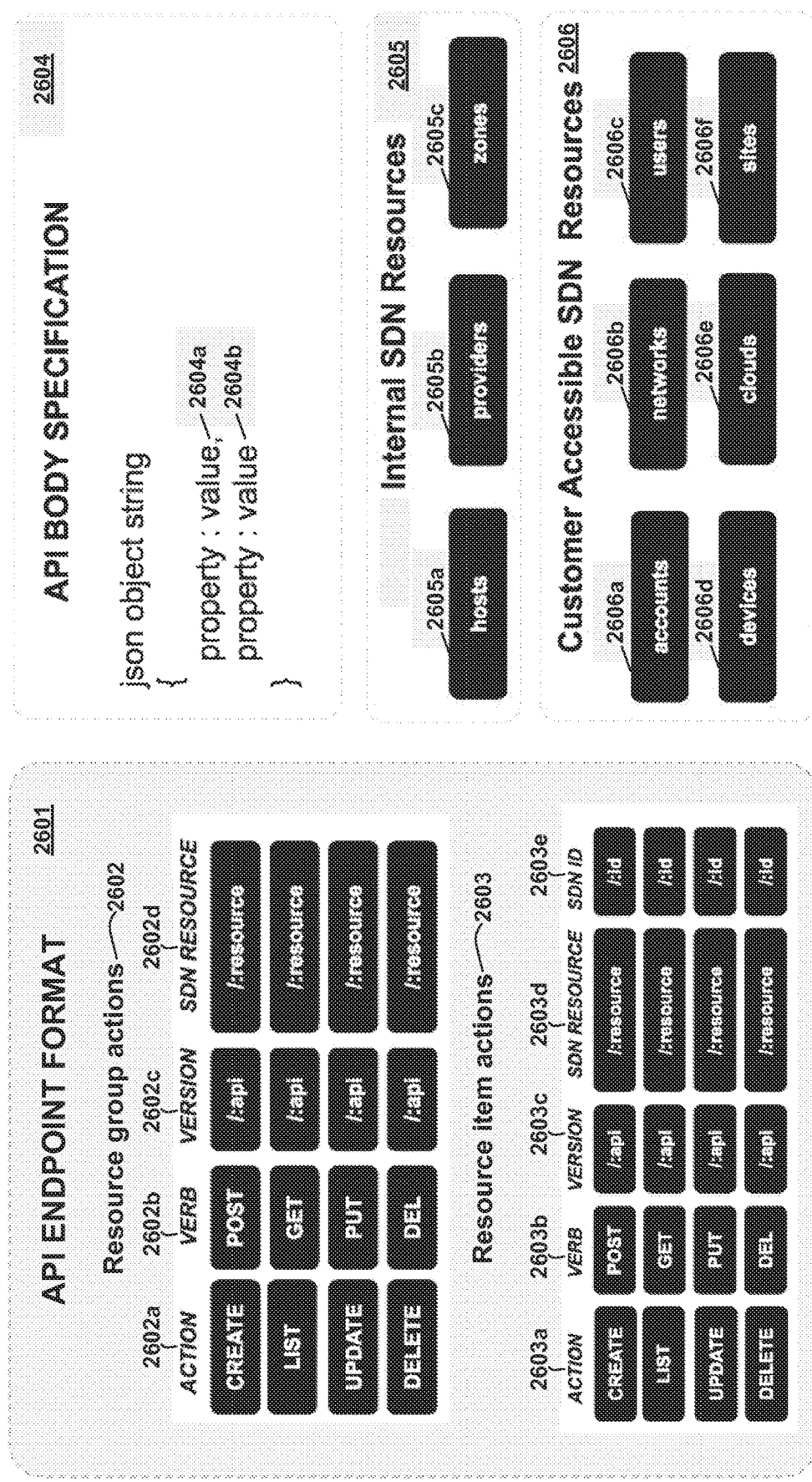
FIG. 26 is a schematic illustration of an example system API of the system, according to various implementations.

FIG. 26 schematically illustrates an example of the system API provided for the system 300. In some implementations, the API may provide actions via the API against certain resources associated with the software-defined network (SDN) in the system 300. In some implementations, the resources may comprise internal resources 2605 as seen by the SDN automation engine and/or administrators of the SDN automation engine. For example, internal resources 2605 may comprise one or more hosts 2605a, which are sub-zones within Cloud Exchanges and Cloud PoPs. The internal resources 2605 may comprise one or more cloud providers 2605b. The internal resources 2605 may comprise one or more zones 2605c. In some implementations, the resources may comprise customer accessible SDN resources 2606, which are available for access by the SDN automation engine and/or administrators of the SDN automation engine as well as one or more customers. For example, the customer accessible SDN resources 2606 may comprise one or more accounts 2606a, one or more networks 2606b, one or more users 2606c, one or more devices 2606d, one or more clouds 2606e, and one or more sites 2606f. As will be appreciated, particular customers may be restricted to particular one or more customer accessible resources.

In some implementations, the API may provide resource group actions 2602. The API user may use the group actions 2602a to create, list, update, and delete a group of items of a particular target resource 2602d (such as one or more of resources 2605 and/or resources 2606 depending on access privileges) associated with the software-defined network (SDN) in the system 300. In some implementations, the API user may use the POST method 2602b to create a number of items of a particular resource 2062d (e.g., create a group of one or more network controllers and/or one or more gateways). In some implementations, the API user may use the GET method 2602b to retrieve a group of items of a particular resource 2602d (e.g., obtain list of a group of one or more network controllers and/or one or more gateways). In some implementations, the API user may use the PUT method 2602b to modify/replace a group of items of a particular resource 2602d. In some implementations, the API user may use the DEL method 2602b to delete a group of items of a particular resource 2602d.

In some implementations, the API may provide resource item actions 2603. The API user may use the item actions 2603a to create, list, update, and delete one or more specific items of a target resource 2603d (such as one or more of resources 2605 and/or resources 2606 depending on access privileges), which specific items are identified by the SDN ID 2603e. In some implementations, the API user may use the POST method 2603b to create a specific item of a resource 2603d identified by the SDN ID 2603e (e.g., create the network controller or gateway in the SDN denoted by the SDN ID 2603e). In some implementations, the API user may use the GET method 2603b to retrieve a particular item of resource 2603d identified by SDN ID 2603e. In some implementations, the API user may use the PUT method 2603b to modify/replace a particular item of resource 2603d denoted by SDN ID 2603e. In some implementations, the API user may use the DEL method 2603b to delete an item of resource 2603d denoted by SDN ID 2603e.

Thus, in an embodiment, in the case of an API call using a group action 2602a, the API user merely needs to specify the appropriate method 2602b and the desired target resource 2602d. Optionally, the API user may specify the API version 2602c in the call. Optionally and/or where necessary, the API user would further specify in the API body 2604 one or more parameters and, optionally, one or more associated values, associated with the API call (e.g., a date parameter and date range associated therewith for a GET method). In some implementations, the body specification 2604 may be in the form of JavaScript Object Notation.

In an embodiment, in the case of an API call using an item action 2603a, the API user merely needs to specify the appropriate method 2603b, the desired target resource 2603d and the SDN ID 2603e for the particular item of the resource 2603d. Optionally, the API user may specify the API version 2603c in the call. Optionally and/or where necessary, the API user would further specify in the API body 2604 one or more parameters and, optionally, one or more associated values, associated with the API call (e.g., a date parameter and date range associated therewith for a GET method). In some implementations, the body specification 2604 may be in the form of JavaScript Object Notation.

Thus, an API user may be provided a very simple API that enables a wide gamut of operations in association with the software-defined network (SDN) in the system 300.

In an embodiment, there is provided a hosting system to facilitate a customer of an operator of the system to connect to a cloud provider, the system comprising: a first cloud exchange co-located with and connected to first cloud provider equipment; a second cloud exchange co-located with and connected to second cloud provider equipment, wherein the first cloud provider equipment and the second cloud provider equipment are of a same cloud provider but at different geographically spaced locations or the first cloud provider equipment is of a different cloud provider than that of the second cloud provider equipment, and wherein the first cloud exchange is connected to the second cloud exchange; and a non-transitory computer readable medium comprising computer program instructions, the instructions configured to facilitate the configuration of a software-defined network including the first cloud exchange and/or second cloud exchange, wherein the network connects the customer to the first cloud provider equipment and/or the second cloud provider equipment.

In an embodiment, the system further comprises a customer point of presence configured to allow the customer to connect to the first cloud exchange and/or the second cloud exchange. In an embodiment, the customer point of presence is configured to provide a private connection for the customer. In an embodiment, the customer point of presence hosts networking equipment of the customer. In an embodiment, the customer point of presence is configured to provide an internet connection to the customer. In an embodiment, the computer program instructions are further configured to provide a web portal to the customer for the customer to configure the network. In an embodiment, the computer program instructions are further configured to provide an application programming interface to the customer for the customer to configure the network. In an embodiment, the configured network comprises a cloud bridge network or a cloud federation network. In an embodiment, the computer program instructions are further configured to make available a plurality of virtual networking devices for use by the customer. In an embodiment, the computer program instructions are further configured to receive a specification of the network from the customer, wherein the network includes the plurality of virtual networking devices. In an embodiment, the specification of the network comprises a network topology of the plurality of virtual networking devices. In an embodiment, at least one of the virtual networking devices comprises a network controller or a gateway. In an embodiment, at least one of the virtual networking devices is localized in a bare-metal hardware resource of a sub-zone within a customer point of presence. In an embodiment, at least one of the virtual networking devices is localized in a bare-metal hardware resource of a sub-zone within the first cloud exchange and/or second cloud exchange. In an embodiment, at least one of the virtual networking devices is container based. In an embodiment, at least two of the plurality of virtual networking devices are redundant and on two different sub-zones of the first cloud exchange, of the second cloud exchange and/or of a customer point of presence. In an embodiment, the system comprises the first cloud provider equipment and the second cloud provider equipment being of the same cloud provider but at different geographically spaced locations. In an embodiment, the system comprises the first cloud provider equipment being of a first cloud provider different than a second cloud provider of the second cloud provider equipment. In an embodiment, the computer program instructions are further configured to allow the customer to include the first and second cloud providers in the customer's network and/or to switch between the first and second cloud providers. In an embodiment, the first cloud exchange is connected to the second cloud exchange by a redundant fiber backbone. In an embodiment, the computer program instructions are further configured to allow the customer to create a plurality of software-defined networks, each software-defined network of the plurality of software-defined networks including the first cloud exchange and/or second cloud exchange. In an embodiment, the computer program instructions are further configured to interact with a cloud provider application programming interface to connect the software-defined network to the first cloud provider equipment and/or the second cloud provider equipment and/or to manage network traffic from the software-defined network to the first cloud provider equipment and/or the second cloud provider equipment. In an embodiment, the computer program instructions are further configured to allow access to the network based upon multi-factor authentication and geolocation information. In an embodiment, the computer program instructions are further configured to provide a personal identification code to a token device, wherein the personal identification code is hidden or locked at the token device until authorization information is provided at the token device. In an embodiment, the computer program instructions are further configured to provide a personal identification code and to allow re-establishment of access to the network upon receipt of the personal identification code without receipt of a user name and/or user password at the time of re-establishment.

In an embodiment, there is provided a hosting system to provide a software-defined network as a service, the system comprising: a cloud exchange co-located with and connected to cloud provider equipment; a non-transitory computer readable medium comprising computer program instructions, the instructions configured to: configure a virtual networking device at the cloud exchange and/or at a customer point of presence, receive a software-defined network specification from a customer of the operator of the system, and create a software-defined network based on the received specification, wherein the software-defined network includes the virtual networking device and connects equipment of the customer to the cloud provider equipment.

In an embodiment, the computer program instructions are further configured to allow the customer to disconnect from the cloud provider and connect to another cloud provider connected to the system. In an embodiment, the computer program instructions are further configured to provide a web portal or an application programming interface to the customer for the customer to configure the network. In an embodiment, the computer program instructions are further configured to allow the customer to include the cloud provider and another cloud provider in the customer's network. In an embodiment, the computer program instructions are further configured to make available a plurality of virtual networking devices for use by the customer and to receive a specification of the network from the customer, wherein the network includes the plurality of virtual networking devices. In an embodiment, the computer program instructions are further configured to interact with a cloud provider application programming interface to connect the software-defined network to the cloud provider equipment and/or to manage network traffic from the software-defined network to the cloud provider equipment. In an embodiment, the computer program instructions are further configured to allow access to the network based upon multi-factor authentication and based upon geolocation information of a token device in relationship to geolocation of a customer's virtual networking device at a customer point of presence. In an embodiment, the computer program instructions are further configured to provide a personal identification code to a token device, wherein the personal identification code is hidden or locked at the token device until authorization information is provided at the token device. In an embodiment, the computer program instructions are further configured to provide a hidden or locked personal identification code and to allow re-establishment of access to the network upon receipt of the personal identification code unhidden or unlocked without receipt of a user name and/or user password at the time of re-establishment. In an embodiment, the computer program instructions are further configured to provide an application programming interface (API), wherein the API allows a method call that merely specifies: a type of the method, a target resource for the method, an identification code for an item of the target resource where the API implements specification of a particular item of the resource in the method call, an identification of an API version where the API implements specification of the API version in the method call, and a body specifying a parameter and/or a value where the API implements specification of a parameter and/or a value in the method call.

In an embodiment, there is provided a method to facilitate a customer of an operator of a system to connect to a cloud provider, the method comprising: facilitating configuration of a software-defined network including a first cloud exchange of the system and/or a second cloud exchange of the system, the network connecting the customer to first cloud provider equipment and/or second cloud provider equipment, wherein the first cloud exchange is co-located with and connected to the first cloud provider equipment, wherein the second cloud exchange is co-located with and a connected to the second cloud provider equipment, the first cloud provider equipment and the second cloud provider equipment being of a same cloud provider but at different geographically spaced locations or the first cloud provider equipment being of a different cloud provider than that of the second cloud provider equipment, and wherein the first cloud exchange is connected to the second cloud exchange.

In an embodiment, the method further comprises providing a web portal or an application programming interface to the customer for the customer to configure the network.

In an embodiment, there is provided a method of providing a software-defined network as a service, the method comprising: configuring a virtual networking device at a customer point of presence and/or a cloud exchange co-located with and connected to cloud provider equipment; receiving a software-defined network specification from a customer of an operator of the cloud exchange and/or customer point of presence, and creating a software-defined network based on the received specification, wherein the software-defined network includes the virtual networking device and connects equipment of the customer to the cloud provider equipment.

In an embodiment, the method further comprises providing an application programming interface to the customer for the customer to configure the network. In an embodiment, the method further comprises allowing the customer to include the cloud provider and another cloud provider in the customer's network. In an embodiment, the method further comprises providing a plurality of virtual networking devices to the customer and to receive a specification of the network from the customer, wherein the network includes the plurality of virtual networking devices. In an embodiment, the method further comprises interacting with a cloud provider application programming interface to connect the software-defined network to the cloud provider equipment and/or to manage network traffic from the software-defined network to the cloud provider equipment. In an embodiment, the method further comprises allowing access to the network based upon multi-factor authentication and based upon geolocation information of a token device in relationship to geolocation of a customer's virtual networking device at a customer point of presence. In an embodiment, the method further comprises providing a personal identification code to a token device, wherein the personal identification code is hidden or locked at the token device until authorization information is provided at the token device. In an embodiment, the method further comprises providing a hidden or locked personal identification code to a user and allowing re-establishment of access to the network upon receipt of the personal identification code unhidden or unlocked without receipt of a user name and/or user password at the time of re-establishment.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A system to facilitate connecting to multiple cloud providers, the system comprising:
   a first cloud exchange configured to provide access to cloud services of a first cloud provider, the first cloud exchange connected to first cloud provider physical equipment;
   a second cloud exchange configured to provide access to cloud services of a second cloud provider that is different from the first cloud provider, the second cloud exchange connected to second cloud provider physical equipment;
   one or more cloud point-of-presence (PoPs) communicatively coupled to the first and second cloud exchanges, at least one of the one or more cloud PoPs comprising a virtual access gateway for connecting a user device to the first cloud exchange and the second cloud exchange;
   a software-defined network ("SDN") automation engine that generates an application program interface (API) and provides a portal comprising an interactive graphical user interface (GUI), the portal communicating with the SDN automation engine via the API;
   a data collection layer configured to at least one of monitor, collect, measure, store and transmit real-time and historic data and information from among components and layers of the system, as well as from among one or more external data sources;
   an artificial intelligence (AI) layer comprising one or more AI modeling engines configured to at least one of generate, train, validate, test and deploy one or more AI models; and
   a non-transitory computer readable medium comprising computer program instructions that, when executed by a processor, cause the system to:
   generate, by the AI layer, a real-time conversational agent (a "chat-bot"),
   display, on the user device via the interactive GUI, the chat-bot,
   receive, from the user device via the chat-bot, input comprising network specification parameters in a natural language format,
   convert, by the AI layer, the input into one or more commands,
   receive, by the SDN automation engine, the one or more commands comprising the network specification parameters,
   allocate, by the SDN automation engine from among a pool of system device resources, one or more virtual networking devices,
   configure, by the SDN automation engine, the allocated one or more virtual networking devices specifically for a customized, on-demand SDN that complies with the network specification parameters,
   instantiate and deploy, by the SDN automation engine, the specifically-configured one or more virtual networking devices to generate the customized, on-demand SDN,
   capture and store, by the data collection layer, user data associated with one or more users and network data associated with the customized, on-demand SDN,
   generate, by the AI layer, modeling input based on the network data, the user data and the one or more commands,
   model, by the one or more AI modeling engines, the modeling input by executing the one or more AI models to generate network analytics data,
   analyze, by the one or more AI modeling engines, the network analytics data, and
   automatically initiate, by the one or more AI modeling engines, one or more actions responsive to the analysis,
   wherein the network specification parameters comprise at least one of a user site location, cloud PoP information, user site equipment information, user site connection information, a network topology of the one or more virtual devices, one or more static rules, bandwidth, static and dynamic configuration information, speed, internet protocol (IP) addresses, autonomous system numbers (ASNs), gateway protocols, and virtual local area network (VLAN) details,
   said customized, on-demand SDN including both the first cloud exchange and the second cloud exchange, and connecting the user device to the first cloud provider physical equipment and the second cloud provider physical equipment, such that the user device accesses a pre-defined combination of cloud services comprising at least one cloud service from each of the first and second cloud providers.

2. The system of claim 1, wherein the data collection layer is further configured to pre-process the real-time and historic data and information, including the user data and the network data, to create pre-processed data and information that is configured for use by one or more components and layers of the system,
   said pre-process comprising one or more of operations that include labeling, annotating, filtering, formatting, normalizing, cleansing, scaling, resolving missing data values and performing ETL (extracting, transforming and loading) operations.

3. The system of claim 2, wherein the data collection layer is further configured to retrieve the pre-processed data and information from one or more downstream system services and repeat one or more of the pre-process operations on the retrieved pre-processed data and information.

4. The system of claim 2, wherein the data collection layer is further configured to:
   organize and store the pre-processed data and information as one or more data sets; and
   propagate the one or more data sets for use by at least one among the one or more components and layers of the system,
   wherein the one or more data sets are propagated as one of a stream and a batch of data.

5. The system of claim 2, wherein the data collection layer is further configured to collect and process output and results generated by the one or more components and layers of the system, and in response, initiate at least one of:
   transmit the output and results to the user device for at least one of rendering and display thereon,
   store the output and results in a dedicated data repository,
   generate and transmit one or more of a notice, alert and communication to the client device,
   trigger one or more orchestration tasks,
   re-route one or more data transmissions within the customized, on-demand SDN, and
   transmit the output and results to the AI layer for re-training at least one among the one or more AI models.

6. The system of claim 1, wherein the computer-readable instructions, when executed, further cause the system to dynamically determine which and how many of the one or more AI models to deploy based on one or more factors, the one or more factors comprising a use case associated with said one or more AI models, a source, type and availability of data, the network specification parameters, user preference parameters, and system hardware capabilities.

7. The system of claim 1, wherein the one or more AI models include a combination of multimodal generative AI models, supervised AI models and unsupervised AI models.

8. The system of claim 7, wherein the one or more AI models includes a multimodal generative AI model that comprises one or more large language models (LLMs), said multimodal generative AI model configured to process and model multiple modalities of input data and generate content across the multiple modalities.

9. The system of claim 8, wherein the chat-bot is powered by the multimodal generative AI model, and wherein the AI layer implements a retrieval-augmented generation (RAG) pattern to retrieve and provide grounding data to the one or more LLMs from the one or more external data sources.

10. The system of claim 8, wherein the input received from the user device is provided according to a combination of multiple modalities selected from among text, video, audio and image data.

11. The system of claim 7, wherein the one or more AI models are configured for anomaly detection, and wherein the AI layer deploys one or more unsupervised AI models to identify one or more anomalies in the customized, on-demand SDN, and one or more supervised AI models to classify the anomalies.

12. The system of claim 7, wherein the one or more AI models are configured to self-heal the customized, on-demand SDN, and wherein the AI layer deploys one or more unsupervised AI models to monitor and identify irregularities in the network, and one or more supervised AI models to adjust a configuration of the customized, on-demand SDN.

13. The system of claim 1, wherein the AI layer is further configured to generate training data from among the real-time and historic data and information collected by the data collection layer, and corresponding training datasets, validation datasets and testing datasets from the training data.

14. The system of claim 13, wherein the testing datasets comprise bulk testing data configured for training a multimodal generative AI model used to power the chat-bot, said bulk testing data comprising expected questions, ground-truth answers, and links to the one or more external data sources from which answers to the expected questions are captured.

15. The system of claim 1, wherein the AI layer is further configured to:
receive, from the user device via the chat-bot, responsive input comprising current sentiment data;
generate updated training data based on a combination of the current sentiment data, historic sentiment data, one or more training data sets used to train the one or more AI models, and the real-time and historic data and information collected by the data collection layer; and
re-train at least one among the AI models using the updated training data.

16. The system of claim 15, wherein the one or more AI modeling engines of the AI layer are configured to continually refine the one or more AI models by re-training the one or more AI models using a combination of current and historic sentiment data, the network analytics data, and policy data.

17. The system of claim 16, wherein the AI layer is further configured to:

evaluate a performance of the one or more AI models over time, based on one or more pre-defined performance metrics; and
re-train at least one among the one or more AI models based on the evaluated performance,
wherein said evaluate comprises generating the modeling input to include a combination of the current and historic sentiment data, the policy data and network performance data, modeling the modeling input to generate the network analytics data, and analyzing the network analytics data.

18. The system of claim 1, wherein the AI layer is configured to deploy the one or more AI models automatically, responsive to at least one of: output generated by at least one among the one or more AI models, detection of meeting or exceeding one or more pre-determined thresholds associated with the customized, on-demand SDN, detection of a change in the real-time and historic data and information collected by the data collection layer, detection of a change to one or more rules or policies included in the AI layer, according to a pre-determined schedule, and detection of one or more pre-defined events.

19. The system of claim 1, wherein the AI layer comprises a model layer configured to provide a framework for generating training, re-training, storing and deploying a combination of the one or more AI models, and a policy layer comprising a combination of policies, applications and extensions to system modules and components through which the one or more AI models may be executed, said model layer and policy layer in two-way communication with the other.

20. The system of claim 19, wherein the model layer comprises:
a model library for storing, maintaining and providing access the one or more AI models;
the one or more AI modeling engines configured to provide a runtime environment for execution of the one or more AI models; and
a network graph which represents a graph-based representation of the customized, on-demand SDN.

21. The system of claim 19, wherein the policy layer comprises policy data that is used to adjust one or more model weights of the one or more AI models in order to comply with one or more of the policy layer's policies.

22. The system of claim 1, wherein the AI layer utilizes natural language processing (NLP) to interpret and convert the input into the one or more commands.

23. The system of claim 1, wherein the one or more commands comprise a combination of command line interface (CLI) commands and application program interface (API) requests, network device commands, orchestration layer commands, and commands for external systems.

24. The system of claim 23, wherein the AI layer is further configured to process at least one among the one or more commands and display, via the interactive GUI, information responsive to the processing of the at least one command.

25. The system of claim 1, wherein the AI layer is further configured to automatically generate the one or more commands, without input from the user device, based on the real-time and historic data and information captured by the data collection layer's monitoring functions.

26. The system of claim 1, wherein the network data comprises a combination of real-time and historic data and information associated with the customized, on-demand SDN, one or more other SDNs and one or more networks generated outside of the system, traffic data, SDN performance data, SDN utilization data, cloud provider performance data, cloud service usage data, SDN capacity data, sentiment data, and user-interaction data.

27. The system of claim 1, wherein the one or more actions that are automatically initiated comprise at least one of:
- generate one or more advisory notices as to a status of one or more aspects of the customized, on-demand SDN for display via the interactive GUI,
- generate one or more suggested actions responsive to the status for display via the interactive GUI, and await a confirmation command before initiating the one or more suggested actions, and
- initiate one or more automated actions responsive to the status and generate one or more action notices relating to the initiated automated actions for display via the interactive GUI.

28. The system of claim 27, wherein the system is further configured to:
- receive additional input responsive to the one or more advisory notices, the one or more suggested actions and the one or more action notices; and
- convert, by the AI layer, the additional input into one or more additional commands,
- wherein the one or more additional commands comprise at least one of the confirmation command, a stop-action command, and a new-action command.

* * * * *